(12) United States Patent
Kitahara et al.

(10) Patent No.: US 10,779,052 B2
(45) Date of Patent: *Sep. 15, 2020

(54) RECEIVING APPARATUS, RECEIVING METHOD, TRANSMITTING APPARATUS, AND TRANSMITTING METHOD

(71) Applicant: SATURN LICENSING LLC, New York, NY (US)

(72) Inventors: Jun Kitahara, Shizuoka (JP); Naohisa Kitazato, Tokyo (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,711

(22) Filed: Nov. 9, 2018

(65) Prior Publication Data

US 2019/0149890 A1  May 16, 2019

Related U.S. Application Data

(63) Continuation of application No. 15/116,536, filed as application No. PCT/JP2015/000500 on Feb. 4, 2015, now Pat. No. 10,182,268.

(30) Foreign Application Priority Data

Feb. 14, 2014  (JP) ................................. 2014-026224

(51) Int. Cl.
*H04N 21/2362* (2011.01)
*H04N 21/2381* (2011.01)
(Continued)

(52) U.S. Cl.
CPC ... *H04N 21/63345* (2013.01); *H04N 21/2362* (2013.01); *H04N 21/2381* (2013.01);
(Continued)

(58) Field of Classification Search
CPC ......... H04N 21/63345; H04N 21/2362; H04N 21/2381; H04N 21/26606; H04N 21/64322; H04N 21/84
(Continued)

(56) References Cited

U.S. PATENT DOCUMENTS 7,120,253 B2  10/2006 Ducharme
8,520,850 B2 *  8/2013 Helms ................. H04L 63/0428
380/239
(Continued)

FOREIGN PATENT DOCUMENTS

JP   2004-208107 A   7/2004
JP   2008-92432      4/2009
(Continued)

OTHER PUBLICATIONS

Japanese Office Action dated Mar. 30, 2017in Patent Application No. 2014-026224 (with English Translation).
(Continued)

*Primary Examiner* — Nathan J Flynn
*Assistant Examiner* — Caroline Somera
(74) *Attorney, Agent, or Firm* — Oblon, McClelland, Maier & Neustadt, L.L.P.

(57) ABSTRACT

There is provided a receiving apparatus including circuitry that is configured to receive a broadcasting stream including digital data according to an IP (Internet Protocol) having a protocol stack of layers. The circuitry is configured to use a first key acquired based on a first control signal at a first layer to decode a second key included in a second control signal transferred at a second layer, and decrypt an encoded component that corresponds to a particular broadcasting service which is included in a stream obtained through the broadcasting stream, the second layer being a higher layer than the first layer in the protocol stack.

25 Claims, 51 Drawing Sheets

(51) Int. Cl.
*H04N 21/84* (2011.01)
*H04N 21/6334* (2011.01)
*H04N 21/266* (2011.01)
*H04N 21/643* (2011.01)

(52) U.S. Cl.
CPC . *H04N 21/26606* (2013.01); *H04N 21/64322* (2013.01); *H04N 21/84* (2013.01)

(58) Field of Classification Search
USPC .......................................................... 725/116
See application file for complete search history.

(56) References Cited

U.S. PATENT DOCUMENTS

| | | |
|---|---|---|
| 2007/0294170 A1 | 12/2007 | Antalon |
| 2009/0041129 A1 | 2/2009 | Suh |
| 2009/0183211 A1 | 7/2009 | Yan et al. |
| 2009/0187762 A1 | 7/2009 | Okamoto et al. |
| 2010/0050070 A1 | 2/2010 | Suh et al. |
| 2011/0010545 A1 | 1/2011 | Kill et al. |
| 2011/0050070 A1 | 3/2011 | Pickard |
| 2011/0238991 A1 | 9/2011 | Schipper |
| 2012/0102519 A1 | 4/2012 | Kitazato et al. |
| 2013/0152121 A1 | 6/2013 | Bartel-Kurz |
| 2015/0124964 A1 | 5/2015 | Eisen |
| 2015/0281738 A1 | 10/2015 | Suh |
| 2015/0296374 A1 | 10/2015 | Moreillon |
| 2016/0301955 A1 | 10/2016 | Park |

FOREIGN PATENT DOCUMENTS

| | | |
|---|---|---|
| JP | 2010-268091 | 11/2010 |
| JP | 2011-0010545 | 1/2011 |
| JP | 2012-156712 | 8/2012 |
| WO | WO 2008/013287 | 1/2008 |
| WO | WO 2015/12215 A1 | 8/2015 |

OTHER PUBLICATIONS

ETSI, "Digital Video Broadcasting (DVB); IP Datacast over VB-H: Service Purchase and Protection", Technical Specification, ETSI TS 1 02 474 V1.2.1,. Nov. 2009, 308 pages.

* cited by examiner

FIG. 6

SGDU

UNIT HEADER
- OFFSET VALUE WITH RESPECT TO EXTENSION PORTION (EXTENSION)
- THE NUMBER OF FRAGMENTS (FOR EXAMPLE, 1)
    - FRAGMENT ID
    - FRAGMENT VERSION

UNIT PAYLOAD
- FRAGMENT ENCODING TYPE

MPD

EXTENSION
- EXTENSION PORTION TYPE
- OFFSET VALUE WITH RESPECT TO NEXT EXTENSION PORTION
- FILTERING INFORMATION STORAGE PORTION

FIG. 11

| | | | | SCT | |
|---|---|---|---|---|---|
| Element/Attribute(with@) | | | | Cardinality | Description |
| Sct | | | | 1 | Service configuration table |
| | @networkId | | | 1 | Network descriptor<br>Broadcaster ID for each Physical Channel |
| | @name | | | 0..1 | Broadcaster name for each Physical Channel |
| | BBPStream | | | 1..n | BBP stream |
| | | @bbpStreamId | | 1 | BBP stream ID |
| | | @payloadType | | 1 | BBP payload type "ipv4","ipv6","ts" |
| | | @name | | 0..1 | BBP stream name |
| | | ESGBootstrap | | 0..1 | Access information for ESG |
| | | | ESGProvider | 1..n | ESG provider |
| | | | @providerName | 1 | ESG provider name |
| | | | ESGBroadcastLocation | 0..1 | ESG location from broadcast |
| | | | @networkId | 1 | Network ID for ESG service |
| | | | @BBPStreamId | 1 | BBP stream ID for ESG service |
| | | | @ESGServiceId | 1 | Service ID for ESG service |
| | | | ESGBroadbandLocation | 0..1 | ESG location from broadband |
| | | | @ESGurl | 1 | URL for ESG files |
| | | PhysicalParamters | | 0..1 | Physical parameter |
| | | @modulation | | 1 | Modulation |
| | | @frequency | | 1 | Frequency |
| | | CA_Descriptor | | 0..1 | Conditional Access Descriptor |
| | | service | | 1..n | Service |
| | | | @serviceId | 1 | Service ID |
| | | | @serviceType | 1 | Service type "tv","audio","data","nrt", "esg","adjunct-nrt","adjunct-shared" |
| | | | @hidden | 0..1 | Hidden service or not "on","off" |
| | | | @hiddenGuide | 0..1 | Hidden service on ESG "on","off" |
| | | | @shortName | 1 | Short service name ≤7 character |
| | | | @longName | 0..1 | Long service name |
| | | | @accessControl | 0..1 | Access controlled service or not "on","off" |
| | | | SourceOrigin | 1 | Original service as source |
| | | | @country | 1 | Country code |
| | | | @originalNetworkId | 1 | Original network ID |
| | | | @bbpStreamId | 1 | BBP stream ID |
| | | | @serviceId | 1 | Service ID |
| | | | SCSbootstrap | 1 | Access information for service channel |
| | | | @sourceIPAddress | 1 | Source IP address to transmit service |
| | | | @destinationIPAddress | 1 | Destination IP address to transmit service |
| | | | @portNum | 1 | Port number to transmit SCS |
| | | | @tsi | 1 | FLUTE Session TSI to transmit SCS |
| | | | AdjunctServiceDescriptor | 0..n | Associated service |
| | | | @networkId | 0..1 | Network ID |
| | | | @bbpStreamId | 0..1 | BSP stream ID |
| | | | @serviceId | 1 | Service ID |

FIG. 12

| Element/Attribute(with@) | Cardinality | Description |
|---|---|---|
| CA_Descriptor | | Conditional Access Description |
| @Service_platform_ID | 0..1 | BROADCASTING SERVICE PLATFORM ID |
| @CA_SystemId | 1 | ID OF Conditional Access METHOD |
| @groupId | 1 | ID FOR IDENTIFYING EMM OR ECM ONE EMM MAY BE UTILIZED FOR PLURALITY OF TYPES OF BROADCASTING SERVICE, AND ONE ECM MAY BE UTILIZED FOR PLURALITY OF COMPONENTS |
| Location | 1..N | INFORMATION OF ACQUISITION DESTINATION OF EMM OR ECM |
| @LocationType | 1 | ACQUISITION DESTINATION TYPE OF EMM (LLS/Network/NRT) OR ACQUISITION DESTINATION TYPE OF ECM (SCS/Network/NRT/component box) |
| @LocationUri | 1 | ACQUISITION DESTINATION URI OF EMM OR ECM |

| Element/Attribute (with@) | Cardinality | Description |
|---|---|---|
| CAT | 0..1 | Conditional Access Table |
|   CA_Descriptor | 1 | Conditional Access Descriptor |

EMM

| Element/Attribute (with@) | Cardinality | Description |
|---|---|---|
| EMM | 0..1 | entitlement management message |
| @Kw_ID | 1 | WORK KEY ID |
| @Kw | 1 | WORK KEY (ENCODED BY USING MASTER KEY) |
| CONTRACT INFORMATION | 1 | INFORMATION OF BROADCASTING SERVICE CONTRACTED TO RECEIVER |
| @TIER BIT | 1 | CONTRACTED TIER BIT |
| @EMM_group_ID | 0..N | GROUP ID FOR EACH ITEM OF CONTRACTED BROADCASTING SERVICE |
| @VALIDITY TERM | 1 | VALIDITY TERM OF EMM |
| @servicePlatform_ID | 1 | ID OF BROADCASTING SERVICE PLATFORM PROVIDER |
| @EMM_group_ID | 0..1 | ID OF GROUP WHERE EMM BELONGS |
| @serviceNumber | 1 | NUMERAL ALLOCATED FOR EACH ITEM OF BROADCASTING SERVICE |

| SPT |||
|---|---|---|
| Element/Attribute (with@) | Cardinality | Deasription |
| Spt | 1 | Service parameter table |
|   @serviceId | 1 | service identifier (major+minor) |
|   @spIndicator | 0..1 | Service protection off/on |
|   ProtocolVersionDescriptor | 0..1 | Data transmission protocol type&version |
|   NRTServiceDescriptor | 0..1 | NRT service configuration |
|   CapabilityDescriptor | 0..1 | Receiver capability to be required |
|   IconDescriptor | 0..1 | Icon location for NRT service |
|   ISO639LanguageDescriptor | 0..1 | Language for NRT service |
|   ReceiverTargetingDescriptor | 0..1 | Targeting information |
|   AdjunctServiceDescriptor | 0..1 | Pointer to its adjunct service |
|   ContentAdvisoryDescriptor | 0..1 | Rating information |
|   CA_Descriptor | 0..1 | Conditional Access Descriptor |
|   Component | 1..n | Component signal (Elementary Stream) |
|     @ComponentId | 1 | Component identification (Identical to representation_id of MPD) |
|     ComponentEncription | 0..1 | Component level encryption "on". "off" |
|     TargetdDeviceDescriptor | 0..m | Target device indication <Under study> |
|     ContentAdvisoryDescriptor | 0..1 | Rating Information |
|     VideoParameters | 0..1 | Video parameters (mainly depend on codec) |
|     AudioParameters | 0..1 | Audio parameters (mainly depend on codec) |
|     CaptionParameters | 0..1 | Closed Caption parameters |
|     CA_Descriptor | 0..1 | Conditional Access Descriptor |
|     ECM_DeliveryFlag | 0..1 | ECM Delivery Flag (used for ECM delivery by NRT) |

ASD

| Element/Attribute (with@) | Cardinality | Description |
|---|---|---|
| ASD | 0..1 | Adjunct Service Descriptor |
| @Network_ID | 1 | Network ID |
| @BBP_Stream_ID | 1 | BBP Stream ID |
| @Service_ID | 1 | Service ID |
| @Selection Flag | 1 | Indicate ECM delivery channel, 'main' or 'adjunct' |

FIG. 17

ECM

| Element/Attribute(with@) | Cardinality | Description |
|---|---|---|
| ECM | 0..1 | entitlement control message |
| @Kw_ID | 1 | WORK KEY ID |
| @KsNumber | 1 | THE NUMBER (N) OF SCRAMBLE KEYS |
| @Ks_ID | 1..N | SCRAMBLE KEY ID |
| @Ks | 1..N | SCRAMBLE KEY |
| @CONTRACT INFORMATION | 1 | CONTRACT INFORMATION TARGETED BY ECM |
| @servicePlatform_ID | 1 | ID OF BROADCASTING SERVICE PLATFORM PROVIDER |
| @serviceNumber | 1 | NUMERAL ALLOCATED FOR EACH ITEM OF BROADCASTING SERVICE |
| @date | 1 | VALIDITY DATE |

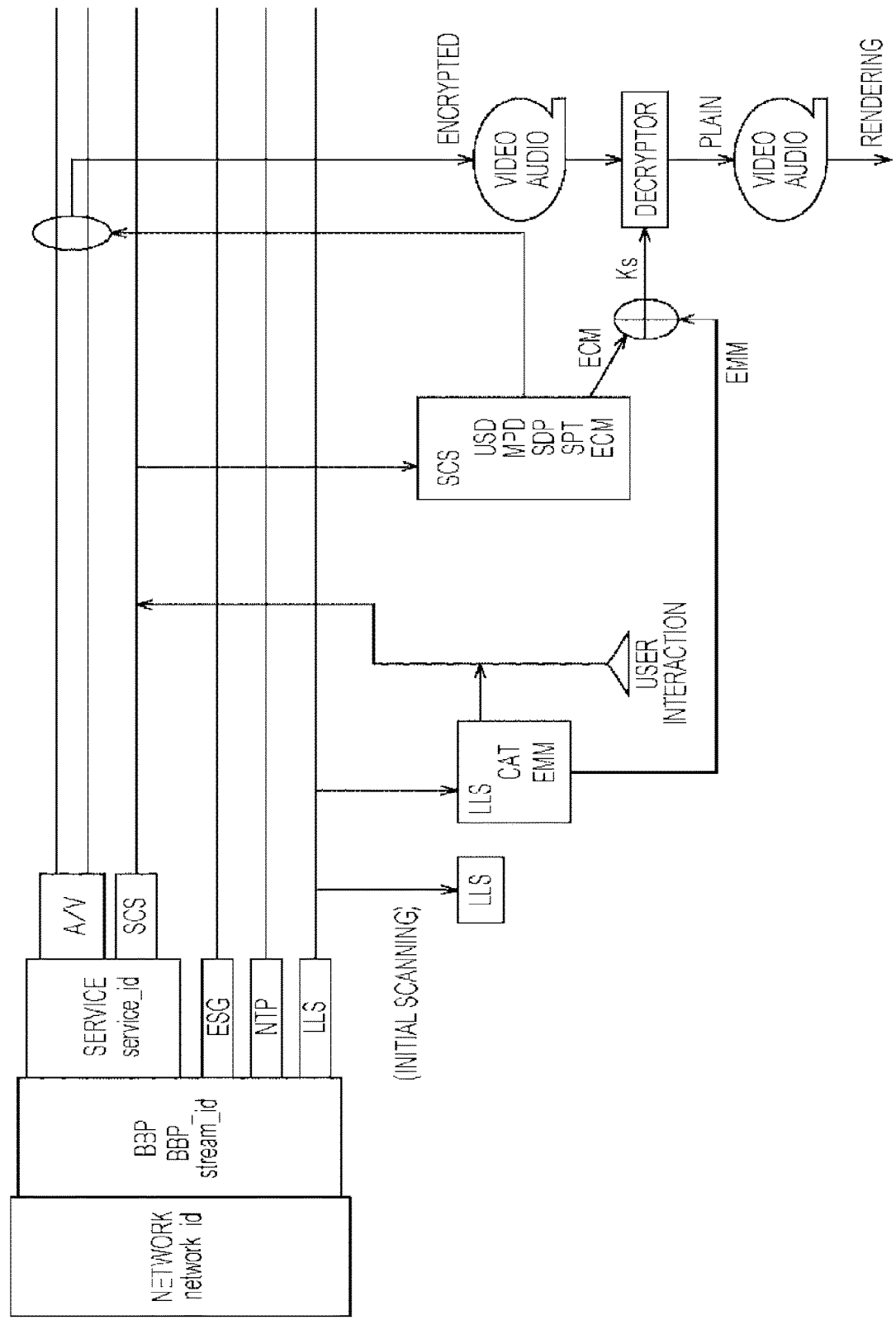

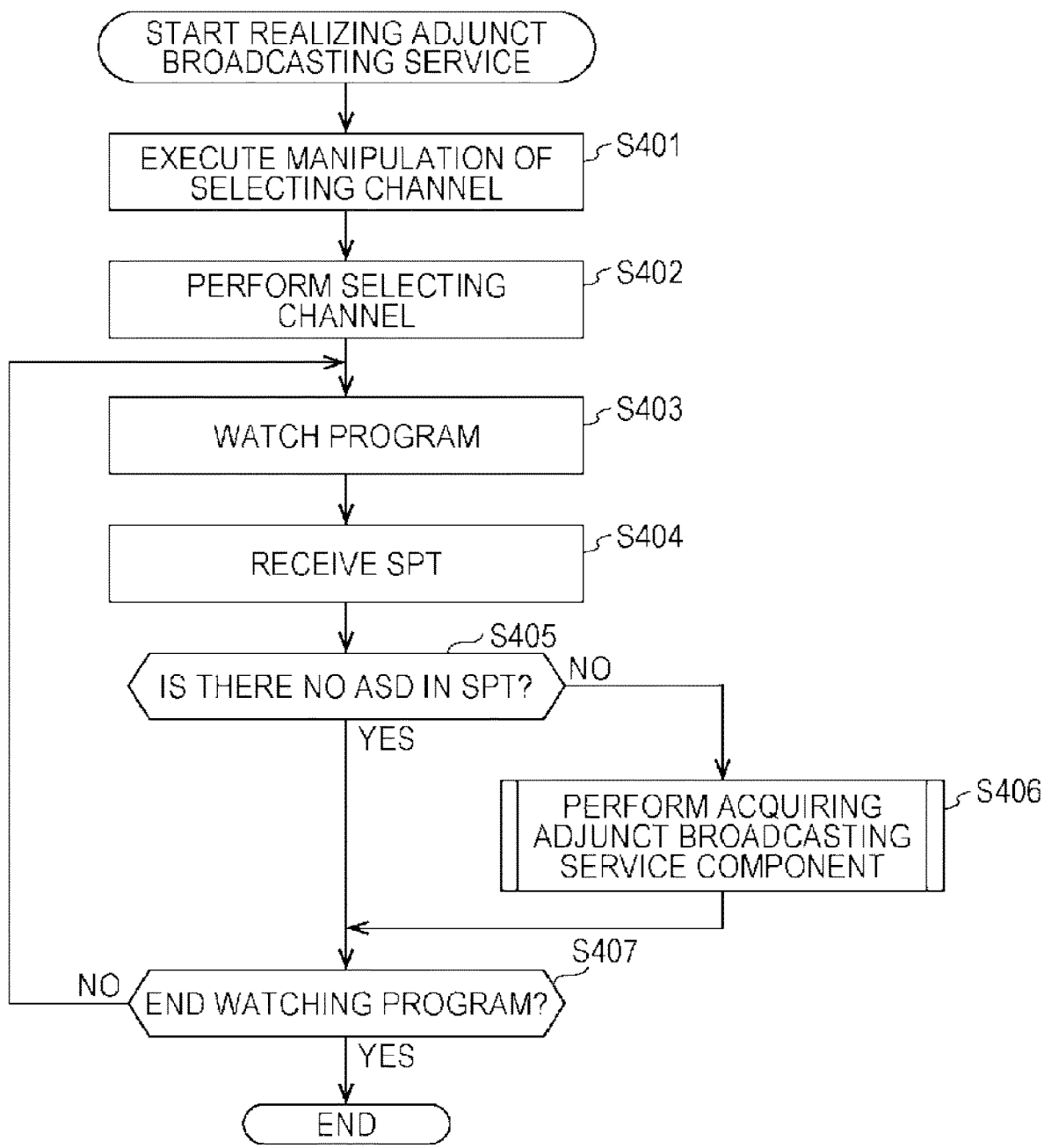

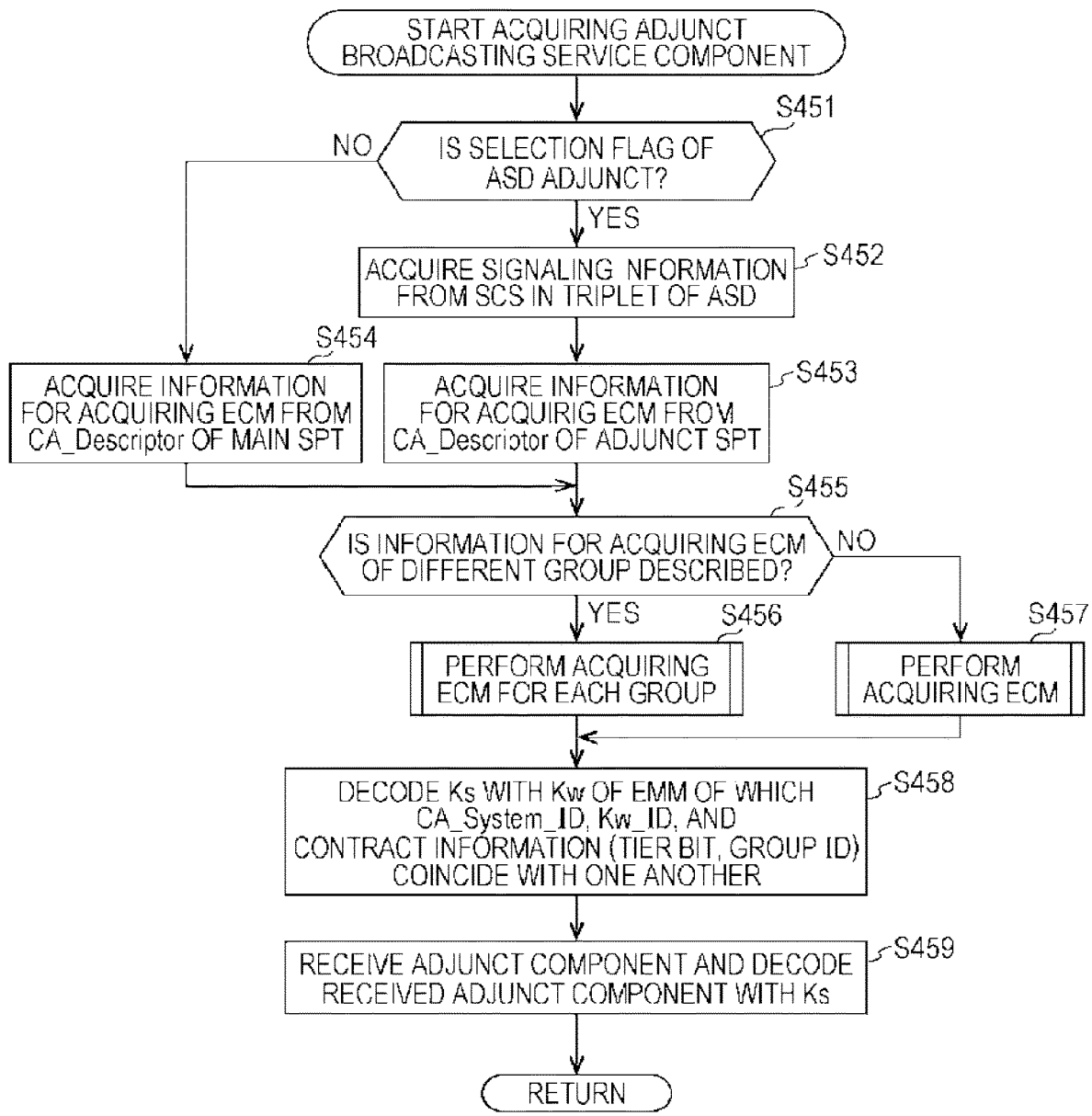

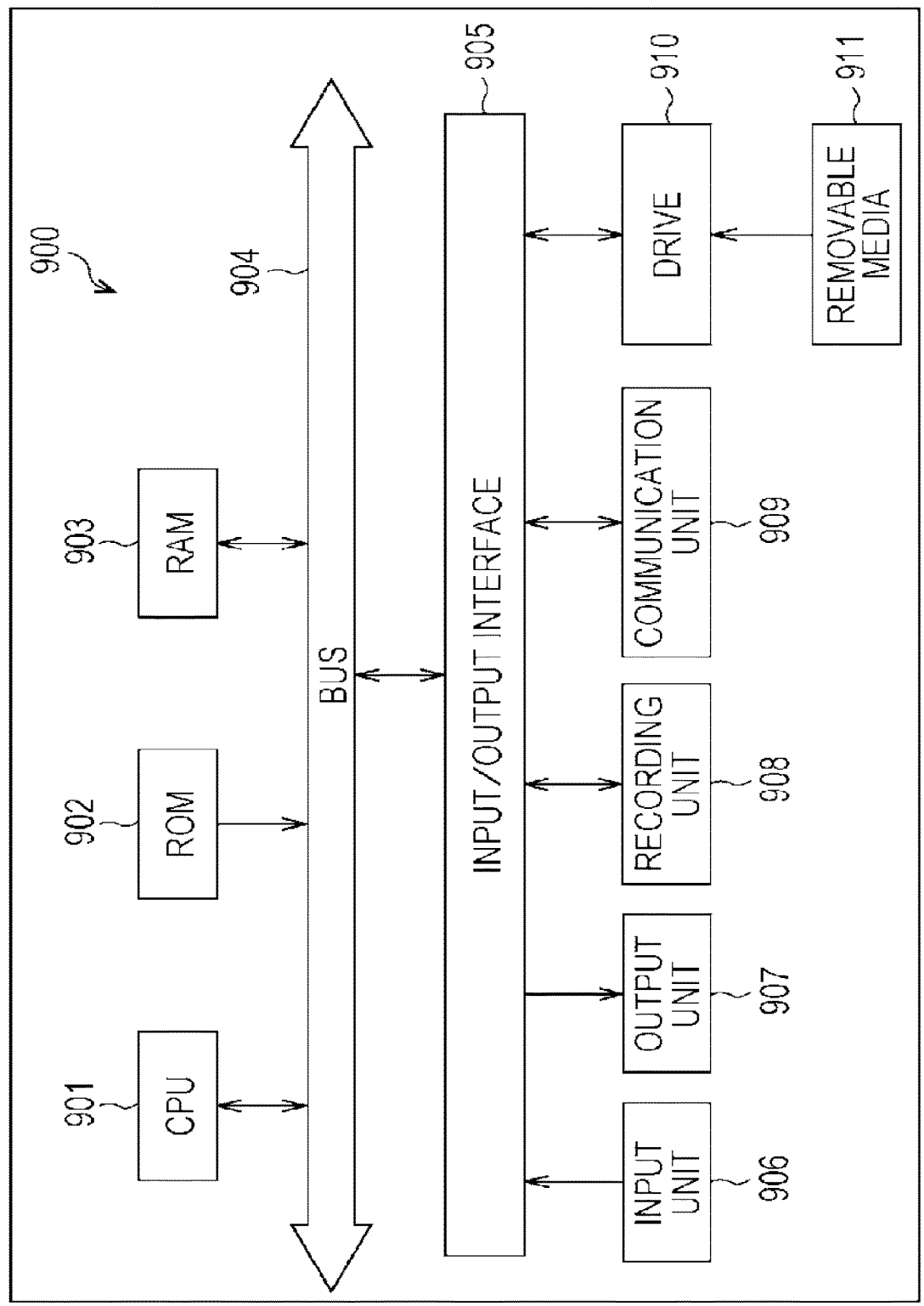

RECEIVING APPARATUS, RECEIVING METHOD, TRANSMITTING APPARATUS, AND TRANSMITTING METHOD

CROSS REFERENCE TO RELATED APPLICATIONS

This application is a continuation application of U.S. application Ser. No. 15/116,536, filed Aug. 4, 2016, which is a U.S. National Phase of International Patent Application No. PCT/JP2015/000500 filed on Feb. 4, 2015, which claims priority benefit of Japanese Patent Application No. 2014-026224 filed in the Japan Patent Office on Feb. 14, 2014. Each of the above-reference applications is hereby incorporated herein by reference in its entirety.

TECHNICAL FIELD

The present technology relates to a receiving apparatus, a receiving method, a transmitting apparatus, and a transmitting method, and particularly relates to a receiving apparatus, a receiving method, a transmitting apparatus, and a transmitting method in each of which content can be protected in accordance with an operational form thereof in digital broadcasting adopting an IP transferring method.

BACKGROUND ART

In a digital broadcasting standard in many nations, an MPEG2-TS (moving picture experts group phase 2-transport stream) method is employed as a transferring format (for example, refer to PTL 1). In future, it is assumed that an IP transferring method in which an IP (Internet Protocol) packet used in the communications field is adopted in digital broadcasting is introduced, thereby providing further advanced broadcasting service.

CITATION LIST

Patent Literature

[PTL 1]
Japanese Unexamined Patent Application Publication No. 2012-156712

SUMMARY OF INVENTION

Technical Problem

Incidentally, digital broadcasting employs a technology to protect content such as a CAS (Conditional Access System). Meanwhile, in digital broadcasting adopting an IP transferring method, it is assumed that an operational form to provide further advanced broadcasting service can be utilized, but no technical method is established regarding content protection in accordance with such an operational form.

According to an embodiment of the present technology, it is desirable to protect content in accordance with the operational form in the digital broadcasting adopting the IP transferring method.

Solution to Problem

A receiving apparatus according to a first embodiment of the present technology includes circuitry that is configured to receive a broadcasting wave that transfers digital data according to an IP (Internet Protocol) having a protocol stack of layers, wherein the circuitry is further configured to implement a first decoder that uses a first key transferred in a first control signal at a first layer to decode a second key acquired in a second control signal transferred at a second layer, the second layer being a higher layer than the first layer in the protocol stack, and a second decoder that uses the decoded second key to decode an encoded component that configures a particular broadcasting service which is included in a stream obtained through the broadcasting wave.

The first control signal may transfer first signaling information in which location information for acquiring a first descriptor including at least the first key is described. The second control signal may transfer second signaling information in which location information for acquiring a second descriptor including at least the second key is described. The first descriptor may be acquired based on the location information described in the first signaling information. The second descriptor may be acquired based on the location information described in the second signaling information.

The first descriptor may be transferred by utilizing the first control signal, a communication network, or NRT (Non-RealTime) broadcasting. The second descriptor may be transferred by utilizing the second control signal, the communication network, the NRT broadcasting, or the component.

An encoding method may conform to a CAS (Conditional Access System) method. The first descriptor may be an EMM (Entitlement Management Message). The second descriptor may be an ECM (Entitlement Control Message). The first key may be encoded by using a third key.

Contract information through which viewing-listening propriety for each component can be checked may be further included in the EMM and the ECM.

A group ID for identifying a particular group may be further included in the EMM and the ECM.

The EMM or the ECM of the particular group identified by the group ID may be respectively used out of a plurality of the EMMs or a plurality of the ECMs.

First broadcasting service and second broadcasting service which is related to the first broadcasting service may be provided. An encoded component configuring the first broadcasting service may be decoded by using the second key acquired from the ECM of the first broadcasting service. An encoded component configuring the second broadcasting service may be decoded by using the second key acquired from the ECM of the first broadcasting service or the ECM of the second broadcasting service.

The second layer out of the layers of the protocol of the IP transferring method may be a layer upper than an IP layer. A common IP address may be allocated to the encoded component configuring each item of the broadcasting service and the second control signal.

The receiving apparatus may be an individual apparatus and may be an inner block configuring one apparatus.

A receiving method according to the first embodiment of the present technology is the receiving method corresponding to the receiving apparatus according to the first embodiment of the present technology.

In the receiving apparatus and the receiving method according to the first embodiment of the present technology, a broadcasting wave of digital broadcasting adopting an IP transferring method is received. A second key acquired in accordance with a second control signal transferred at a second layer which is a layer upper than a first layer is decoded by using a first key acquired in accordance with a first control signal transferred at the first layer out of layers of a protocol of the IP transferring method through the broadcasting wave. An encoded component configuring particular broadcasting service which is included in a stream obtained through the broadcasting wave is decoded by using the decoded second key.

A transmitting apparatus according to a second embodiment of the present technology includes
circuitry that
acquires one or a plurality of components that configure various items of a broadcasting service,
acquires a first control signal used to acquire a first key and a second control signal used to acquire a second key,
encode a component with the second key that has been encoded with the first key, and
transmit a broadcasting wave that transfers digital data according to an IP (Internet Protocol) having a protocol stack of layers, wherein the broadcasting wave includes a stream that has an encoded component that configures a particular broadcasting service, the first control signal and the second control signal, the first control signal being transferred at the first layer out and the second control signal being transferred at the second layer, the second control layer being a higher layer than the first layer in the protocol stack.

The first control signal may transfer first signaling information in which location information for acquiring a first descriptor including at least the first key is described. The second control signal may transfer second signaling information in which location information for acquiring a second descriptor including at least the second key is described.

The first descriptor may be transferred by utilizing the first control signal, a communication network, or NRT broadcasting. The second descriptor may be transferred by utilizing the second control signal, the communication network, the NRT broadcasting, or the component.

An encoding method may conform to a CAS method. The first descriptor may be an EMM. The second descriptor may be an ECM. The first key may be encoded by using a third key.

Contract information through which viewing-listening propriety for each component can be checked may be further included in the EMM and the ECM.

A group ID for identifying a particular group may be further included in the EMM and the ECM.

The EMM or the ECM of the particular group identified by the group ID may be respectively used out of a plurality of the EMMs or a plurality of the ECMs.

First broadcasting service and second broadcasting service which is related to the first broadcasting service may be provided. An encoded component configuring the first broadcasting service may be decoded by using the second key acquired from the ECM of the first broadcasting service. An encoded component configuring the second broadcasting service may be decoded by using the second key acquired from the ECM of the first broadcasting service or the ECM of the second broadcasting service.

The second layer out of the layers of the protocol of the IP transferring method is a layer upper than an IP layer. A common IP address is allocated to the encoded component configuring each item of the broadcasting service and the second control signal.

The transmitting apparatus may be an individual apparatus and may be an inner block configuring one apparatus.

A transmitting method according to the second embodiment of the present technology is the transmitting method corresponding to the transmitting apparatus according to the second embodiment of the present technology.

In the transmitting apparatus and the transmitting method according to the second embodiment of the present technology, one or the plurality of components configuring various items of broadcasting service are acquired. The first control signal for acquiring the first key and the second control signal for acquiring the second key are acquired. The component is encoded by using the second key which is encoded by using the first key. A broadcasting wave in which an IP transferring method including a stream which has an encoded component configuring particular broadcasting service, and the first control signal and the second control signal is adopted, and through which the first control signal is transferred at the first layer out of layers of a protocol of the IP transferring method and the second control signal is transferred at the second layer which is a layer upper than the first layer is transmitted.

Advantageous Effects of Invention

According to the first embodiment and the second embodiment of the present technology, content can be protected in accordance with an operational form thereof in digital broadcasting adopting an IP transferring method.

The effect disclosed herein is not necessarily limited and may be any one of the effects in the present disclosure.

BRIEF DESCRIPTION OF DRAWINGS

FIG. 6 is a diagram illustrating a structure of an SGDU.

FIG. 11 is a diagram illustrating syntax of an SCT.

FIG. 12 is a diagram illustrating syntax of a CA Descriptor.

FIG. 13 is a diagram illustrating syntax of a CAT.

FIG. 14 is a diagram illustrating syntax of the EMM.

FIG. 15 is a diagram illustrating syntax of an SPT.

FIG. 16 is a diagram illustrating syntax of an Adjunct-ServiceDescriptor.

FIG. 17 is a diagram illustrating syntax of the ECM.

FIG. 18 is a diagram illustrating an operational example in a case of acquiring the EMM from the LLS.

FIG. 49 is a flowchart illustrating realizing of the adjunct broadcasting service.

FIG. 50 is a flowchart illustrating details of acquiring of an adjunct broadcasting service component.

FIG. 51 is a diagram illustrating a configuration example of a computer.

DESCRIPTION OF EMBODIMENTS

Hereinafter, an embodiment of the present technology will be described with reference to the drawings. However, the descriptions will be given in the following order.

1. Overview of Digital Broadcasting by IP Transferring Method
2. Details of Signaling Information
 (1) Structure of Signaling Information
 (2) Structure of Data of LLS and SCS
3. Operational Example
4. Broadcasting Service and Key Layer Model
5. CAS Related Information
6. Application Example of another Scramble Method
7. Configuration of Broadcasting Communication System
8. Flow of Specific Processing Executed in Each Apparatus
9. Configuration of Computer 1. Overview of Digital Broadcasting by IP Transferring Method (Protocol Stack)

Figure 1:
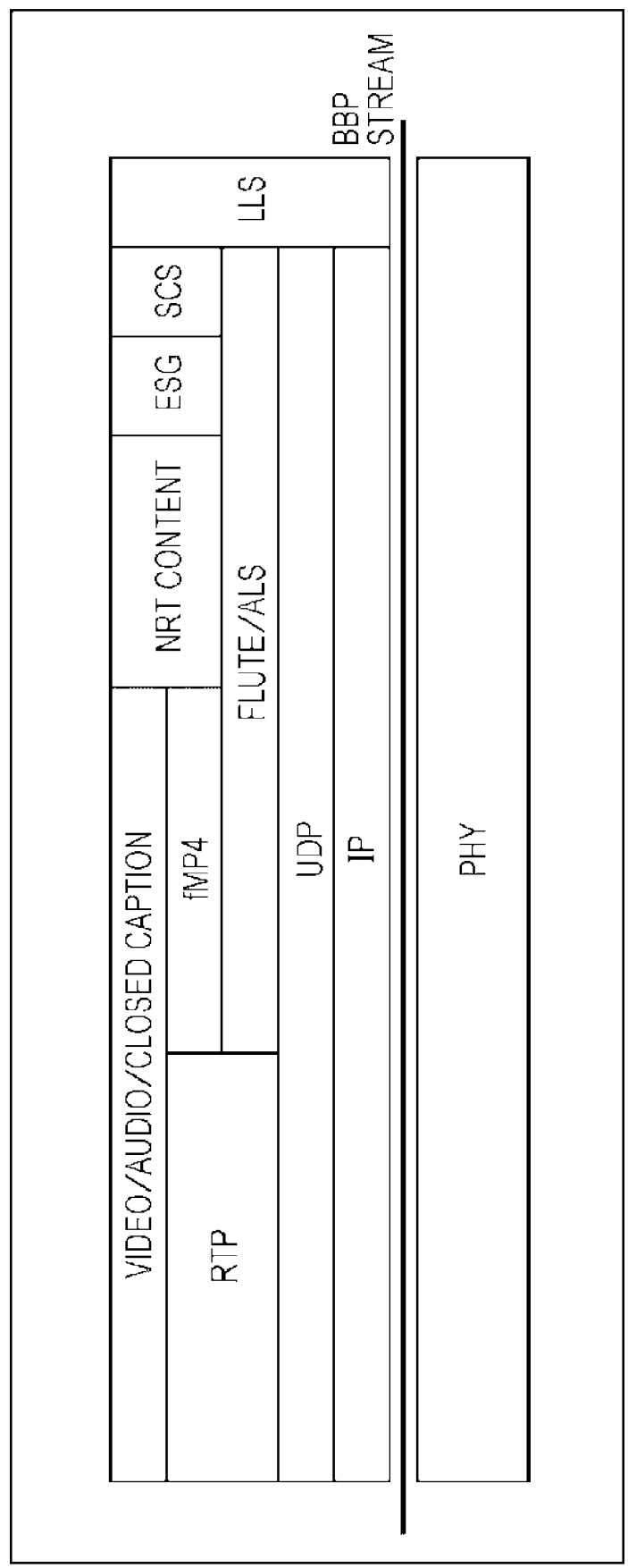
FIG. 1 is a diagram illustrating a protocol stack of digital broadcasting of an IP transferring method.

FIG. 1 is a diagram illustrating a protocol stack of digital broadcasting of an IP transferring method.

As illustrated in FIG. 1, the lowermost layer is a physical layer (Physical Layer), and a frequency band of a broadcasting wave allocated for broadcasting service (channel) corresponds thereto. An upper layer adjacent to the physical layer is an IP layer interposing a BBP stream (Base Band Packet Stream) therebetween. The BBP stream is a stream including a packet in which various types of data are stored, in the IP transferring method.

The IP layer corresponds to an IP (Internet Protocol) in a protocol stack of TCP/IP, and an IP packet is specified by an IP address. An upper layer adjacent to the IP layer is a UDP layer, and a layer upper than thereof includes an RTP and FLUTE/ALC (Asynchronous Layered Coding). That is, in the digital broadcasting of the IP transferring method, a packet having a port number of a UDP (User Datagram Protocol) designated is transmitted so as to establish an RTP (Real-time Transport Protocol) session or a FLUTE (File Delivery over Unidirectional Transport) session, for example. In detail, the FLUTE is defined to be RFC3926.

An upper layer adjacent to the FLUTE/ALC is an fMP4 (Fragmented MP4). An upper layer adjacent to the RTP and the fMP4 includes video data (Video), audio data (Audio), and closed caption data (Closed Caption). That is, when transferring video data or audio data through a stream format, an RTP session is utilized. When transferring video data or audio data through a file format, a FLUTE session is utilized.

The upper layer of the FLUTE/ALC includes an NRT content (NRT Content), an ESG, and SCS. The NRT content, the ESG, and the SCS are transferred by the FLUTE session. The NRT content is content transferred through NRT (Non-RealTime) broadcasting, and reproducing thereof is performed after being once accumulated in storage of a receiver. The NRT content is an example of content so that a file of a different content may be transferred by the FLUTE session. The ESG (Electronic Service Guide) is an electronic broadcasting service guide.

SCS (Service Channel Signaling) is signaling information per item of broadcasting service and is transferred by the FLUTE session. For example, as the SCS, a USD (User Service Description), an MPD (Media Presentation Description), a SDP (Session Description Protocol), an SPT (Service Parameter Table), and an ECM (Entitlement Control Message) are transferred.

LLS (Low layer signaling) is the signaling information at a low layer, and is transferred through the BBP stream. For example, as the LLS, a SCT (Service Configuration Table), a SAT (Service Association Table), a CAT (Conditional Access Table), an EMM (Entitlement Management Message), an EAT (Emergency Alerting Table), and an RRT (Region Rating Table) are transferred.

(ID System of IP Transferring Method)

Figure 2:
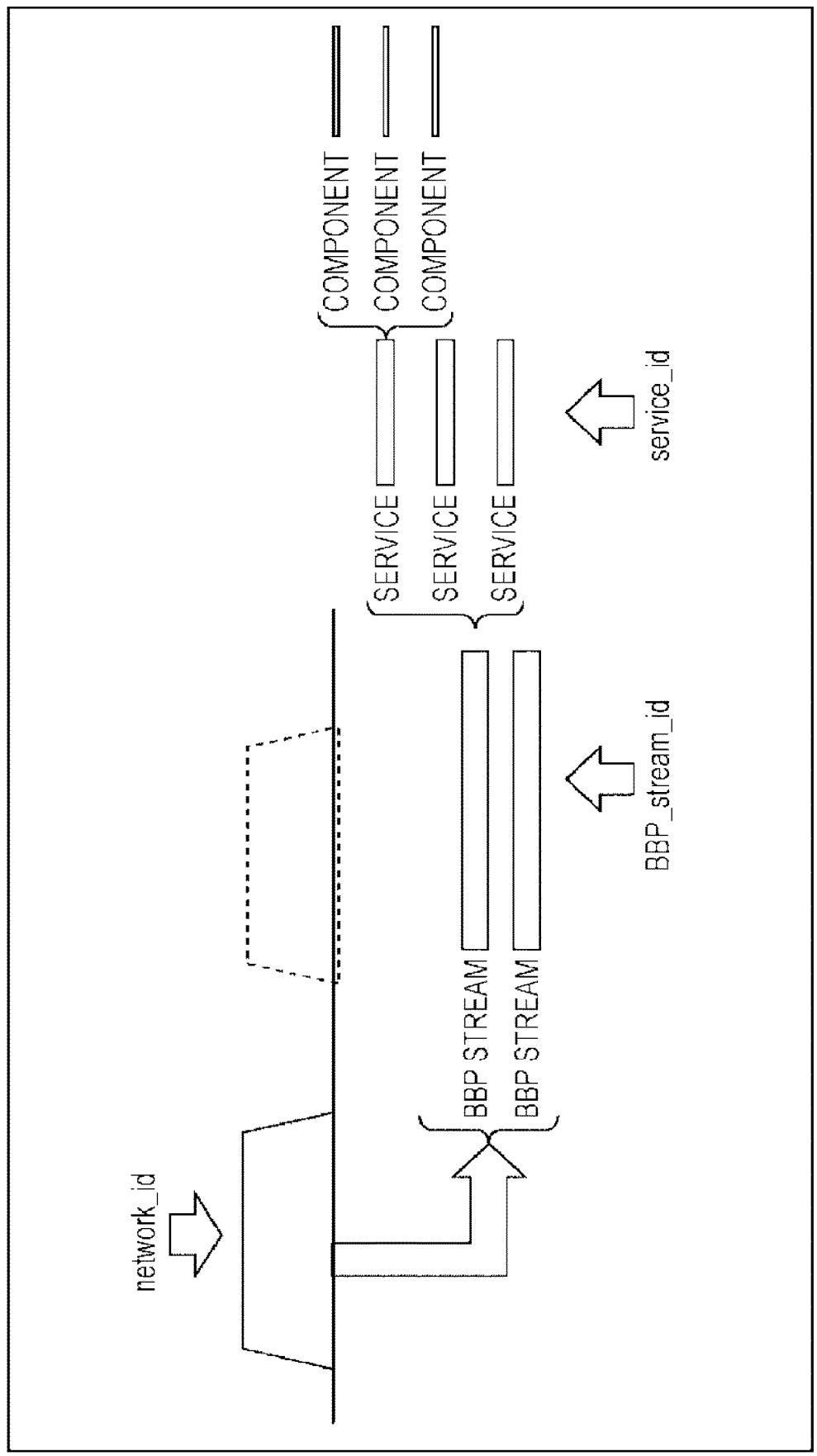
FIG. 2 is a diagram illustrating a relationship between a signal of a broadcasting wave of the digital broadcasting adopting the IP transferring method and an ID system of the IP transferring method.

FIG. 2 is a diagram illustrating a relationship between a signal of a broadcasting wave of the digital broadcasting adopting the IP transferring method and an ID system of the IP transferring method.

As illustrated in FIG. 2, a network ID (hereinafter, also referred to as "network_id" or "networkId") is allocated to a broadcasting wave (a broadcasting network (Network)) having a predetermined frequency band (6 MHz). Each broadcasting wave includes one or a plurality of the BBP streams identified by a BBP stream ID (hereinafter, also referred to as "BBP_stream_id" or "BBPStreamId"). The BBP stream is configured to have a plurality of BBP packets each of which is formed with a BBP header and a payload.

Each BBP stream includes one or a plurality of items of the broadcasting service (Service) identified by a broadcasting service ID (hereinafter, also referred to as "broadcasting service_id" or "ServiceId"). Each item of the broadcasting service is configured to have one or a plurality of components (Component). Each component is information configuring a program such as the video data, the audio data, and the closed caption data, for example.

In this manner, as the ID system of the IP transferring method, a configuration corresponding to a combination (hereinafter, referred to as "triplet (Triplet)") of a network ID (network_id), a transport stream ID (transport_stream_id), and the broadcasting service ID (broadcastingservice_id) adopted in an MPEG2-TS method is employed. A configuration of the BBP stream and a configuration of the broadcasting service in a broadcasting network are indicated by the triplet. However, in the ID system of the IP transferring method, the BBP stream ID is used instead of the transport stream ID.

Accordingly, conformity can be achieved with respect to the MPEG2-TS method which is currently in wide use. Therefore, for example, it is possible to easily cope with a simulcast at the time of shifting from the MPEG2-TS method to the IP transferring method.

(Configuration of Broadcasting Wave of IP Transferring Method)

Figure 3:
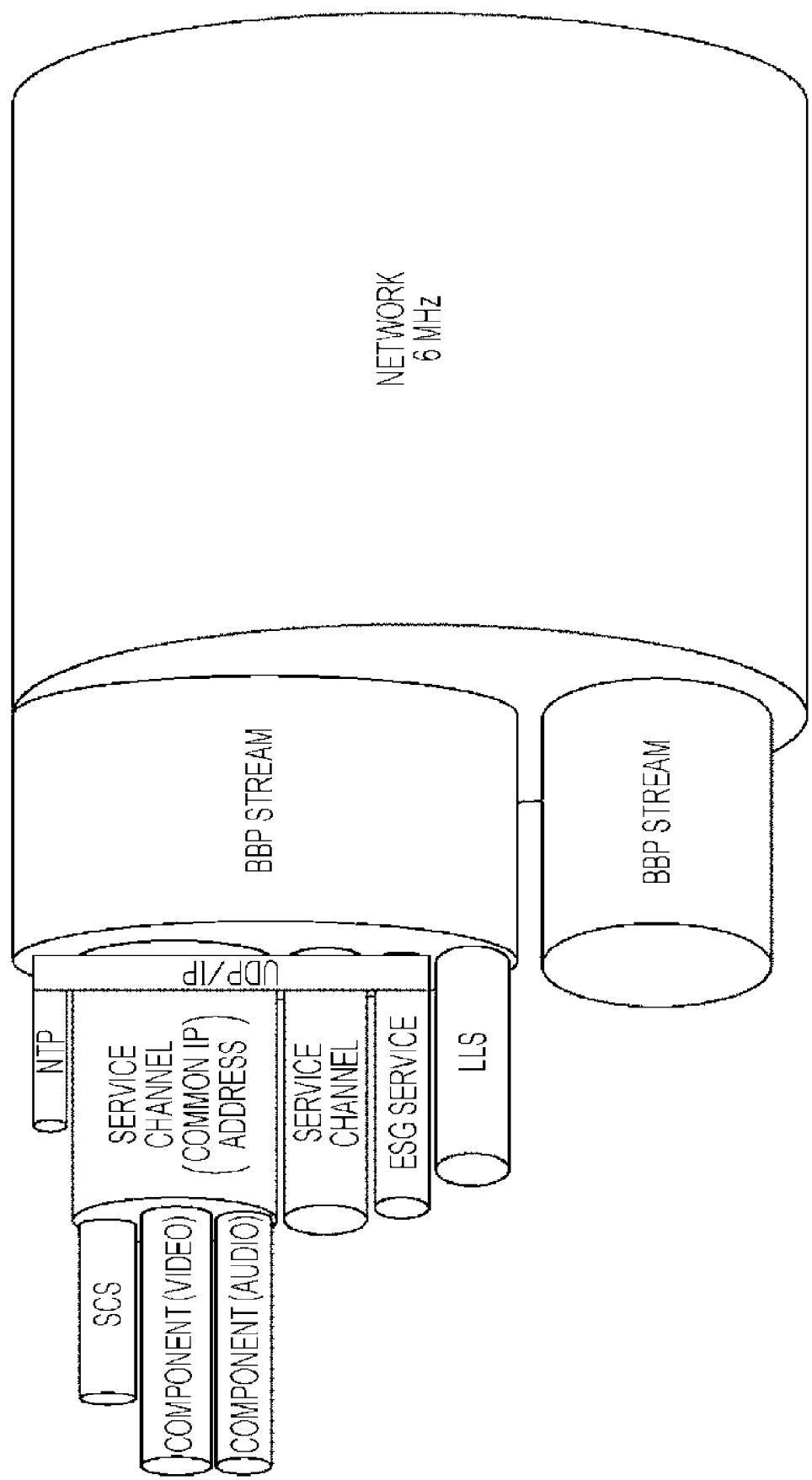
FIG. 3 is a diagram illustrating a configuration of a broadcasting wave of the digital broadcasting of the IP transferring method.

FIG. 3 is a diagram illustrating a configuration of a broadcasting wave of the digital broadcasting of the IP transferring method.

As illustrated in FIG. 3, a plurality of the BBP streams are transferred to a broadcasting wave ("network" in the drawing) having a predetermined frequency band (6 MHz). Each BBP stream includes an NTP (Network Time Protocol), a plurality of broadcasting service channels (Service Channel), an electronic broadcasting service guide (ESG service), and the LLS. However, the NTP, the broadcasting service channel, and the electronic broadcasting service guide are transferred based on the UDP/IP protocol, but the LLS is transferred through the BBP stream. The NTP is time information common for the plurality of broadcasting service channels.

Each broadcasting service channel includes the component (Component) such as video data and audio data, and the SCS such as SPT or SDP. A common IP address is applied to each broadcasting service channel, and thus, the component and a control signal can be packaged for one or each of the plurality of broadcasting service channels using the IP address. In FIG. 3, a network (Network), the BBP stream (BBP Stream), and the component (Component) correspond to FIG. 2, but the broadcasting service channel (Service Channel) corresponds to the broadcasting service (Service) in FIG. 2.

(Configuration of LLS)

Figure 4:
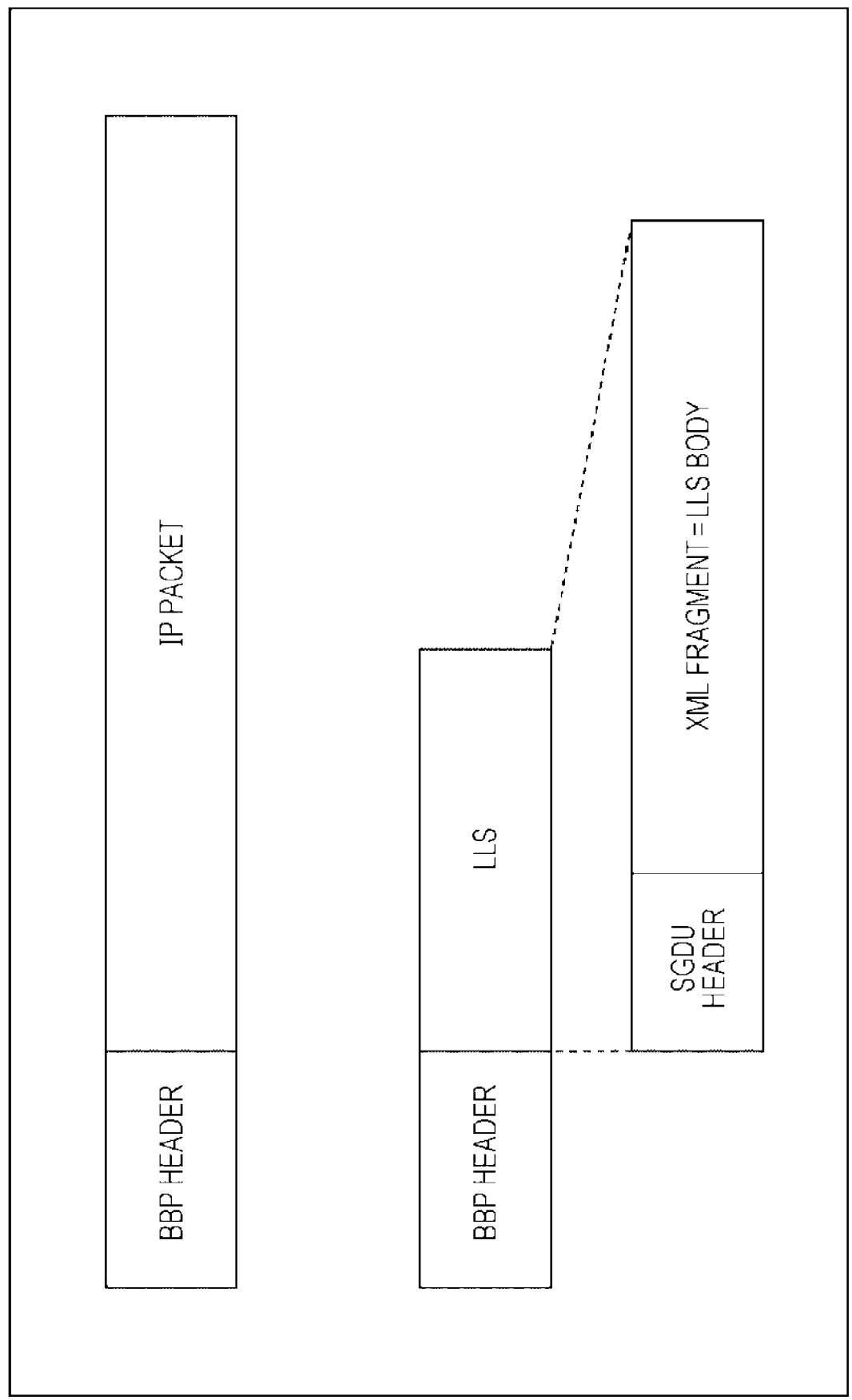
FIG. 4 is a diagram illustrating a configuration of an LLS in the IP transferring method.

FIG. 4 is a diagram illustrating a configuration of the LLS in the IP transferring method.

As illustrated in FIG. 4, the BBP packet is configured to have the BBP header and the payload. When the IP packet is transferred through the BBP stream, the payload portion becomes the IP packet.

When the LLS is transferred through the BBP stream, the LLS is arranged next to the BBP header. As the LLS, for example, the SCT or the SAT described in an XML (Extensible Markup Language) format is arranged such that an SGDU header is added, having an XML fragment (XML fragment) which is a portion of the data thereof as an LLS body. Accordingly, the SCT and the SAT are transferred by a SGDU container (Service Guide Delivery Unit Container).

The BBP header includes type information of 2-bit, and it is possible to distinguish whether the BBP packet is the IP packet or the LLS based on the type information.

(Configuration of SCS)

Figure 5:
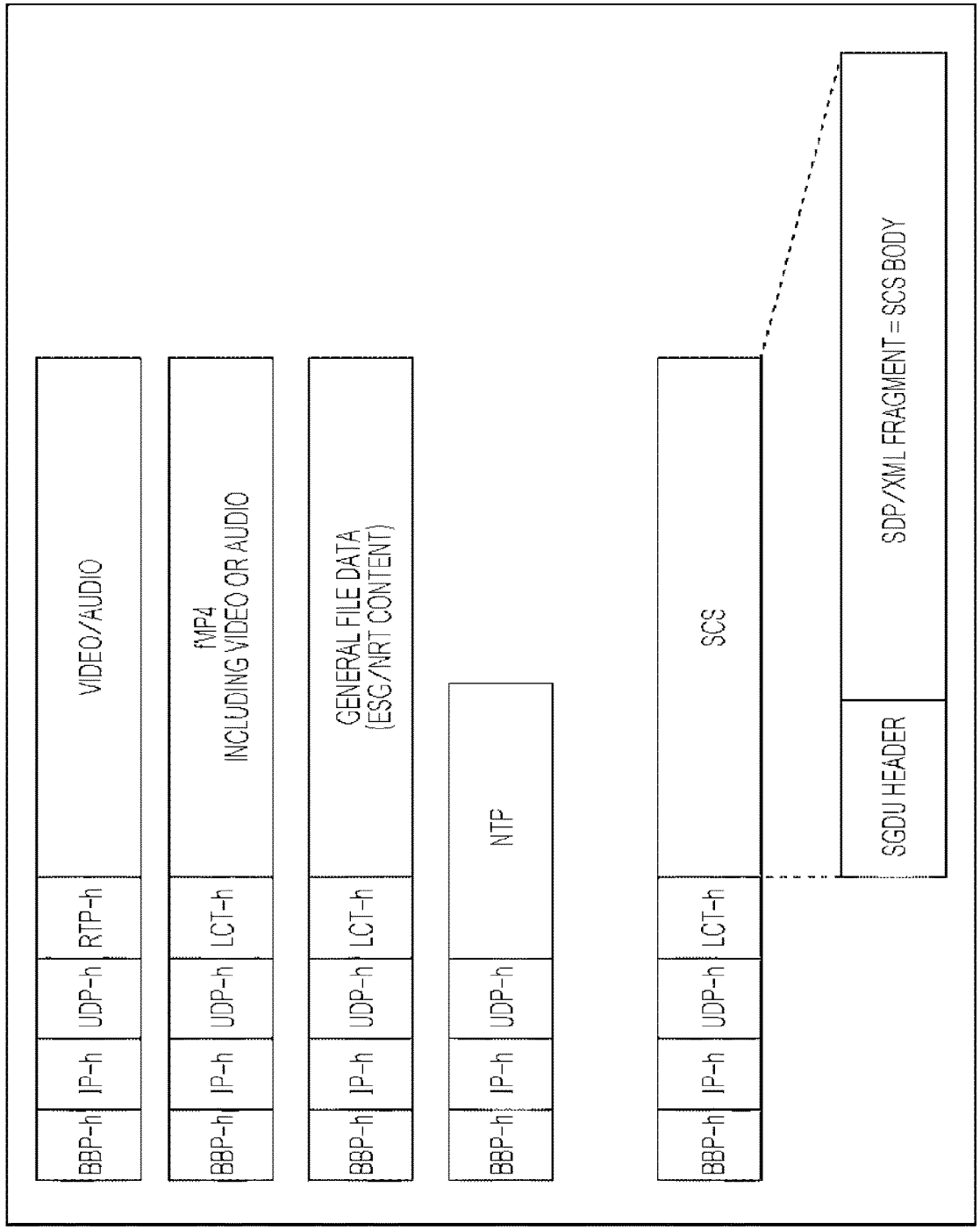
FIG. 5 is a diagram illustrating a configuration of SCS in the IP transferring method.

FIG. 5 is a diagram illustrating a configuration of the SCS in the IP transferring method.

As illustrated in FIG. 5, for example, since the RTP session is utilized when the video data and the audio data are transferred through the stream format, each of the headers of a BBP, an IP, the UDP, and the RTP is added to the payload. Since the FLUTE session is utilized when file data such as an fMP4, the ESG, and the NRT content are transferred through a file format, each of the headers of the BBP, the IP, the UDP, and an LCT is added to the payload. Moreover, since the NTP is a layer upper than the UDP layer, the NTP is arranged next to each of the headers of the BBP, the IP, and the UDP.

Since the SCS is transferred by utilizing the FLUTE session, the SCS is arranged next to each of the headers of the BBP, the IP, the UDP, and the LCT. As the SCS, for example, the SPT or the SDP is arranged, such that the SGDU header is added, having an SDP fragment (SDP fragment) which is a portion of the data thereof as an SCS body. Accordingly, the SDP is transferred by the SGDU container. Without being limited to the SDP fragment to be arranged as the SCS body, for example, the XML fragment (XML fragment) of the SPT described in an XML format can be arranged so as to transfer by the SGDU container.

(Structure of SGDU)

FIG. 6 is a diagram illustrating a structure of an SGDU described in FIGS. 4 and 5. The SGDU is employed as a standard of an OMA (Open Mobile Alliance).

As illustrated in FIG. 6, the SGDU (Service Guide Delivery Unit) is configured to have header information (Unit Header) and the payload (Unit Payload). An extension portion (extension) is arranged in the SGDU as necessary.

Header information and a fragment version are arranged in the header information in accordance with the number of fragments (for example, one). The header information indicates fragment identification. For example, the signaling information (for example, the MPD or the SDP) is identified by the header information. The fragment version indicates the version number of a fragment.

At least one item of actual data between the XML fragment (XML fragment) and the SDP fragment (SDP fragment) is arranged in the payload. That is, data of fragments corresponding to the number designated by the header information is arranged in the payload. Here, for example, a plurality of the fragments are arbitrarily combined to be arranged in the payload such that both fragments of the XML fragment and the SDP fragment are arranged. Here, a fragment encoding type indicating a type of encoding of the fragment is arranged together with the actual data.

When arranging the extension portion, the type information of the extension portion is arranged together with extension data. A position of the extension portion can be indicated by designating an offset value in the header information. Information regarding filtering is stored in a filtering information storage unit.

2. Details of Signaling Information
(1) Structure of Signaling Information

Figure 7:
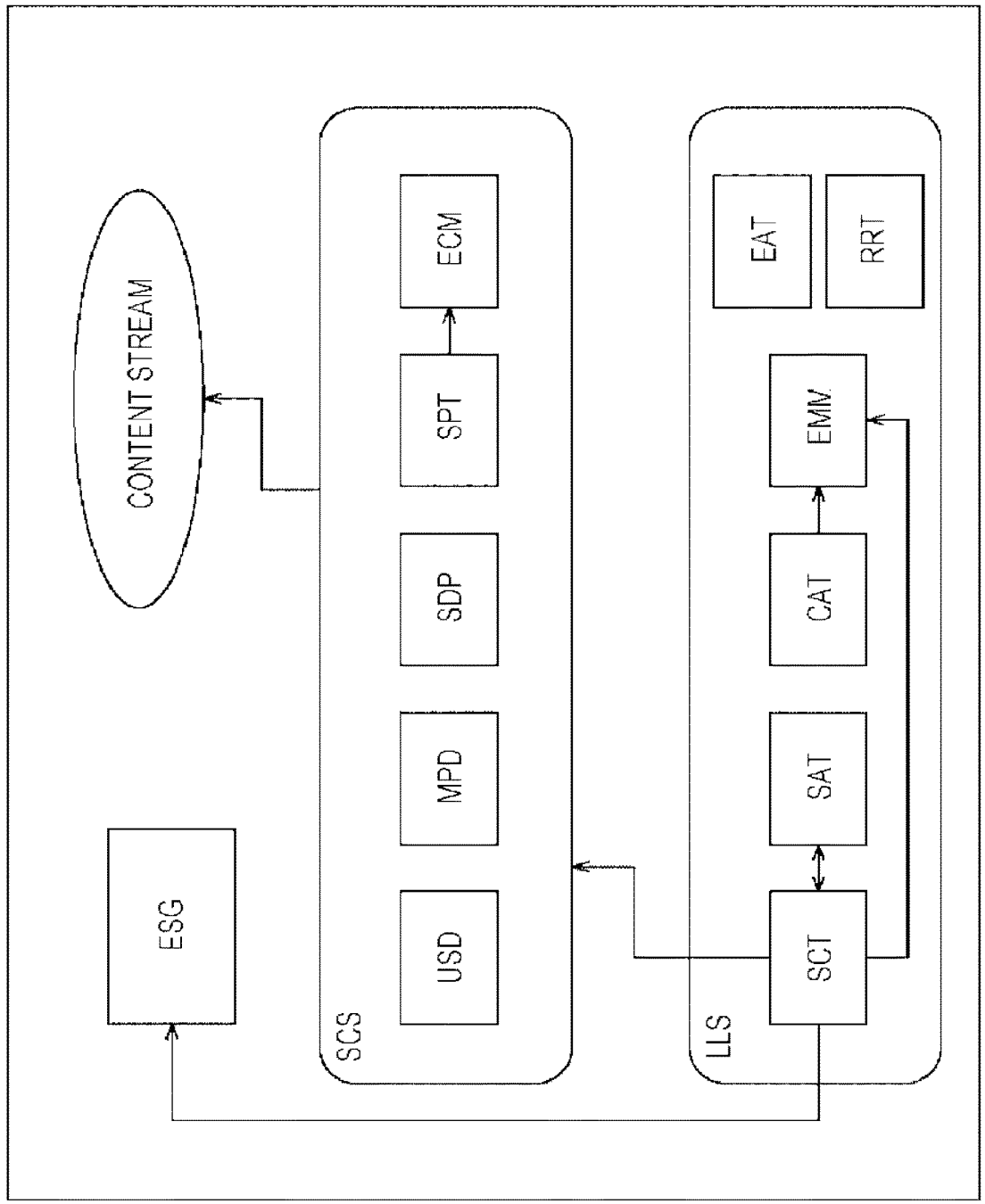
FIG. 7 is a diagram illustrating a structure of signaling information.

FIG. 7 is a diagram illustrating a structure of the signaling information.

As illustrated in FIG. 7, as the LLS (Low Layer Signaling) transferred through the BBP stream, for example, the SCT, the SAT, the CAT, the EMM, the EAT, and the RRT are transferred.

The SCT (Service Configuration Table) employs an ID system corresponding to the triplet adopted in the MPEG2-TS method. The configuration of the BBP stream and the configuration of the broadcasting service in the broadcasting network are indicated by the triplet. The SCT includes bootstrap information for access to information (for example, the IP address as property/setting information per broadcasting service), the ESG (Electronic Service Guide), and the SCS.

The SAT (Service Association Table) indicates broadcasting service on the air for each BBP stream. On account of the SAT, it is possible to determine whether or not particular broadcasting service is on the air.

The CAT (Conditional Access Table) includes a CA descriptor (CA_Descriptor) in which information regarding acquisition of the EMM (hereinafter, referred to as "information for acquiring the EMM") is described. The EMM (Entitlement Management Message) includes contract information of a work key (Kw) and the receiver. Since the EMM is acquired based on a description of the CA_Descriptor, the EMM may be acquired from other than the LLS. The CA_Descriptor may also be described in the SCT instead of the CAT.

The EAT (Emergency Alerting Table) includes information regarding emergency notification. The RRT (Region Rating Table) includes rating information.

As illustrated in FIG. 7, as the SCS (Service Channel Signaling) transferred through the FLUTE session, for example, the USD, the MPD, the SDP, the SPT, and the ECM are transferred.

The USD (User Service Description) includes information for referring to the MPD and the SDP. The MPD (Media Presentation Description) includes information such as a URL (Uniform Resource Locator) of a segment for each component which is transferred by each item of the broadcasting service as a unit.

The SDP (Session Description Protocol) includes a broadcasting service property by each item of the broadcasting service as a unit, configuration information of the component, a component property, filter information of the component, and location information of the component.

The SPT (Service Parameter Table) is configured to include various parameters defined at the level of the broadcasting service and the component. The SPT includes the CA descriptor (CA_Descriptor) in which information regarding acquisition of the ECM (hereinafter, referred to as "information for acquiring the ECM") is described. The ECM (Entitlement Control Message) includes the scramble key (Ks) and the contract information which are encoded by using the work key (Kw). Since the ECM is acquired based on a description of the CA_Descriptor, the ECM may be acquired from other than the SCS.

In the following description, scrambling of a component using the scramble key (Ks) is also referred to as "encoding", and descrambling of an encoded component using the scramble key (Ks) is also referred to as "decoding".

Figure 8:
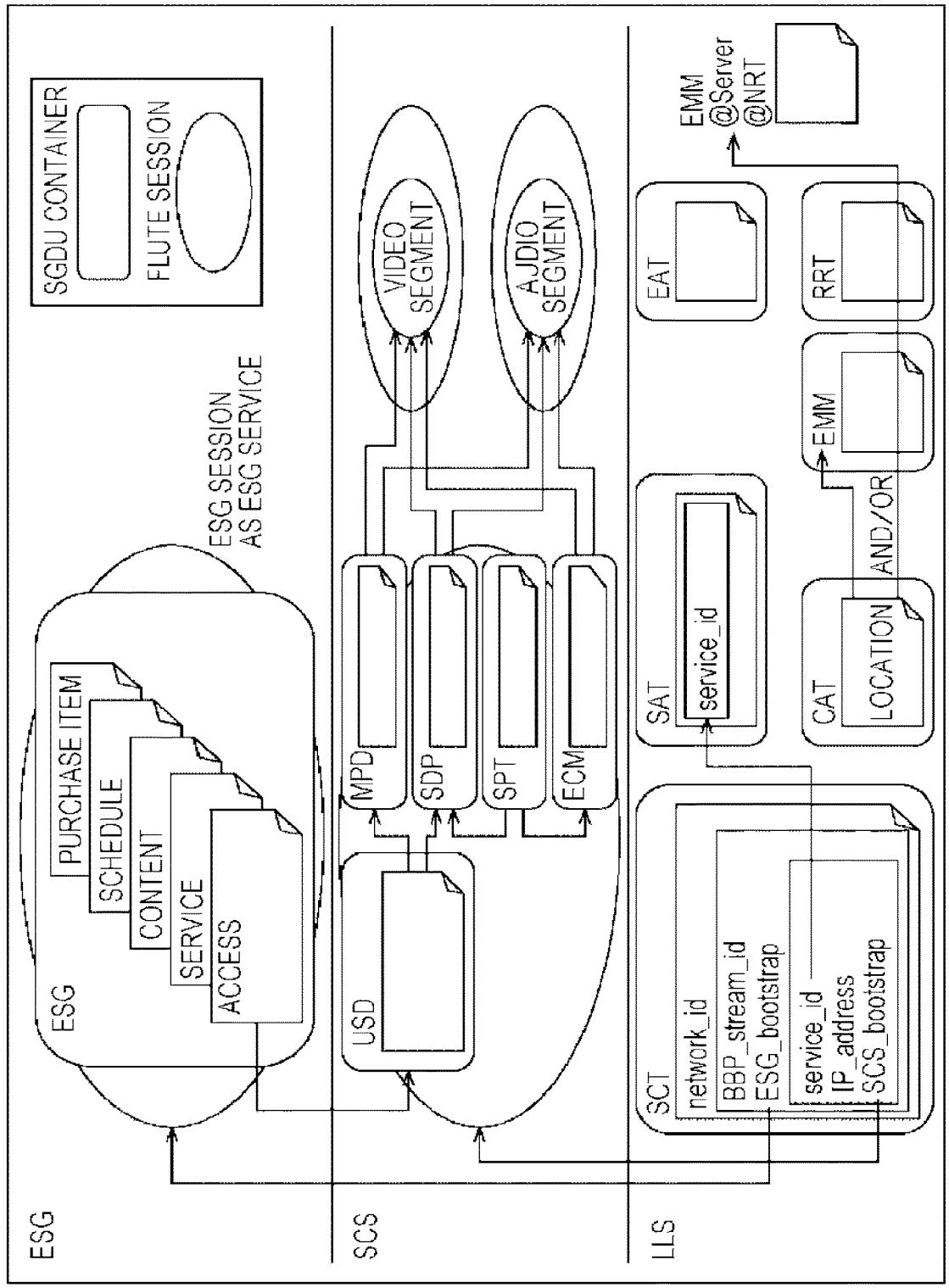
FIG. 8 is a diagram illustrating a relationship between items of the signaling information (EMM:LLS (Network, NRT), ECM:SCS) at the time of decoding an encoded component.
Figure 9:
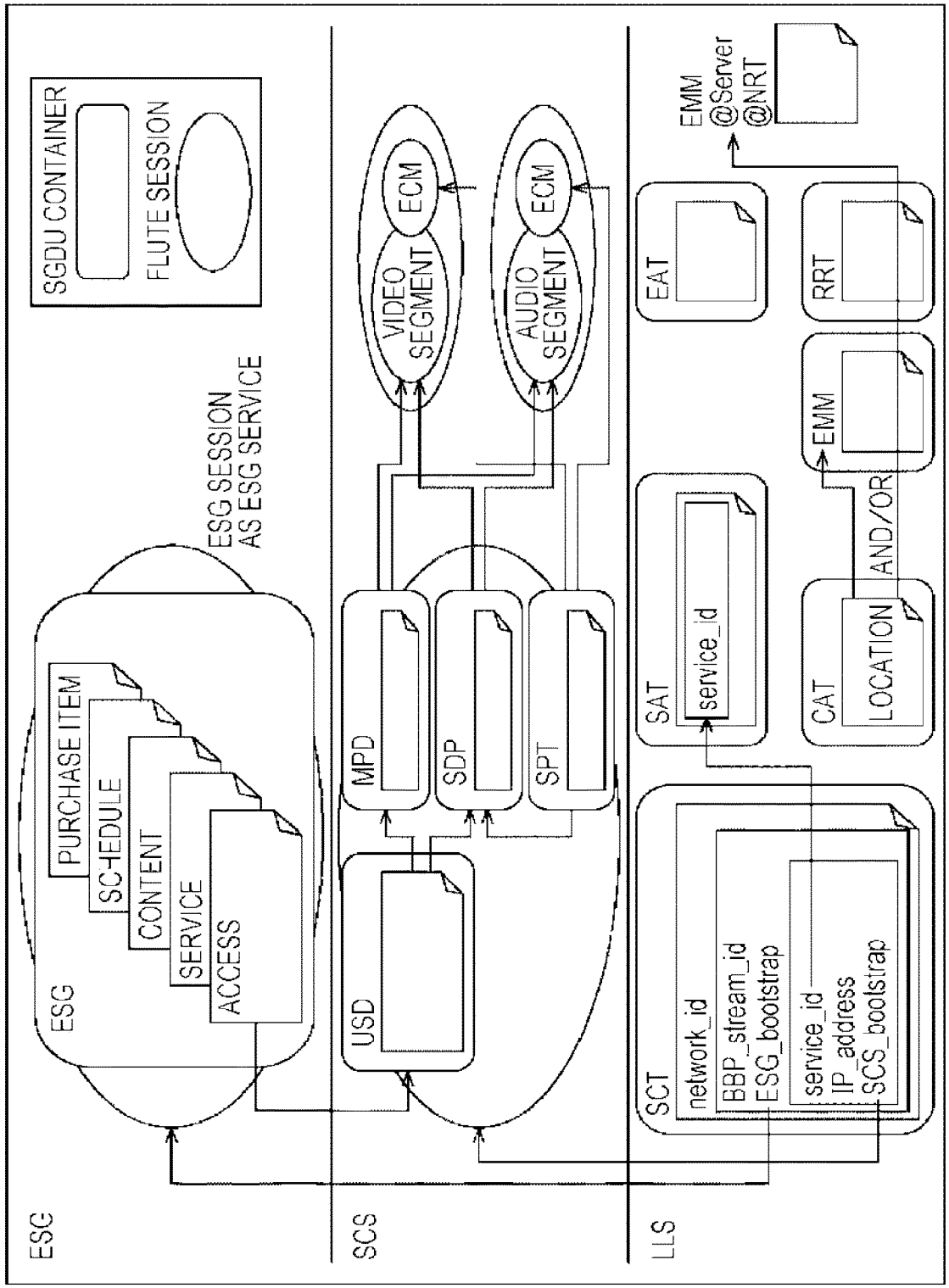
FIG. 9 is a diagram illustrating a relationship between items of the signaling information (EMM:LLS (Network, NRT), ECM:Component) at the time of decoding an encoded component.
Figure 10:
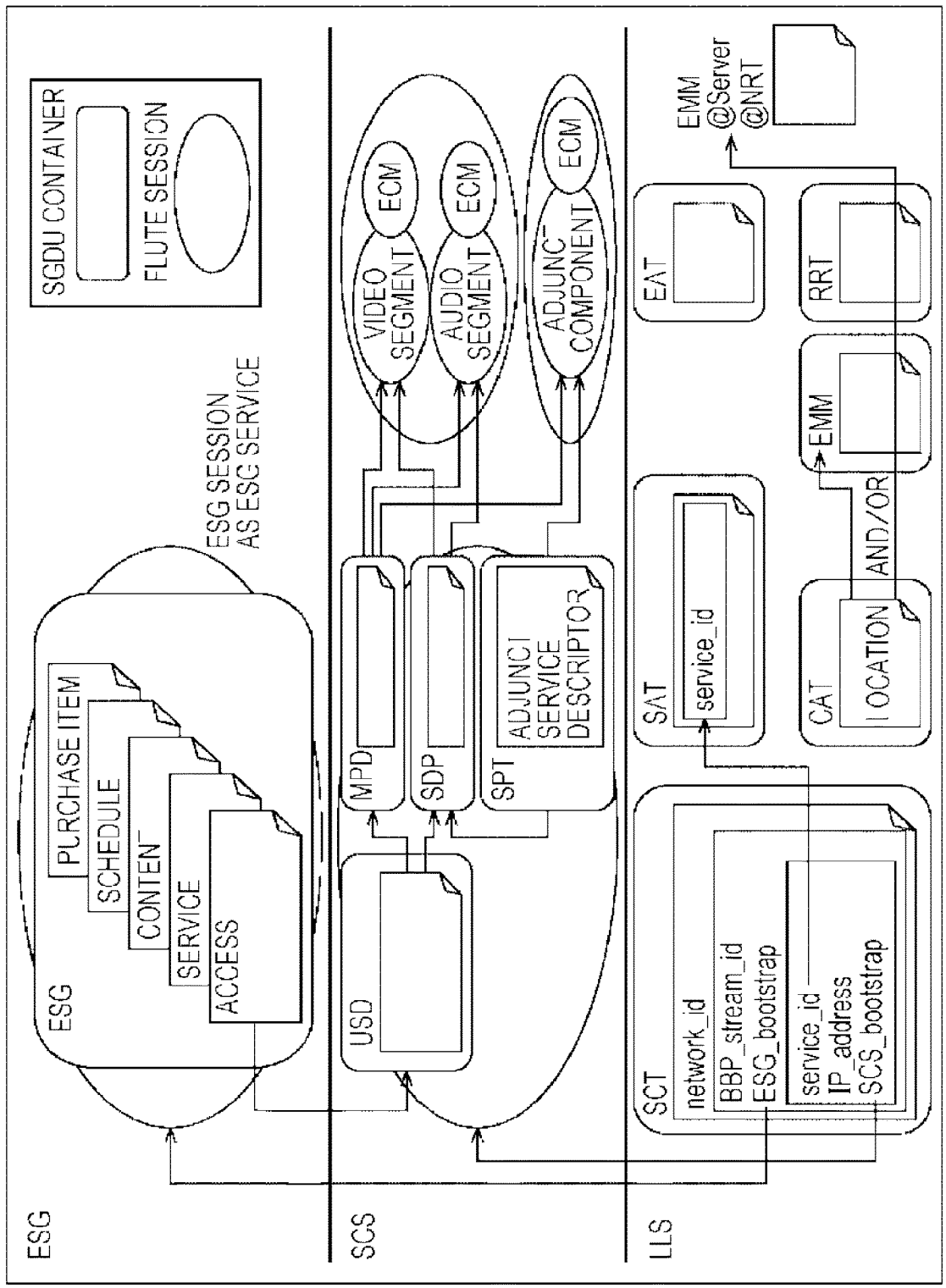
FIG. 10 is a diagram illustrating a relationship between the items of the signaling information (EMM:LLS (Network, NRT), ECM:Component) at the time of decoding an encoded component in a case of utilizing adjunct broadcasting service.

Subsequently, with reference to FIGS. 8 to 10, a relationship between items of the signaling information at the time of decoding an encoded component will be described. In FIGS. 8 to 10, the LLS, the SCS, and the ESG are stored in the SGDU container, thereby being transferred. Moreover, the SCS, the ESG, and the component of the video and the audio are transferred through the FLUTE session.

(Relationship Between Items of Signaling Information at Time of Decoding Encoded Component)

FIG. 8 is a diagram illustrating a relationship between items of the signaling information at the time of decoding an encoded component.

For example, the SCT has a transfer cycle of one second. The SCT is acquired at the time of initial scanning, or is acquired from a server through the internet. For example, the SAT has a transfer cycle of 100 milliseconds. The SAT is acquired when selecting a channel of the broadcasting service.

The SCT indicates a configuration of the BBP stream and a configuration of the broadcasting service in the broadcasting network by the triplet. In addition to a network_id, a BBP stream loop identified by a BBP_stream_id is arranged in the SCT. In addition to ESG bootstrap information, a broadcasting service loop identified by a broadcasting service_id is arranged in the BBP stream loop. The IP address and SCS_bootstrap information of the broadcasting service is further arranged in the broadcasting service loop.

Based on the ESG_bootstrap information of the SCT, the ESG including information such as a program title and start time transferred through the FLUTE session is acquired. The SCT includes information (not illustrated) regarding the physical layer (Physical Layer), thereby being used as information for selecting a channel (initial scanning information).

The SAT indicates the broadcasting service on the air. The SCT and the SAT are linked by the broadcasting service_id so that it is possible to determine whether or not particular broadcasting service is on the air. The EAT includes information regarding emergency notification. The RRT includes the rating information.

The location information (Location) is described in the CA_Descriptor (the information for acquiring the EMM) of the CAT, and thus, the EMM can be acquired from the LLS, NRT and an EMM server through the internet based on the location information.

When a channel of particular broadcasting service is selected, the SCS of the corresponding broadcasting service transferred through the FLUTE session is acquired based on the SCS_bootstrap information of the SCT. Here, as the SCS, the USD, the MPD, the SDP, the SPT, and the ECM are acquired. The USD relates to the MPD and the SDP. Using the MPD and the SDP, a component of video and audio transferred through the FLUTE session can be acquired. However, the component of video and audio is encoded, thereby being transferred by a media segment as a unit.

The location information is described in the CA_Descriptor (the information for acquiring the ECM) of the SPT, and thus, the ECM is acquired from the SCS based on the location information. Since the scramble key (Ks) of the ECM can be decoded by using the work key (Kw) of the EMM, the encoded component of video and audio can be decoded by using the corresponding scramble key (Ks).

As illustrated in FIG. 9, the ECM can be transferred by utilizing the component instead of the SCS. In this case, information for indicating the component is designated in the SPT as location information of the CA_Descriptor (information for acquiring the ECM), the ECM transferred through the FLUTE session together with the component is acquired. The scramble key (Ks) of the ECM acquired in such a manner is decoded by using the work key (Kw) of the EMM, and thus, an encoded component can be decoded by using the scramble key (Ks) obtained thereby.

As illustrated in FIG. 10, when there is provided related adjunct broadcasting service regarding main broadcasting service (hereinafter, referred to as "adjunct broadcasting service"), the below-mentioned Adjunct Service Descriptor (hereinafter, also referred to as "ASD") is described in the SPT. Since the triplet of the adjunct broadcasting service is described in the Adjunct Service Descriptor, the component configuring the adjunct broadcasting service transferred through the FLUTE session can be acquired by using the MPD and the SDP of the corresponding broadcasting service. However, since the component of the adjunct broadcasting service is encoded, the scramble key (Ks) of the ECM is decoded by using the work key (Kw) of the EMM, the encoded component is decoded by using the corresponding scramble key (Ks).

In examples of FIGS. 8 to 10, descriptions have been given regarding a method of transferring the ECM by utilizing the SCS or the component. However, the method of transferring the ECM is not limited to the method thereof. For example, the ECM may be acquired from an ECM server through the internet. Otherwise, the NRT (Non-Realtime) broadcasting may be utilized. The Adjunct Service Descriptor of the SPT in FIG. 10 may be described as an Associated Service Descriptor.

(2) Structure of Data of LLS and SCS
(Syntax of SCT)

FIG. 11 is a diagram illustrating syntax of the SCT (Service Configuration Table). For example, the SCT is described by a markup language such as the XML. In the syntax of FIG. 11 and the like, between an element and a property, the mark "@" is applied to the property. Moreover, indented element and property are designated with respect to the upper element thereof.

As illustrated in FIG. 11, an Sct element is an upper element of a networkId property, a name property, and a BBPStream element. A network ID of a broadcasting station by a physical channel unit is designated in the networkId property. The name of the broadcasting station by a physical channel unit is designated in the name property.

Information regarding one or a plurality of the BBP streams are designated in the BBPStream element. The BBPStream element is an upper element of a bbpStreamId property, a payloadType property, the name property, an ESGBootstrap element, a physicalParameters element, the CA_Descriptor element, and a Service element.

The BBP stream ID is designated in the bbpStreamId property. When arranging the plurality of BBP streams, identification is performed by the BBP stream ID. A payload type of the BBP stream is designated in the payloadType property. As the payload type, for example, "ipv4", "ipv6", and "ts" are designated. The "ipv4" indicates an IPv4 (Internet Protocol Version 4). The "ipv6" indicates an IPv6 (Internet Protocol Version 6). The "ts" indicates a TS (Transport Stream). The name of the BBP stream is designated in the name property.

Access information with respect to the ESG is designated in the ESGBootstrap element. The ESGBootstrap element is an upper element of the ESGProvider element. Information regarding the ESG is designated in the ESGProvider element for each provider of the ESG. The ESGProvider element is an upper element of a providerName property, an ESGBroadcast the Location element, and an ESGBroadband the Location element.

The name of the provider of the ESG is designated in the providerName property. When the ESG is transferred by utilizing broadcasting, the ESGBroadcast the Location element designates the ESG broadcasting service by the networkId property, the BBPStreamId property, and an ESG serviceId property (the triplet). A network ID of a network through which the ESG broadcasting service is transferred is designated in the networkId property. The BBP stream ID of the BBP stream through which the ESG broadcasting service is transferred is designated in the BBPStreamId property. The broadcasting service ID of the ESG broadcasting service is designated in the ESG serviceId property.

When the ESG is transferred by utilizing communication, an ESGBroadband the Location element designates a URL for access to a file of the ESG by an ESGurl property.

Information regarding a parameter of the physical layer is designated in the physicalParameters element. The physicalParameters element is an upper element of a modulation property and a frequency property. A modulation method is designated in the modulation property. A frequency at the time of selecting the band of 6 MHz is designated in the frequency property.

The CA_Descriptor (FIG. 12) is arranged in the CA_Descriptor element. The information for acquiring the EMM is designated in the CA descriptor, and will be described later.

Information regarding one or the plurality of items of broadcasting service is designated in the Service element. The Service element is an upper element of a broadcasting serviceId property, a broadcasting serviceType property, a hidden property, a hiddenGuide property, a shortName property, a longName property, an accessControl property, a SourceOrigin element, an SCSbootstrap element, and an AdjunctServiceDescriptor element.

The broadcasting service ID is designated in the broadcasting serviceId property. When arranging the plurality of items of broadcasting service, identification is performed by the broadcasting service ID. The type information of the broadcasting service is designated in the broadcasting serviceType property. As the type information, for example, "tv", "audio", "data", "nrt", "esg", "adjunct-nrt", and "adjunct-shared" are designated. The "tv" indicates television (Television), the "audio" indicates audio service, the "data" indicates data service, the "nrt" indicates NRT service, the "esg" indicates ESG service, and the "adjunct-nrt" and the "adjunct-shared" (shared) indicate adjunct broadcasting service, respectively.

Whether or not the broadcasting service identified by the broadcasting service ID is hidden broadcasting service is designated in the hidden property and the hiddenGuide property. When "on" is designated as a property value, the corresponding broadcasting service is not displayed. When "off" is designated as the property value thereof, the corresponding broadcasting service is displayed. For example, when "on" is designated as the hidden property, it is difficult to select the channel of the corresponding broadcasting service by manipulating a remote control. For example, when "on" is designated as the hiddenGuide property, the corresponding broadcasting service is not displayed in the ESG.

The name of the broadcasting service identified by the broadcasting service ID is designated in the shortName property and the longName property. However, the name of the broadcasting service has to be designated within seven letters in the shortName property. Whether or not the broadcasting service identified by the broadcasting service ID is encoded is designated in the accessControl property. The designation of "on" for the accessControl property indicates that the corresponding broadcasting service is encoded, and the designation of "off" therefor indicates that the corresponding broadcasting service is not encoded.

Information for identifying the broadcasting service is designated in the SourceOrigin element. The SourceOrigin element is an upper element of a country property, an originalNetworkId property, the bbpStreamId property, and the broadcasting serviceId property. A country code is designated in the country property. An original network ID is designated in the originalNetworkId property. The original network ID is an ID for identifying the broadcasting network. Therefore, the same value is used when retransmitting the corresponding broadcasting service. The BBP stream ID is designated in the bbpStreamId property. The broadcasting service ID is designated in the broadcasting serviceId property. That is, a unique ID can be allocated with respect to each item of the broadcasting service on account of the country code, the original network ID, the BBP stream ID, and the broadcasting service ID.

The access information with respect to the broadcasting service channel is designated in the SCSbootstrap element. The SCSbootstrap element is an upper element of a sourceIPAddress property, a destinationIPAddress property, a portNum property, and a tsi property. IP addresses for a transmission source and a destination through which the broadcasting service is transferred are designated in the sourceIPAddress property and the destinationIPAddress property. The port number for transferring the SCS is designated in the portNum property. A TSI of the FLUTE session for transferring the SCS is designated in the tsi property.

Information regarding the adjunct broadcasting service is designated in the AdjunctServiceDescriptor element. The AdjunctServiceDescriptor element is an upper element of the networkId property, the bbpStreamId property, and the broadcasting serviceId property. A network ID of the adjunct broadcasting service is designated in the networkId property. The BBP stream ID of the adjunct broadcasting service is designated in the bbpStreamId property. The broadcasting service ID of the adjunct broadcasting service is designated in the broadcasting serviceId property.

In respect of cardinality, when "1" is designated, only one element or property is necessarily designated. When "0 to 1" is designated, it is arbitrary whether or not the element or property is designated. When "1 to n" is designated, one or more of the element or property is designated. When "0 to n" is designated, it is arbitrary whether or not one or more of the element or property is designated. The definitions of the cardinalities thereof are the same in other syntax mentioned below.

(Syntax of CA Descriptor)

FIG. 12 is a diagram illustrating syntax of CA (Conditional Access) Descriptor. For example, the CA_Descriptor is described by the markup language such as the XML.

The CA_Descriptor element is an upper element of a Service_platform_ID property, a CA_SystemId property, a groupId property, and a Location element.

A service platform ID is designated in the Service_platform_ID property. An ID of a CA (Conditional Access) method is designated in the CA_SystemId property.

A group ID for identifying the EMM and the ECM is designated in the groupId property. However, there is a case where one EMM is utilized for the plurality of items of broadcasting service, and one ECM is utilized for the plurality of components.

Information (information for acquiring the EMM or information for acquiring the ECM) indicating an acquisition destination of the EMM or the ECM is indicated in the Location element. The Location element is an upper element of a LocationType property and a LocationUri property.

An acquisition destination type of the EMM or an acquisition destination type of the ECM is designated in the LocationType property. A URI (Uniform Resource Identifier) of the acquisition destination of the EMM or the ECM is designated in the LocationUri property.

As the acquisition destination type of the EMM, the "LLS", the "Network", and the "NRT" are designated. The "LLS" indicates that the EMM is transferred by the LLS.

When transferring by the LLS, for example, only the EMM addressed to itself is filtered by using a Descriptor ID and a receiver ID indicating that the EMM is described in the SGDU, thereby acquiring the EMM. When the filtering is performed based on version information which is arranged in the header information of the SGDU and renewal of the EMM is detected, a new EMM can be acquired, thereby being stored.

The "Network" indicates that the EMM is transferred by utilizing a communication network. When transferring through the communication, for example, the EMM can be acquired by using HTTPS GET request/response. The receiver ID is designated in the request so as to acquire the EMM addressed to itself. The time of acquiring the EMM is arbitrary. For example, it is considerable to perform the acquisition when the receiver is turned on, or regularly such as weekly or monthly.

The "NRT" indicates that the EMM is transferred by utilizing an NRT session. When transferring through the NRT, the EMM is acquired based on the ATSC Standard A/103 Non-Real-Time Content Delivery, or the non-real-time content delivery standard which is expected to be standardized at ATSC.

As the acquisition destination type of the ECM, the "SCS", the "Network", the "NRT", and a "component box" are designated. The "SCS" indicates that the ECM is transferred by the SCS.

When transferring by the SCS, filtering is performed by using the Descriptor ID indicating that the ECM is described in the SGDU, thereby acquiring the ECM. When the filtering is further performed based on the version information which is arranged in the header information of the SGDU and renewal of the ECM is detected, a new ECM can be acquired, thereby being stored.

The "Network" indicates that the ECM is transferred by utilizing the communication network. When transferring through the communication, for example, the ECM can be acquired by using the HTTPS GET request/response. However, when performing the request, a Kw_ID is designated.

The "NRT" indicates that the ECM is transferred by utilizing the NRT session. When transferring through the NRT, the ECM is acquired based on the ATSC Standard A/103 Non-Real-Time Content Delivery, or the non-real-time content delivery standard which is expected to be standardized at ATSC.

The "component box" indicates that the ECM is transferred by utilizing the component (a metadata box thereof). When being transferred by the component (the metadata box thereof), the ECM can be acquired from a data region of a pssh box based on the CE (Common Encryption) standard.

One or more acquisition destination type can be designated for the EMM or the ECM. For example, all the aforementioned types can be designated for the acquisition destination type.

(Syntax of CAT)

FIG. 13 is a diagram illustrating syntax of the CAT (Conditional Access Table). For example, the CAT is described by the markup language such as the XML.

A CAT element is an upper element of the CA_Descriptor element. The CA Descriptor (FIG. 12) is arranged in the CA_Descriptor element. The information for acquiring the EMM is designated in the CA Descriptor.

(Syntax of EMM)

FIG. 14 is a diagram illustrating syntax of the EMM (Entitlement Management Message). For example, the EMM is described by the markup language such as the XML.

An EMM element is an upper element of a Kw_ID property, a Kw property, a contract information element, a validity term property, a broadcasting servicePlatform_ID property, an EMM_group_ID property, and a broadcasting serviceNumber property.

A work key ID is designated in the Kw_ID property. The work key (Kw) is designated in the Kw property. However, the work key (Kw) is encoded by a master key (Km).

Information regarding the broadcasting service to which the receiver is under contract is designated in the contract information element. The contract information element is an upper element of a tier bit property and an ECM_group_ID property. A tier bit according to the contents of the contract of the receiver is designated in the tier bit property. The group ID for each item of the broadcasting service according to the contents of the contract of the receiver is designated in the ECM_group_ID property.

Information for indicating a validity term of the EMM is designated in the validity term property. The service platform ID is designated in the broadcasting servicePlatform_ID property. A group ID of a group where the EMM belongs is designated in the EMM_group_ID property. Numbers respectively allocated for the items of the broadcasting service are designated in the broadcasting serviceNumber property.

(Syntax of SPT)

FIG. 15 is a diagram illustrating syntax of the SPT (Service Parameter Table). For example, the SPT is described by the markup language such as the XML.

As illustrated in FIG. 15, a Spt element is an upper element of the broadcasting serviceId property, a spindicator property, a ProtocolVersionDescriptor element, an NRTServiceDescriptor element, a CapabilityDescriptor element, an IconDescriptor element, an ISO639LanguageDescriptor element, a ReceiverTargetingDescriptor element, the AdjunctServiceDescriptor element, a ContentAdvisoryDescriptor element, the CA_Descriptor element, and a Component element.

The broadcasting service ID is designated in the broadcasting serviceId property. Whether or not each item of the broadcasting service identified by the broadcasting service ID is encoded is designated in the spindicator property. The designation of "on" for the spindicator property indicates that the corresponding broadcasting service is encoded, and the designation of "off" therefor indicates that the corresponding broadcasting service is not encoded.

Information for indicating a type of the broadcasting service of the data is designated in the ProtocolVersionDescriptor element. Information regarding the NRT service is designated in the NRTServiceDescriptor element. Information regarding a function (capability) necessary for the receiver which is provided with the NRT service is designated in the CapabilityDescriptor element.

Information for indicating an acquisition destination of an icon used in the NRT service is designated in the IconDescriptor element. A language code of the NRT service is designated in the ISO639LanguageDescriptor element. Target information of the NRT service is designated in the ReceiverTargetingDescriptor element.

Information regarding the adjunct broadcasting service is designated in the AdjunctServiceDescriptor element. Information regarding a rating region is designated in the ContentAdvisoryDescriptor element.

The CA descriptor (FIG. 12) is arranged in the CA_Descriptor element. Information for acquiring the ECM is designated in the CA descriptor.

In the SPT, various parameters at the level of the broadcasting service are defined by the Descriptor elements, and various parameters at the level of the component are defined by the below-mentioned Component element.

The Component element is an upper element of a componentId property, a componentEncription property, a TargetedDeviceDescriptor element, the ContentAdvisoryDescriptor element, a VideoParameters element, an AudioParameters element, a CaptionParameters element, the CA_Descriptor element, and an ECM_DeliveryFlag element.

A component ID is designated in the componentId property.

Whether or not each component identified by the component ID is encoded is designated in the componentEncription property. The designation of "on" for the componentEncription property indicates that the corresponding broadcasting service is encoded, and the designation of "off" therefor indicates that the corresponding broadcasting service is not encoded. Information regarding a target apparatus is designated in the TargetedDeviceDescriptor element. The rating information by the component as a unit is designated in the ContentAdvisoryDescriptor element.

A parameter for the video is designated in the VideoParameters element. For example, in the VideoParameters element, when AVC (Advanced Video Coding) is adopted as an encoding method of the video data, an AVCVideoDescriptor element is designated therein, and when HEVC (High Efficiency Video Coding) is adopted, an HEVCVideoDescriptor element is designated therein.

A parameter for the audio is designated in the AudioParameters element. For example, in the AudioParameters element, when MPEG4AAC (Advanced Audio Coding) is adopted as the encoding method of the audio data, an MPEG4AACAudioDescriptor element is designated therein, and when AC3 (Audio Code number 3) is adopted, an AC3AudioDescriptor element is designated therein.

A parameter for the closed caption is designated in the CaptionParameters element.

The CA descriptor (FIG. 12) is arranged in the CA_Descriptor element. Information for acquiring the ECM is designated in the CA descriptor.

A flag indicating the NRT out of a plurality of the NRT sessions to which the ECM is transferred is designated in the ECM_DeliveryFlag element. An element of "true" as the ECM_DeliveryFlag element is designated in the NRT to which the ECM is transferred, and an element "false" is designated in the NRT to which the ECM is not transferred.

In FIG. 15, the ProtocolVersionDescriptor element, the NRTServiceDescriptor element, the CapabilityDescriptor element, the IconDescriptor element, the ISO639LanguageDescriptor element, and the ReceiverTargetingDescriptor element are defined for the NRT service.

Subsequently, a detailed structure of the Descriptor element described in the SPT of FIG. 15 will be described. Here, representing the Descriptor elements thereof, the AdjunctServiceDescriptor element will be described.

(Syntax of AdjunctServiceDescriptor)

FIG. 16 is a diagram illustrating syntax of the AdjunctServiceDescriptor. For example, the AdjunctServiceDescriptor is described by the markup language such as the XML.

Information regarding the adjunct broadcasting service is designated in an ASD element. The ASD element is an upper element of a Network_ID property, a BBP_Stream_Id property, a Service_Id property, and a SelectionFlg property. A network ID is designated in the Network_ID property. The BBP stream ID is designated in the BBP_Stream_Id property. The broadcasting service ID is designated in the Service_Id property. That is, the adjunct broadcasting service is designated by the triplet.

Information regarding a channel to which the ECM for decoding is transferred is designated in the SelectionFlg property. As the channel, for example, "main" or "adjunct" is designated. The element "main" indicates that the ECM of the main broadcasting service is adopted, thereby performing the decoding. The element "adjunct" indicates that the ECM of the adjunct broadcasting service is adopted, thereby performing the decoding.

(Syntax of ECM)

FIG. 17 is a diagram illustrating syntax of the ECM (Entitlement Control Message). For example, the ECM is described by the markup language such as the XML.

The ECM element is an upper element of the Kw_ID property, a KsNumber property, a Ks_ID property, a Ks property, a contract information property, the broadcasting servicePlatform_ID property, the broadcasting serviceNumber property, and a date property.

The work key ID is designated in the Kw_ID property. The number (N) of the scramble key (Ks) is designated in the KsNumber property. A scramble key ID is designated in the Ks_ID property. The scramble key (Ks) is designated in the Ks property. That is, the scramble key ID and the scramble key (Ks) are arranged in accordance with the number of the scramble key (Ks) which is designated in the KsNumber property. However, the scramble key (Ks) is encoded by the work key (Kw).

The contract information targeted by the ECM is designated in the contract information property. As the contract information, for example, the tier bit and the group ID are designated.

The service platform ID is designated in the broadcasting servicePlatform_ID property. Numbers respectively allocated for the items of the broadcasting service are designated in the broadcasting serviceNumber property. The date and time for indicating the validity term of the ECM are designated in the date property.

3. Operational Example

Subsequently, with reference to FIGS. 18 to 22, a specific operational example regarding content protection adopting the signaling information transferred by the LLS and the SCS.

(Operational Example in Case of Acquiring EMM from LLS)

FIG. 18 is a diagram illustrating an operational example in a case of acquiring the EMM from the LLS.

In FIG. 18, a transmitter of the broadcasting station (the broadcasting provider) transfers the control signals such as the LLS and the SCS together with the component configuring each item of the broadcasting service through the broadcasting wave of the digital broadcasting adopting the IP transferring method. However, the digital broadcasting employs the aforementioned ID system in FIG. 2. In order to protect the content, the component is encoded by the scramble key (Ks).

As illustrated in FIG. 18, the receiver installed at each home acquires the LLS when performing the initial scanning and the like. Since the CAT and the EMM are transferred to the LLS, for example, the receiver acquires the EMM transferred by the LLS based on the location information of the CA_Descriptor (the information for acquiring the EMM) of the CAT. The receiver stores the EMM acquired from the LLS.

Thereafter, in the receiver, selecting of channel for particular broadcasting service is performed in accordance with a manipulation for selecting a channel by a user, thereby acquiring the SCS of the corresponding broadcasting service. Since the USD, the MPD, the SDP, the SPT, and the ECM are transferred to the SCS, the receiver acquires the encoded components (Video, Audio) configuring the selected channel of particular broadcasting service by using the USD, the MPD, the SDP, and the SPT. The receiver also acquires the ECM from the SCS based on the location information of the CA_Descriptor (information for acquiring the ECM) of the SPT. The receiver acquires the scramble key (Ks) for the encoded component by using the ECM acquired from the SCS, and the stored EMM.

Then, the receiver decodes the encoded components (Video, Audio) configuring the selected channel of particular broadcasting service by using the corresponding scramble key (Ks), and performs rendering, thereby outputting the image and sound thereof.

As described in the above, in the operational example of FIG. 18, the scramble key (Ks) is acquired by using the EMM acquired from the LLS, and the ECM acquired from the SCS, and thus, the encoded component is decoded by using the corresponding scramble key (Ks).

(Operational Example in Case of Acquiring EMM from Server Through Network)

Figure 19:
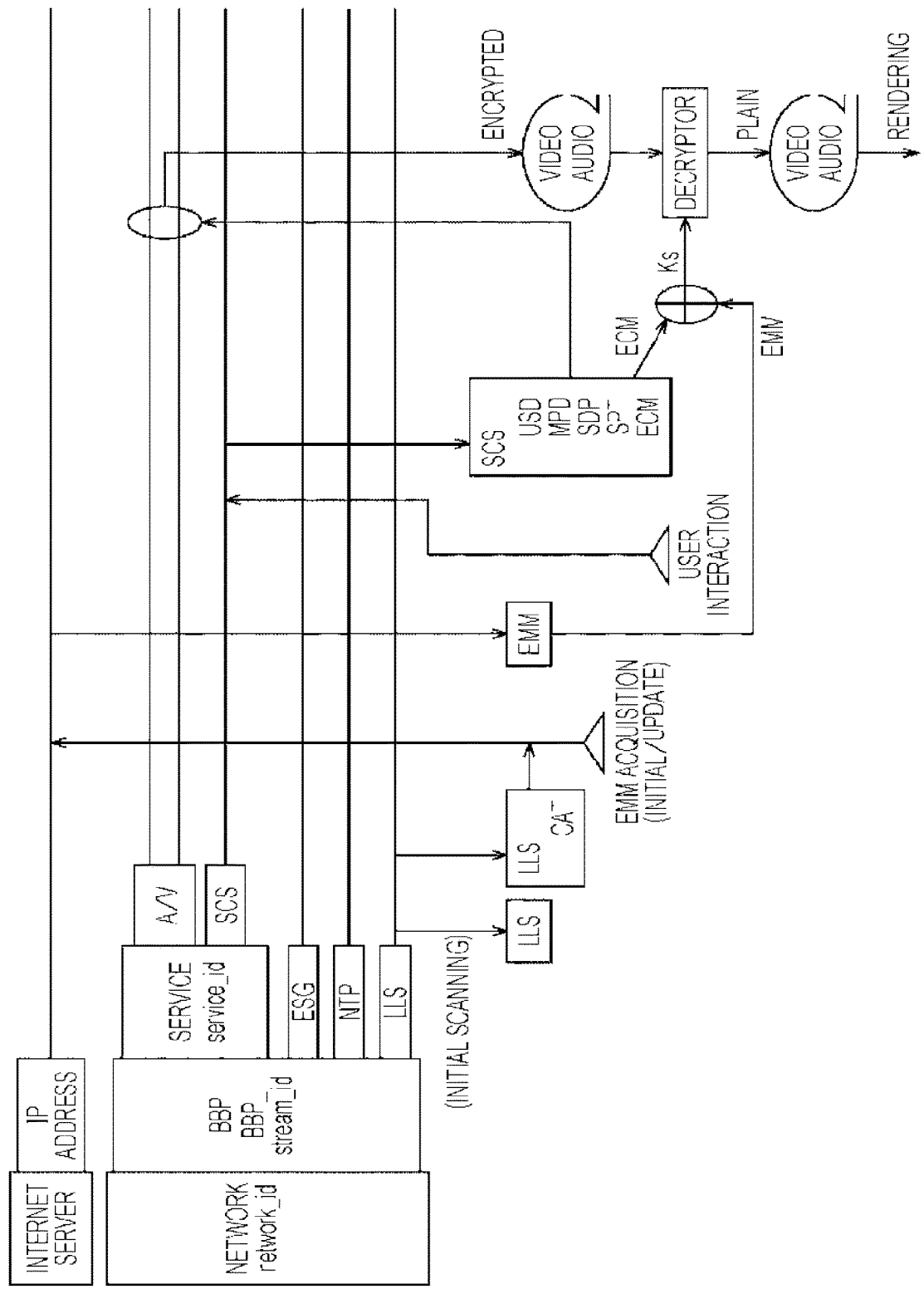
FIG. 19 is a diagram illustrating an operational example in a case of acquiring the EMM from a server on a network.

FIG. 19 is a diagram illustrating an operational example in a case of acquiring the EMM from a server on the network.

In FIG. 19, the transmitter of the broadcasting station transfers the control signals such as the LLS and the SCS together with the component configuring each item of the broadcasting service through the broadcasting wave of the digital broadcasting adopting the IP transferring method. However, the digital broadcasting employs the aforementioned ID system in FIG. 2. In order to protect the content, the component is encoded by the scramble key (Ks). Moreover, the EMM is provided through the EMM server (Server) on the internet.

As illustrated in FIG. 19, the receiver installed at each home acquires the LLS when performing the initial scanning and the like. Since the CAT is transferred to the LLS, the receiver accesses the EMM server on the internet so as to acquire the EMM based on the location information of the CA_Descriptor (the information for acquiring the EMM) of the CAT. The receiver stores the EMM acquired from the EMM server.

Thereafter, in the receiver, selecting of channel for particular broadcasting service is performed in accordance with a manipulation for selecting a channel by a user, thereby acquiring the SCS of the corresponding broadcasting service. Since the USD, the MPD, the SDP, the SPT, and the ECM are transferred to the SCS, the receiver acquires the encoded components (Video, Audio) configuring the selected channel of particular broadcasting service by using the USD, the MPD, the SDP, and the SPT. The receiver also acquires the ECM from the SCS based on the location information of the CA_Descriptor (information for acquiring the ECM) of the SPT. The receiver acquires the scramble key (Ks) for the encoded component by using the ECM acquired from the SCS, and the stored EMM.

Then, the receiver decodes the encoded components (Video, Audio) configuring the selected channel of particular broadcasting service by using the corresponding scramble key (Ks), and performs rendering, thereby outputting the image and sound thereof.

As described in the above, in the operational example of FIG. 19, the scramble key (Ks) is acquired by using the EMM acquired through the EMM server on the internet, and the ECM acquired from the SCS, and thus, the encoded component is decoded by using the corresponding scramble key (Ks).

Each of the operational examples of FIGS. 18 and 19 is merely an example. Therefore, as mentioned above, the EMM and the ECM may be acquired from the NRT based on the location information (LocationType or LocationUri) of CA_Descriptor. The CA_Descriptor as the information for acquiring the EMM may be described in the SCT instead of the CAT.

(Fundamental Structure of CAS)

Figure 20:
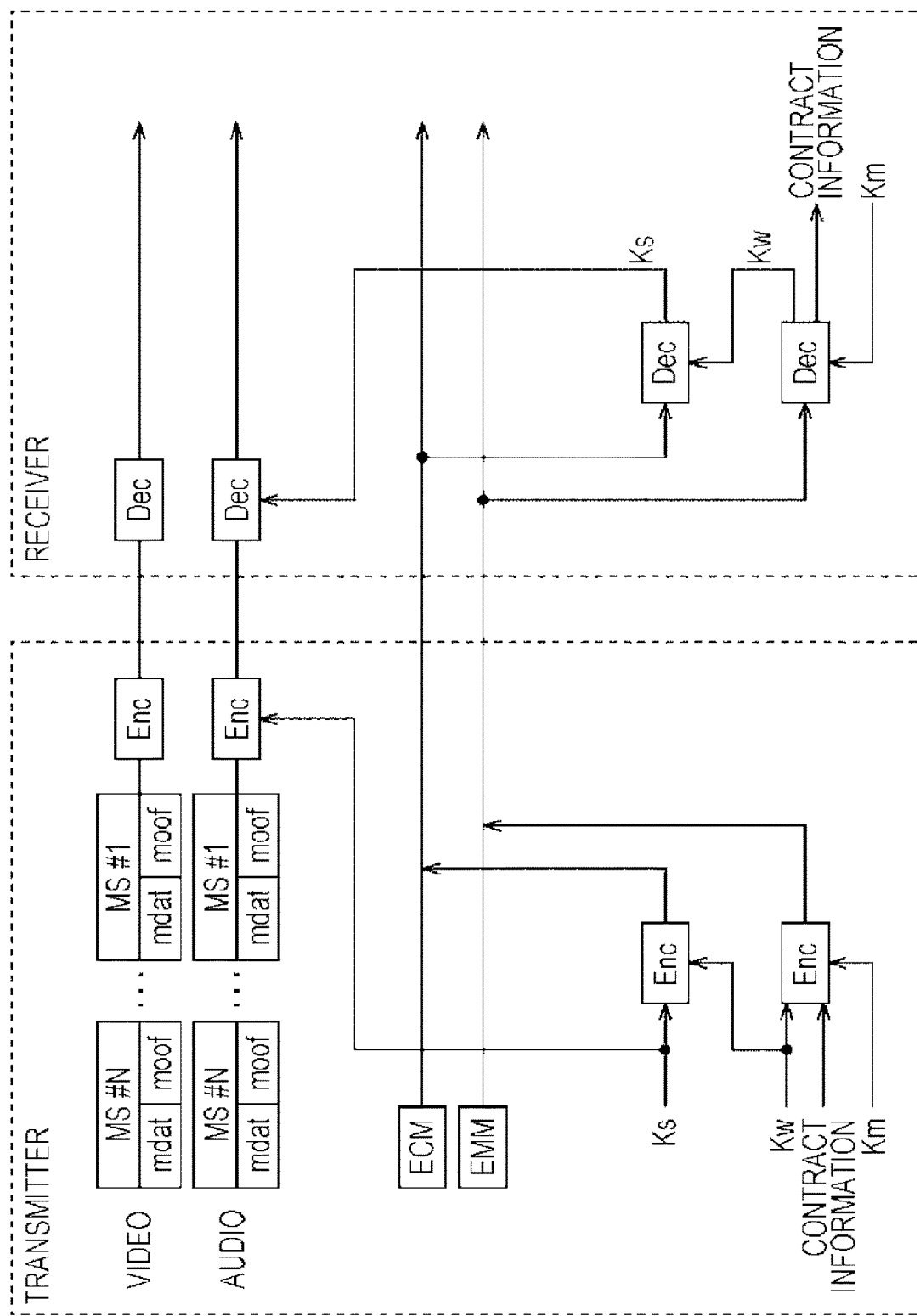
FIG. 20 is a diagram illustrating a fundamental structure of a CAS.

Subsequently, details of the content protection in the aforementioned operational examples will be described. FIG. 20 is a diagram illustrating a fundamental structure of the CAS (Conditional Access System). In FIG. 20, a direction of the time proceeds from the left to the right in the drawing.

In respect of the CAS, the components (Video, Audio) configuring particular broadcasting service are encoded (Enc) by using the scramble key (Ks) in the transmitter of the broadcasting station. Meanwhile, the encoded component is decoded (Dec) by using the scramble key (Ks) in the receiver which is installed at each home, thereby being presented to a user.

The EMM (Entitlement Management Message) as related information of an identification unit (for example, a device ID) of the receiver, and the ECM (Entitlement Control Message) as related information which is common in every receiver are transferred from the transmitter to the receiver.

The EMM transfers the work key (Kw) encoded (Enc) by using the master key (Km), and the contract information of each user. However, the work key (Kw: Work Key) is a key for encoding (Enc) the scramble key (Ks). The master key (Km: Master Key) is a key for encoding (Enc) the work key (Kw).

The ECM transfers the scramble key (Ks) encoded by using the work key (Kw). However, the scramble key (Ks:Scramble Key) is a key for encoding (Enc) the component. The scramble key (Ks) is renewed at predetermined time intervals, for example, the scramble key (Ks) is renewed at intervals of several seconds.

In this manner, since the EMM and the ECM are transferred from the transmitter to the receiver, the EMM is decoded in the receiver by using the master key (Km), thereby acquiring the work key (Kw) and the contract information. Out of the ECMs transferred from the transmitter, the ECM of which the contract information coincides with that of the receiver is decoded in the receiver by using the work key (Kw), thereby acquiring the scramble key (Ks). Accordingly, the encoded component can be decoded (Dec) by using the corresponding scramble key (Ks) in the receiver.

Each of the components (Video, Audio) is transferred by the media segment (MS: Media Segment) as a unit. As illustrated in FIG. 20, each media segment is configured to have a moof and an mdat. The moof (movie fragment box) indicates control information of a fragment. The mdat (media data box) indicates a media data body of a fragment.

In other words, in a sequence of the media segment of the video, the video data is arranged in the mdat of each media segment, and the control information of the video data by the track as a unit is arranged in the moof. In a sequence of the media segment of the audio, the audio data is arranged in the mdat of each media segment, and the control information of the audio data by the track as a unit is arranged in the moof.

Incidentally, the media segment conforms to the standard of an ISO base media file format (ISO Base Media File Format) defined by ISO/IEC 14496-12. Therefore, in the content protection method to which the present technology is applied, the ISO base media file format and a file format based on the CE (Common Encryption) are adopted.

Figure 21:
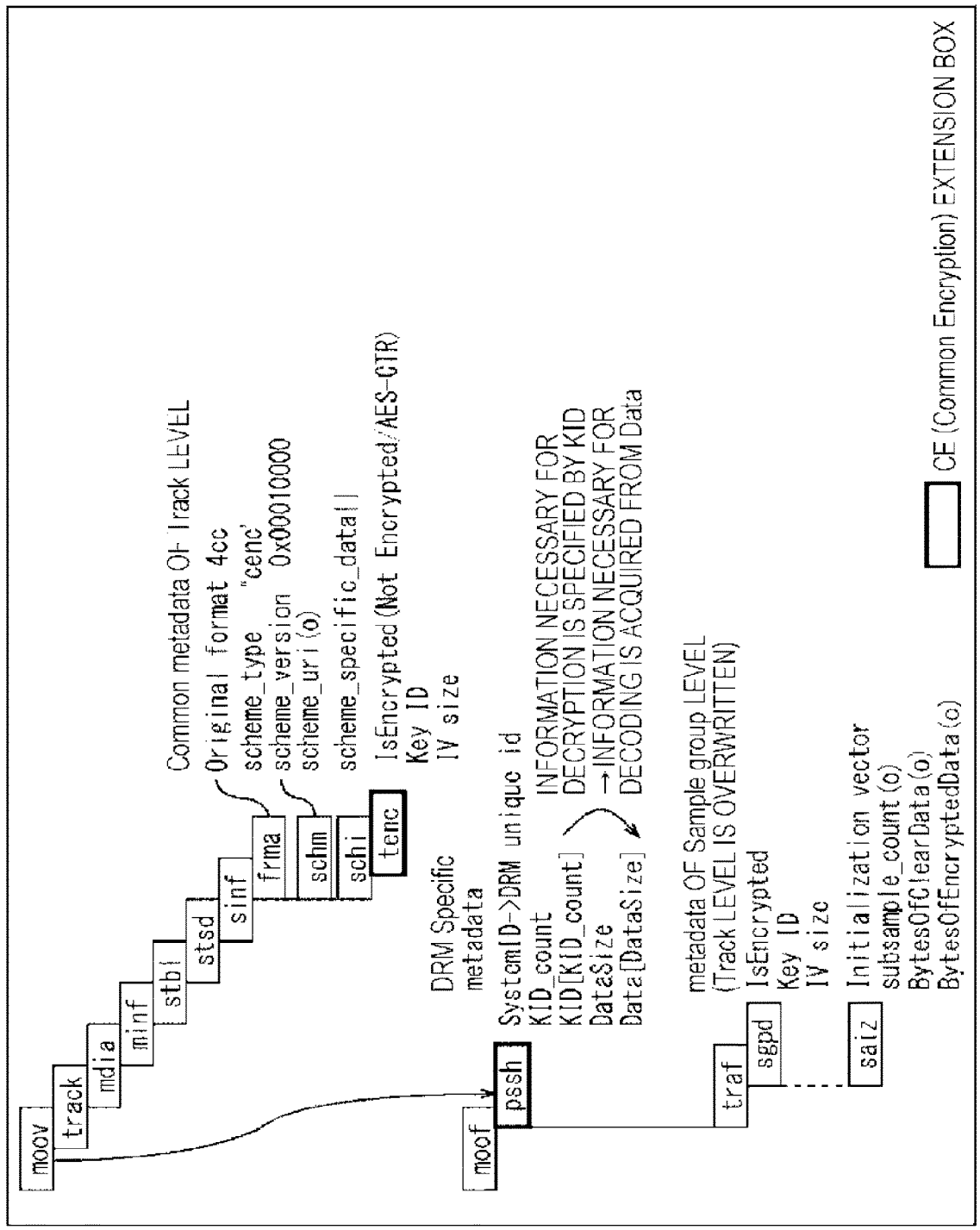
FIG. 21 is a diagram illustrating a box structure of a file of an ISO base media file format in a tree structure.

FIG. 21 illustrates a box structure of a file of the ISO base media file format in a tree structure, and a tenc box of a moov box, and the pssh box of a moof box are a CE (CommonEncryption) extension box. Here, for example, actual data of a Ks_ID for decoding a file of a fragment, a CA_System_ID (an ID for specifying the DRM type to be used) for indicating a system ID of the pssh box, and a CA_DescriptorECM are arranged in the pssh box.

However, when the LocationType of the CA_Descriptor (information for acquiring the ECM) is other than a metabox (a component box) of the component, the actual data of the ECM is not arranged. A moov (movie box) is a box which configures an initialization segment (Initialization Segment) transferred separately from the media segment (Media Segment), and in which the overall control information is stored.

Figure 22:
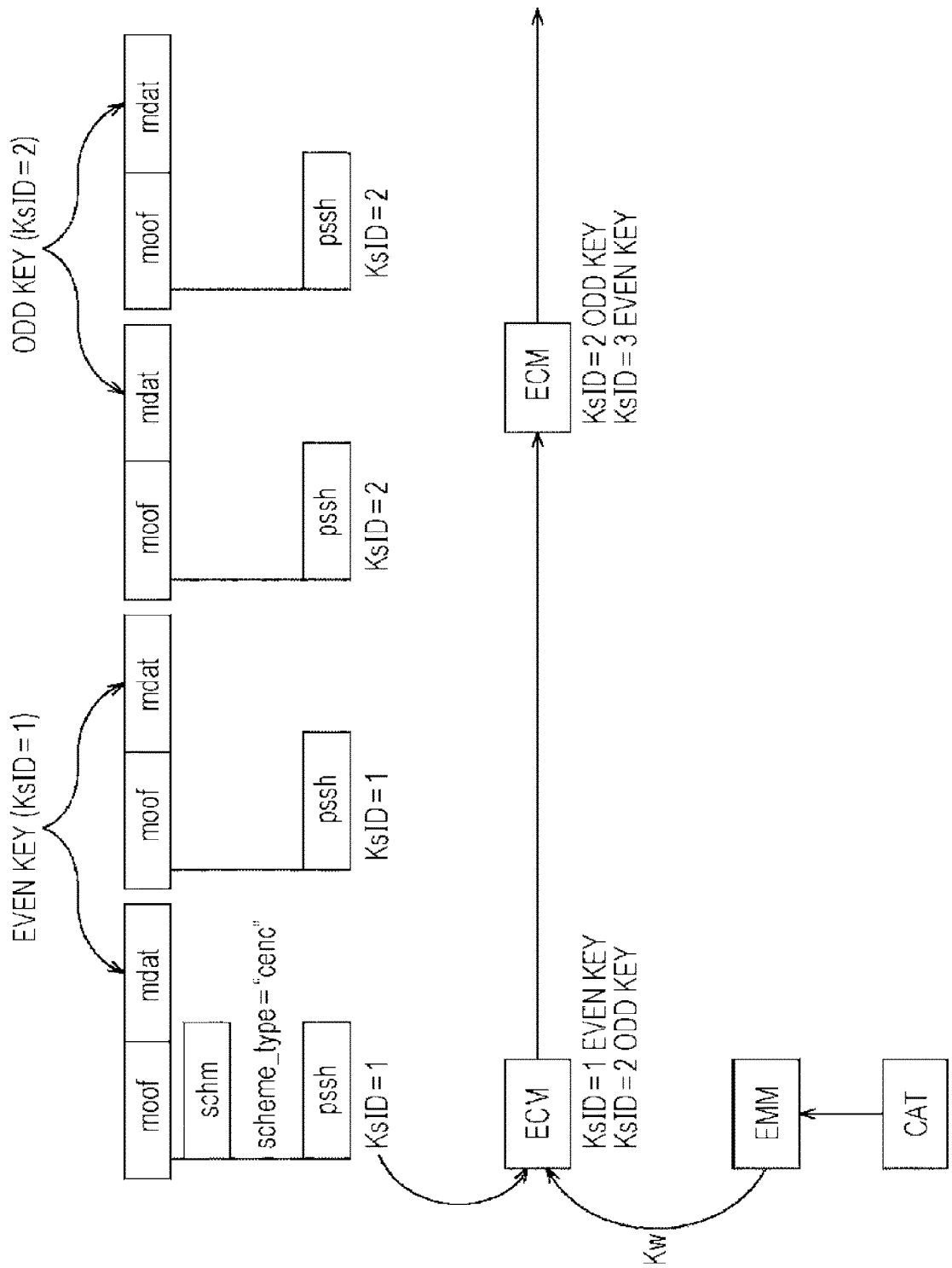
FIG. 22 is a diagram illustrating timing of decoding of a scramble key (Ks) performed on a receiver side.

Here, with reference to FIG. 22, the timing of decoding of the scramble key (Ks) performed on the receiver side in FIG. 20 will be described in details. In FIG. 22, the direction of the time proceeds from the left to the right in the drawing.

In FIG. 22, scheme_type="cenc" of a schm of the moof indicates that the CE (Common Encryption) is used.

There are four media segments in the drawing indicating that Ks_ID=1 is designated in a pssh of the moof in the first and second media segments from the head, and the data of the component stored in the corresponding mdat is decoded by the scramble key (Ks) of Ks_ID=1. The drawing also indicates that Ks_ID=2 is designated in the pssh of the moof in the third and fourth media segments from the head, and the data of the component stored in the corresponding mdat is decoded by the scramble key (Ks) of Ks_ID=2.

In the receiver, the EMM is acquired from the LLS and the like so as to be stored based on the location information of the CA_Descriptor (the information for acquiring the EMM) of the CAT obtained from the LLS. The ECM is acquired from the SCS based on the location information of the CA_Descriptor (information for acquiring the ECM) of the SPT obtained from the SCS of particular broadcasting service. In the ECM, as the scramble key (Ks), two types of keys such as the scramble key (even key) and the scramble key (odd key) are included, and are decoded by using the work key (Kw) of the stored EMM.

Here, for example, the scramble key (even key) is a key for decoding the current encoded component. Moreover, for example, the scramble key (odd key) is a key for decoding the next encoded component. That is, the key for decoding the component can be changed by alternately utilizing the scramble keys (Ks). However, in the latest ECM, the scramble key (Ks) for decoding the encoded component configuring the broadcasting service currently live on the air is necessarily stored. The number of stored the scramble keys (Ks) to be sequentially used is designated in a KsNumber.

In other words, the data of the component stored in the mdat of the first and second media segments from the head is decoded by the scramble key (even key) of Ks_ID=1, and the data of the component stored in the mdat of the third and fourth media segments from the head is decoded by the scramble key (odd key) of Ks_ID=2. In the ECM which is successively acquired, the scramble key (odd key) of Ks_ID=2 and the scramble key (even key) of Ks_ID=3 are included.

4. Broadcasting Service and Key Layer Model

Subsequently, with reference to FIGS. 23 to 17, a relationship between the broadcasting service provided by each broadcasting station, and the scramble key (Ks) for decoding the encoded component configuring the broadcasting service thereof will be described using plural layer models.

(1) Broadcasting Service and Key Layer Model 1

Figure 23:
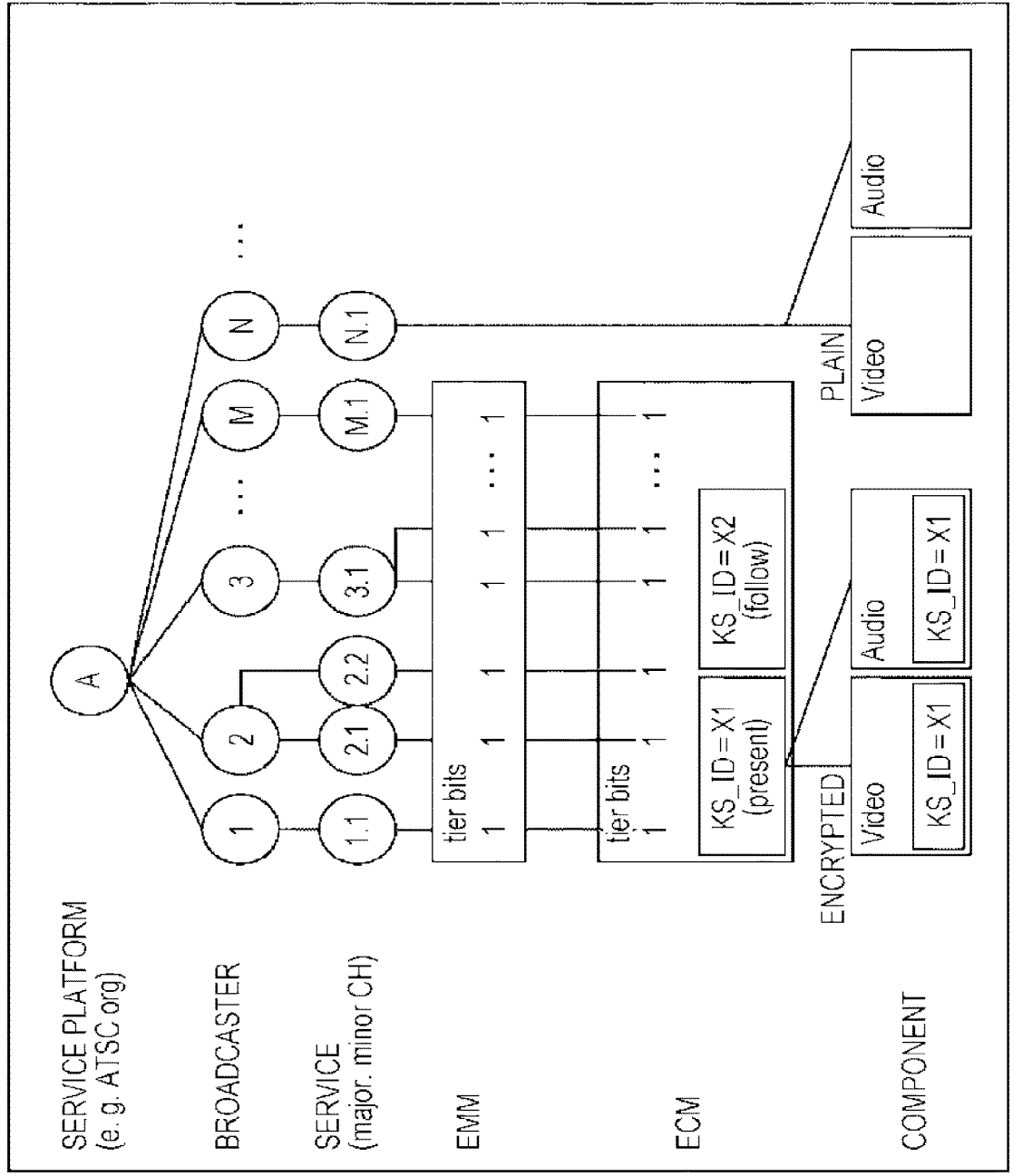
FIG. 23 is a diagram illustrating a structure of the broadcasting service and a key layer model 1.

FIG. 23 is a diagram illustrating a structure of the broadcasting service and a key layer model 1.

The broadcasting service and the key layer model 1 in FIG. 23 indicate a relationship between the broadcasting service and the scramble key (Ks) when the broadcasting station (Broadcaster) of one to M (M is an integer of 1 or more) provides one or the plurality of items of broadcasting service (Service) through a certain service platform (Service Platform).

In FIG. 23, the broadcasting service is indicated by major and minor channels (CH). For example, the broadcasting station 1 provides only a broadcasting service 1 (CH 1.1), but a broadcasting station 2 provides two items of the broadcasting service such as a broadcasting service 2 (CH 2.1) and the broadcasting service 2 (CH 2.2).

The tier bits (tier bits) of the EMM indicate whether or not the targeted receiver has registered each item of the broadcasting service. Between the bits of "0" and "1", the bit corresponding to the registered broadcasting service is "1". Basically, one tier bit is allocated to one item of the broadcasting service. However, the plurality of tier bits can be allocated to one item of the broadcasting service. In FIG. 23, two tier bits are allocated to a broadcasting service 3 (CH 3.1) of a broadcasting station 3. For example, it is possible to operate the contract forms to be different from one another within the same broadcasting service.

There is one-to-one correspondence between the tier bits (tier bits) of the ECM and the tier bits of the EMM, indicating the broadcasting service in which the provided scramble key (Ks) of the component (Component) belongs. In FIG. 23, with respect to the broadcasting service 1 to M provided by the broadcasting station 1 to M, there is provided the common scramble key (Ks) specified by the Ks_IDs (X1, X2), and the encoded components (Video, Audio) of each item of the broadcasting service are decoded by using the corresponding scramble key (Ks).

In the broadcasting service and the key layer model 1 of FIG. 23, as the Ks_ID, X1 for a current value (present) and X2 for a successive value (follow) are exemplified. The Ks_ID changes minute by minute. For example, the Ks_ID successively changes as time proceeds, such as X2, X3, X4, and so on while having X1 for the starting value. In FIG. 23, the component is operated to be encoded in the broadcasting station 1 to M, but the component is operated not to be encoded in a broadcasting station N. Therefore, in the receiver, when broadcasting service N (CH N.1) is selected, it is not necessary to decrypt the encoded component configuring the broadcasting service N.

(2) Broadcasting Service and Key Layer Model 2

Figure 24:
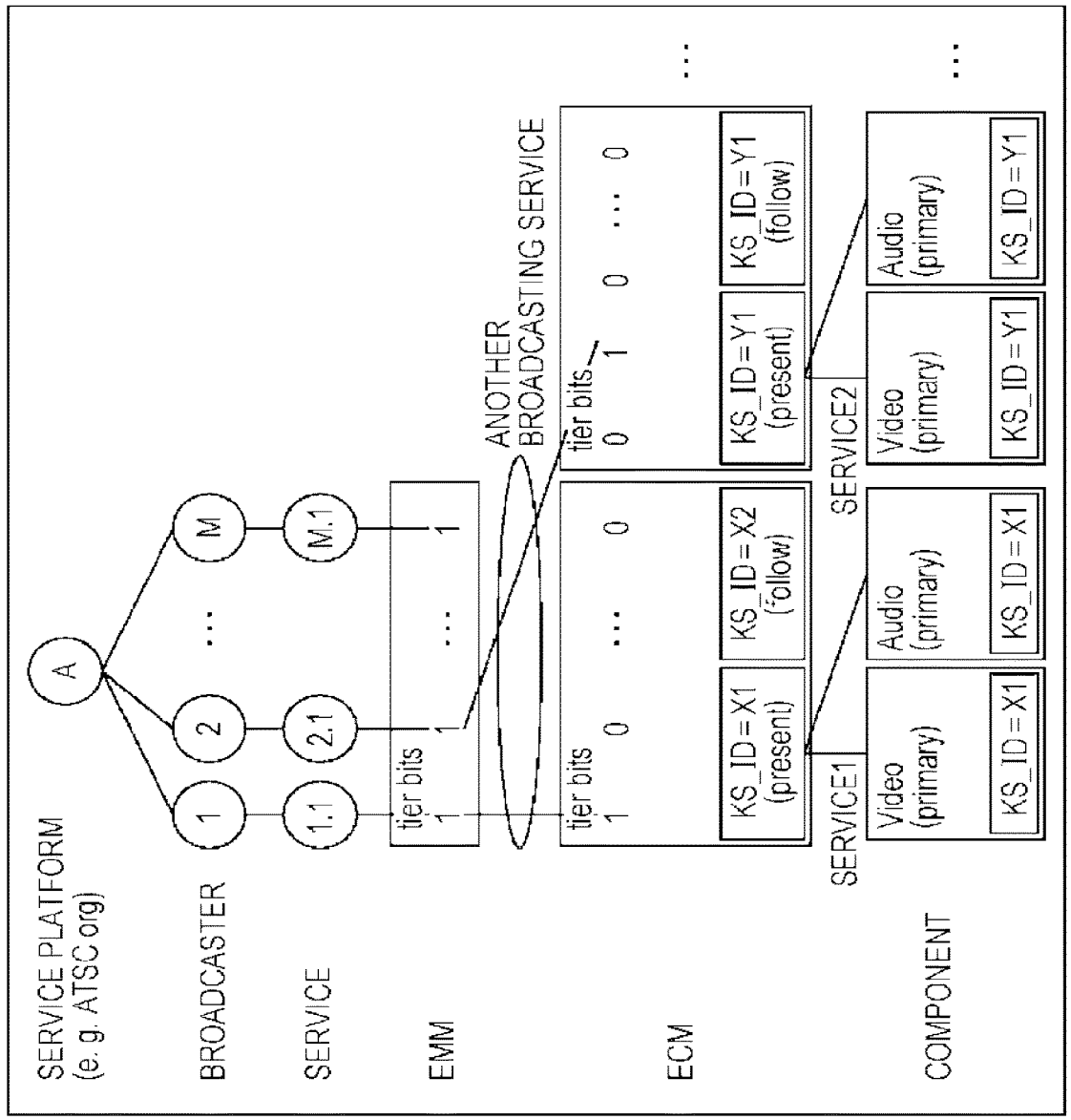
FIG. 24 is a diagram illustrating a structure of the broadcasting service and a key layer model 2.

FIG. 24 is a diagram illustrating a structure of the broadcasting service and a key layer model 2.

The broadcasting service and the key layer model 2 in FIG. 24 indicate a relationship between the broadcasting service and the scramble key (Ks) in a case of providing the different scramble key (Ks) for each item of the broadcasting service when the broadcasting station of one to M provides one or the plurality of items of broadcasting service through a certain service platform.

In FIG. 24, the different ECM is provided for each item of the broadcasting service. That is, in the tier bits of the EMM, the first bit is allocated to the broadcasting service 1 (CH 1.1) provided by the broadcasting station 1, and the second bit is allocated to the broadcasting service 2 (CH 2.1) provided by the broadcasting station 2, respectively. Thus, the different ECM is provided for each item of the broadcasting service.

For example, in the receiver under contract to the broadcasting service 1, for example, the EMM of which the first bit is "1" is acquired via broadcasting or a communication network. In the receiver, the channel of the broadcasting service 1 is selected based on the initial scanning information, and thus, the ECM can be acquired from the SCS of the broadcasting service 1. In the tier bits of the ECM of the broadcasting service 1, the first bit is "1" so as to correspond to the tier bit of the EMM, and thus, the scramble key (Ks) for the component of the broadcasting service 1 can be acquired. That is, the scramble key (Ks) specified by the Ks_IDs (X1, X2, and so on) is provided with respect to the broadcasting service 1, and thus, the encoded components (Video, Audio) of the broadcasting service 1 are decoded by using the corresponding scramble key (Ks).

Similarly, for example, in the receiver under contract to the broadcasting service 2, the EMM of which the second bit is "1" is acquired, and the channel of the broadcasting service 2 is selected, thereby acquiring the ECM from the SCS of the broadcasting service 2. In the tier bits of the ECM of the broadcasting service 2, the second bit is "1" so as to correspond to the tier bit of the EMM. The scramble keys (Ks) (Ks_ID=Y1, Y2, and so on) for the component of the broadcasting service 2 are sequentially acquired, and thus, the encoded components (Video, Audio) of the broadcasting service 2 can be decoded.

In the broadcasting service and the key layer model 2 of FIG. 24, it is acceptable as long as the Ks_ID is a unique value by the broadcasting service as a unit. Even if Ks_ID (=X1) in the ECM of the broadcasting service 1 and Ks_ID (=Y1) in the ECM of the broadcasting service 2 are the same value, the values can be distinguished by the upper IP address.

(3) Broadcasting Service and Key Layer Model 3

Figure 25:
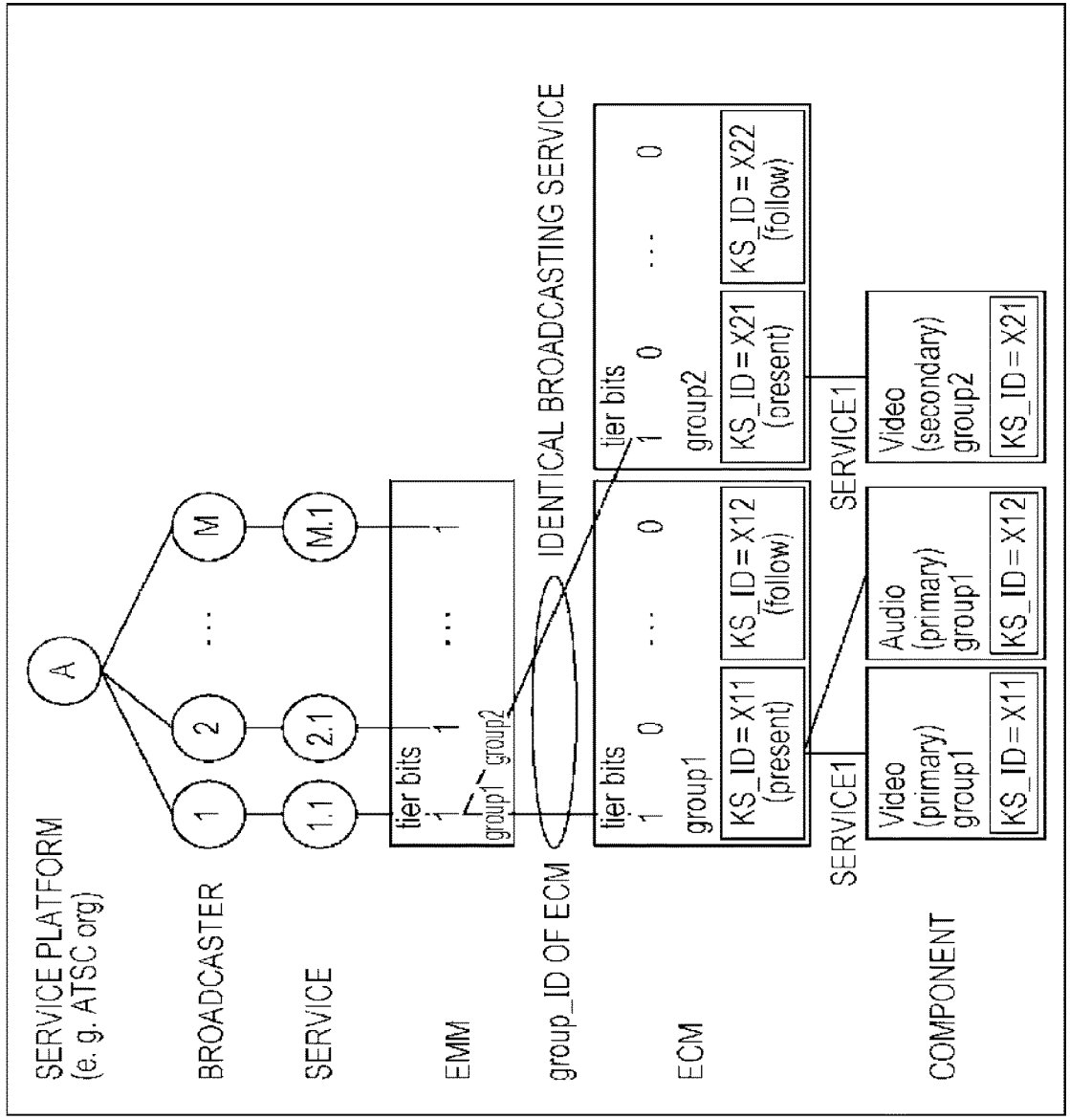
FIG. 25 is a diagram illustrating a structure of the broadcasting service and a key layer model 3.

FIG. 25 is a diagram illustrating a structure of the broadcasting service and a key layer model 3.

The broadcasting service and the key layer model 3 in FIG. 25 indicate a relationship between the broadcasting service and the scramble key (Ks) in a case of dividing the component into a plurality of groups when the broadcasting station of one to M provides one or the plurality of items of broadcasting service through a certain service platform.

In FIG. 25, within the same broadcasting service, the different ECM is provided for each group. That is, in the tier bits of the EMM, the first bit is allocated to the broadcasting service 1 (CH 1.1) provided by the broadcasting station 1, and the plurality of ECMs having the different group IDs from each other are provided with respect to the broadcasting service 1.

For example, when providing charge-free basic broadcasting service and charged premium broadcasting service in the broadcasting service 1, the ECM of a group 1 for acquiring the scramble key (Ks) for the component of the basic broadcasting service and the ECM of a group 2 for acquiring the scramble key (Ks) for the component of the premium broadcasting service are individually prepared. Then, in the receiver, filtering of the utilizable component is performed with the tier bits and the contracted group ID. Thus, in the receiver under the basic contract, only the ECM of the group 1 is acquired from the SCS of the broadcasting service 1, and in the receiver under the premium contract, not only the ECM of the group 1 but also the ECM of the group 2 is acquired.

In other words, the scramble key (Ks) specified by the Ks_IDs (X11, X12, and so on) is provided with respect to the basic broadcasting service of the broadcasting service 1, the encoded components (Video primary, Audio primary) of the basic broadcasting service are decoded by using the corresponding scramble key (Ks). The scramble key (Ks) specified by the Ks_IDs (X21, X22, and so on) is provided with respect to the premium broadcasting service of the broadcasting service 1, the encoded component (Audio secondary) of the premium broadcasting service is decoded by using the scramble key (Ks). For example, in the premium broadcasting service, sound of 22.2 ch is provided as the encoded component, and thus, only the receiver under the premium contract can output more realistic sound.

In the broadcasting service and the key layer model 3 of FIG. 25, since the group 1 and the group 2 are the same broadcasting service, the uniqueness of the Ks_ID can be maintained.

(4) Broadcasting Service and Key Layer Model 4

Figure 26:
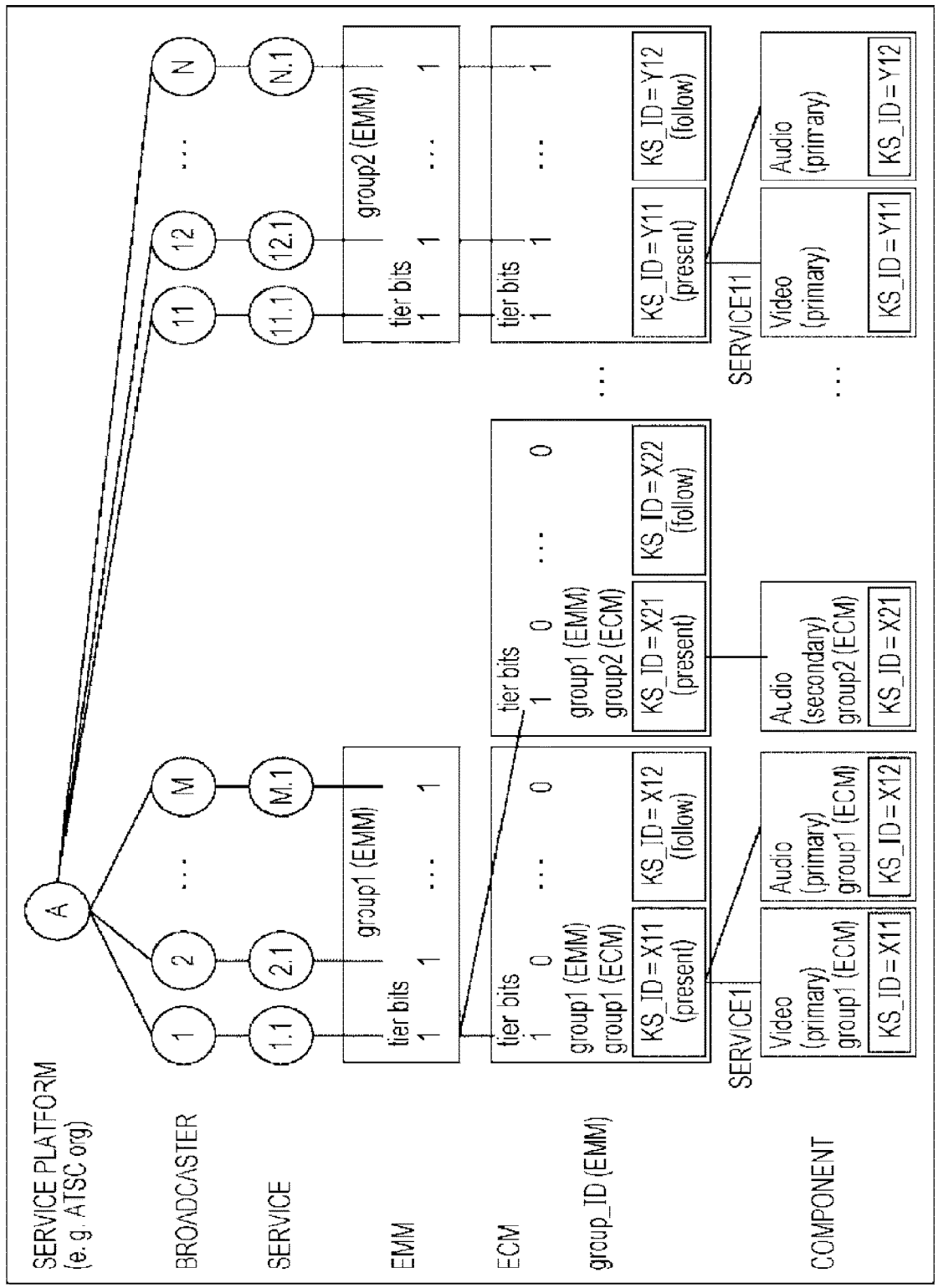
FIG. 26 is a diagram illustrating a structure of the broadcasting service and a key layer model 4.

FIG. 26 is a diagram illustrating a structure of the broadcasting service and a key layer model 4.

The broadcasting service and the key layer model 4 in FIG. 26 indicate a relationship between the broadcasting service and the scramble key (Ks) in a case of providing a plurality of EMM sequences when the broadcasting station of one to M provides one or the plurality of items of broadcasting service through a certain service platform.

In FIG. 26, the plurality of EMM sequences are provided in one service platform. That is, the EMM is divided into the group 1 and the group 2. The EMM of the group 1 is allocated to the broadcasting service provided by the broadcasting station 1 to M, and the EMM of the group 2 is allocated to the broadcasting service provided by the broadcasting station 11 to N.

In the sequences of the EMM of the group 1, for example, the different EMM is provided for the each group in the broadcasting service 1 provided by the broadcasting station 1. In the receiver, filtering of the utilizable component is performed with the tier bits and the contracted group ID. For example, in a case of the basic contract, the encoded components (Video primary, Audio primary) of the basic broadcasting service are decoded by using the scramble key (Ks) which is specified by the Ks_IDs (X11, X12, and so on) of the ECM of the group 1. In the receiver, for example, in a case of the premium contract, the encoded component (Audio secondary) of the premium broadcasting service is decoded by using the scramble key (Ks) specified by the Ks_IDs (X21, X22, and so on) of the ECM of the group 2.

Meanwhile, in the sequences of the EMM of the group 2, there is one-to-one correspondence between the tier bits of the ECM and the tier bits of the EMM, and thus, for example, the encoded components (Video primary, Audio primary) of the broadcasting service 11 provided by the broadcasting station 11 are decoded by using the scramble key (Ks) which is specified by the Ks_IDs (Y11, Y12, and so on).

In this manner, in the broadcasting service and the key layer model 4 of FIG. 26, since the plurality of EMM sequences can be provided, for example, the EMM sequences are categorized by regional groups or categorized by the form of contract such as charge-free and charged, thereby making it possible to cope with various operational forms.

(5) Broadcasting Service and Key Layer Model 5

Figure 27:
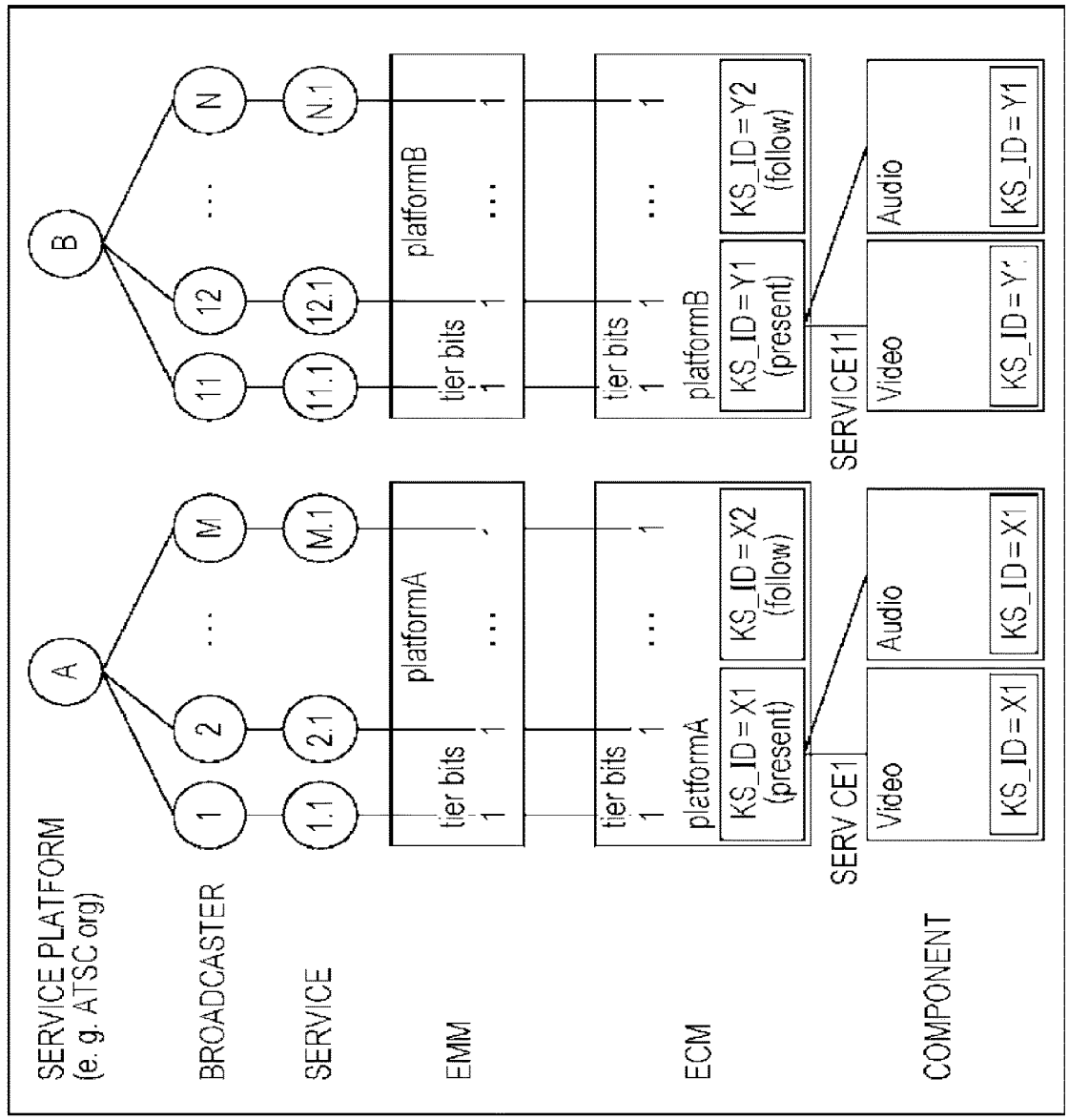
FIG. 27 is a diagram illustrating a structure of the broadcasting service and a key layer model 5.

FIG. 27 is a diagram illustrating a structure of the broadcasting service and a key layer model 5.

The broadcasting service and the key layer model 5 in FIG. 27 indicate a relationship between the broadcasting service and the scramble key (Ks) in a case of simultaneously providing the broadcasting service by the broadcasting stations through a plurality of service platforms.

In FIG. 27, there are a platform A and a platform B in present. In the platform A, the items of the broadcasting service 1 to M are provided by the broadcasting stations 1 to M, and there is one-to-one correspondence between the EMM and the ECM of the platform A. Accordingly, for example, the encoded components (Video, Audio) of the broadcasting service 1 provided by the broadcasting station 1 are decoded by using the scramble key (Ks) which is specified by the Ks_IDs (X1, X2, and so on).

In the platform B, the items of the broadcasting service 11 to N are provided by the broadcasting stations 11 to N, and there is one-to-one correspondence between the EMM and the ECM of the platform B. Accordingly, for example, the encoded components (Video, Audio) of the broadcasting service 11 provided by the broadcasting station 11 are decoded by using the scramble key (Ks) which is specified by the Ks_IDs (Y1, Y2, and so on).

In this manner, in the broadcasting service and the key layer model 5 of FIG. 27, since the broadcasting service can be simultaneously provided through the plurality of service platforms, for example, it is possible to operate the platforms by dividing into digital television broadcasting managed by ATSC (Advanced Television Systems Committee), and cable broadcasting by cable television.

5. CAS Related Information

Subsequently, with reference to FIGS. 28 to 37, a relationship between each item of the information in the information related to the aforementioned CAS (hereinafter, referred to as "CAS related information") will be described.

(1-a) CAS Related Information (EMM:LLS, ECM:SCS)

Figure 28:
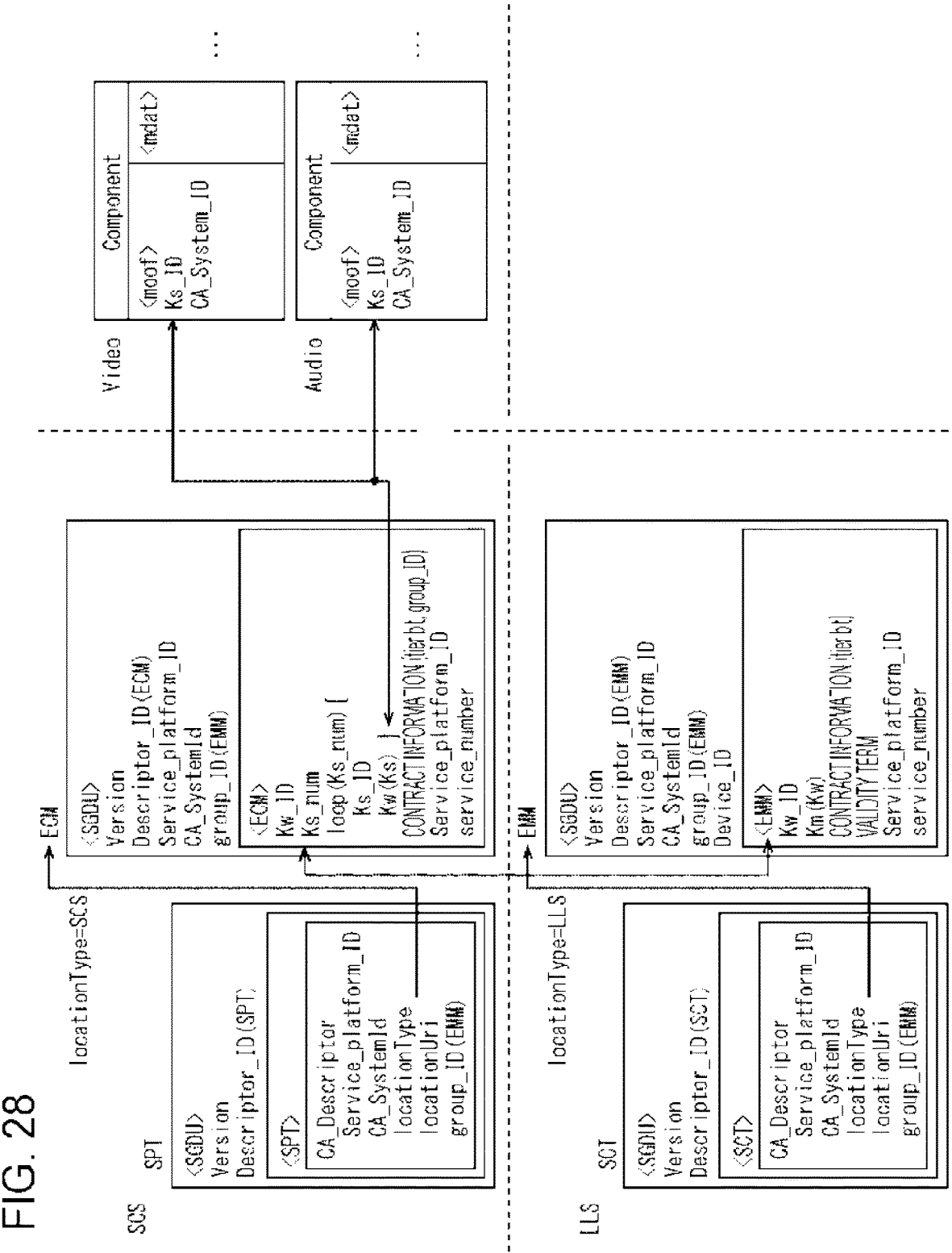
FIG. 28 is a diagram systematically illustrating overall CAS related information (EMM:LLS, ECM:SCS).

FIG. 28 is a diagram systematically illustrating overall CAS related information (EMM:LLS, ECM:SCS).

In the CAS related information of FIG. 28, the CA_Descriptor (the information for acquiring the EMM) is arranged in the SCT, and the EMM is transferred by the LLS. The CA_Descriptor (information for acquiring the ECM) is arranged in the SPT, and the ECM is transferred by the SCS. In respect of the group, all belong to the same group.

In FIG. 28, since LocationType=LLS is designated in the CA_Descriptor of the SCT, the EMM transferred by the LLS is acquired in accordance with the URI indicated by a locationUri, thereby being stored. Thereafter, when selecting of channel is performed and the SCS of particular broadcasting service is acquired, since LocationType=SCS is designated in the CA_Descriptor of the SPT, the ECM transferred by the SCS is acquired in accordance with the URI indicated by the locationUri.

The scramble key (Ks) related to the encoded component of particular broadcasting service by the Ks_ID is acquired from the ECM. However, since the scramble key (Ks) is encoded by using the work key (Kw), the scramble key (Ks) is decoded by using the stored work key (Kw) of the EMM. The encoded components (Video, Audio) of particular broadcasting service are decoded by using the scramble key (Ks) which is acquired in such a manner.

(1-b) CAS Related Information (EMM:LLS, ECM:SCS)

Figure 29:
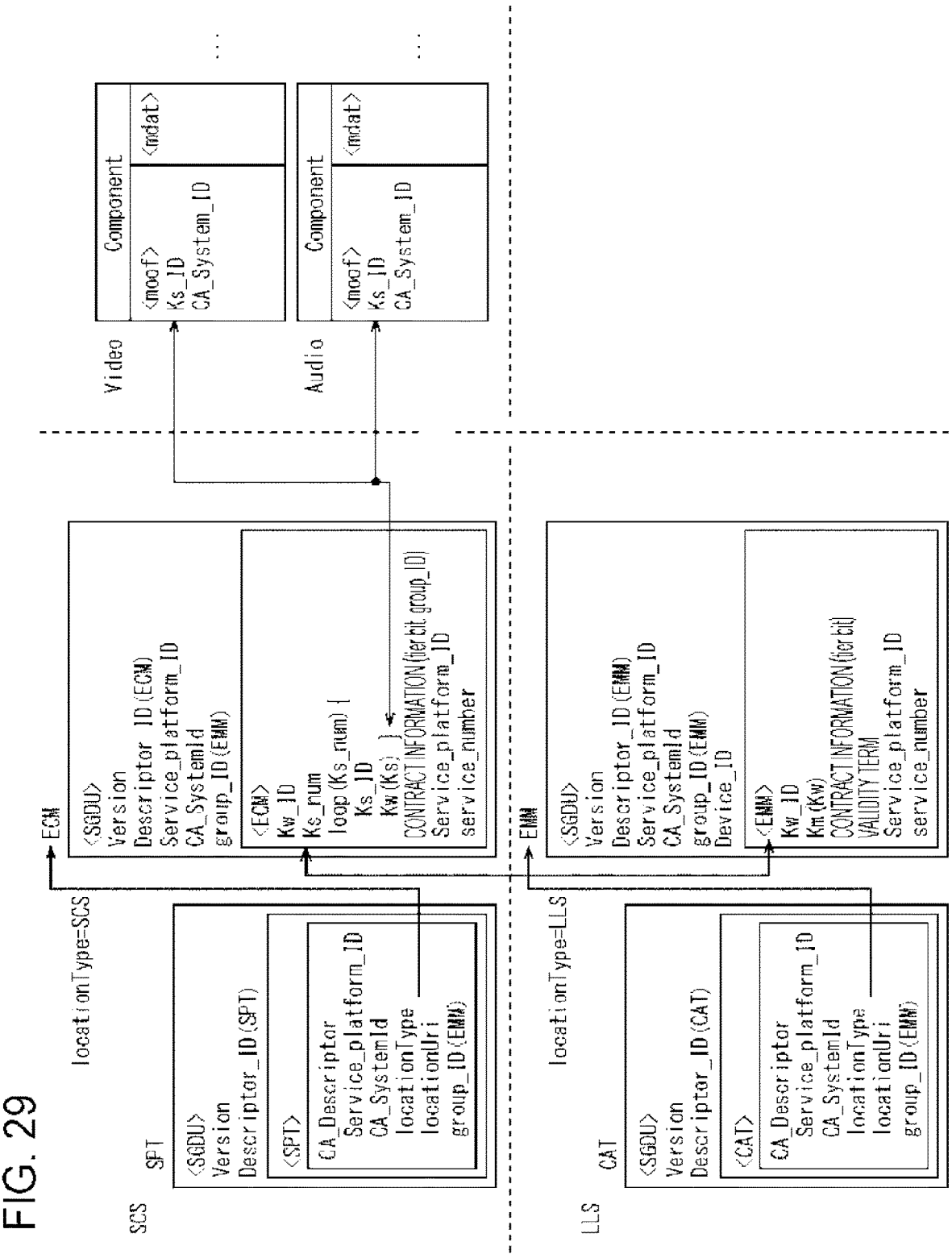
FIG. 29 is another diagram systematically illustrating the overall CAS related information (EMM:LLS, ECM:SCS).

FIG. 29 is another diagram systematically illustrating the overall CAS related information (EMM:LLS, ECM:SCS).

In the CAS related information of FIG. 29, the CA_Descriptor (the information for acquiring the EMM) is arranged in the CAT, and the EMM is transferred by the LLS. The CA_Descriptor (information for acquiring the ECM) is arranged in the SPT, and the ECM is transferred by the SCS. In respect of the group, all belong to the same group.

In FIG. 29, since LocationType=LLS is designated in the CA_Descriptor of the SCT, the EMM transferred by the LLS is acquired in accordance with the URI indicated by the locationUri, thereby being stored. Thereafter, when selecting of channel is performed and the SCS of particular broadcasting service is acquired, since LocationType=SCS is designated in the CA_Descriptor of the SPT, the ECM transferred by the SCS is acquired in accordance with the URI indicated by the locationUri.

The scramble key (Ks) related to the encoded component of particular broadcasting service by the Ks_ID is acquired from the ECM. However, since the scramble key (Ks) is encoded by using the work key (Kw), the scramble key (Ks) is decoded by using the stored work key (Kw) of the EMM. The encoded components (Video, Audio) of particular broadcasting service are decoded by using the scramble key (Ks) which is acquired in such a manner.

(1-c) CAS Related Information (EMM:Network, ECM:SCS)

Figure 30:
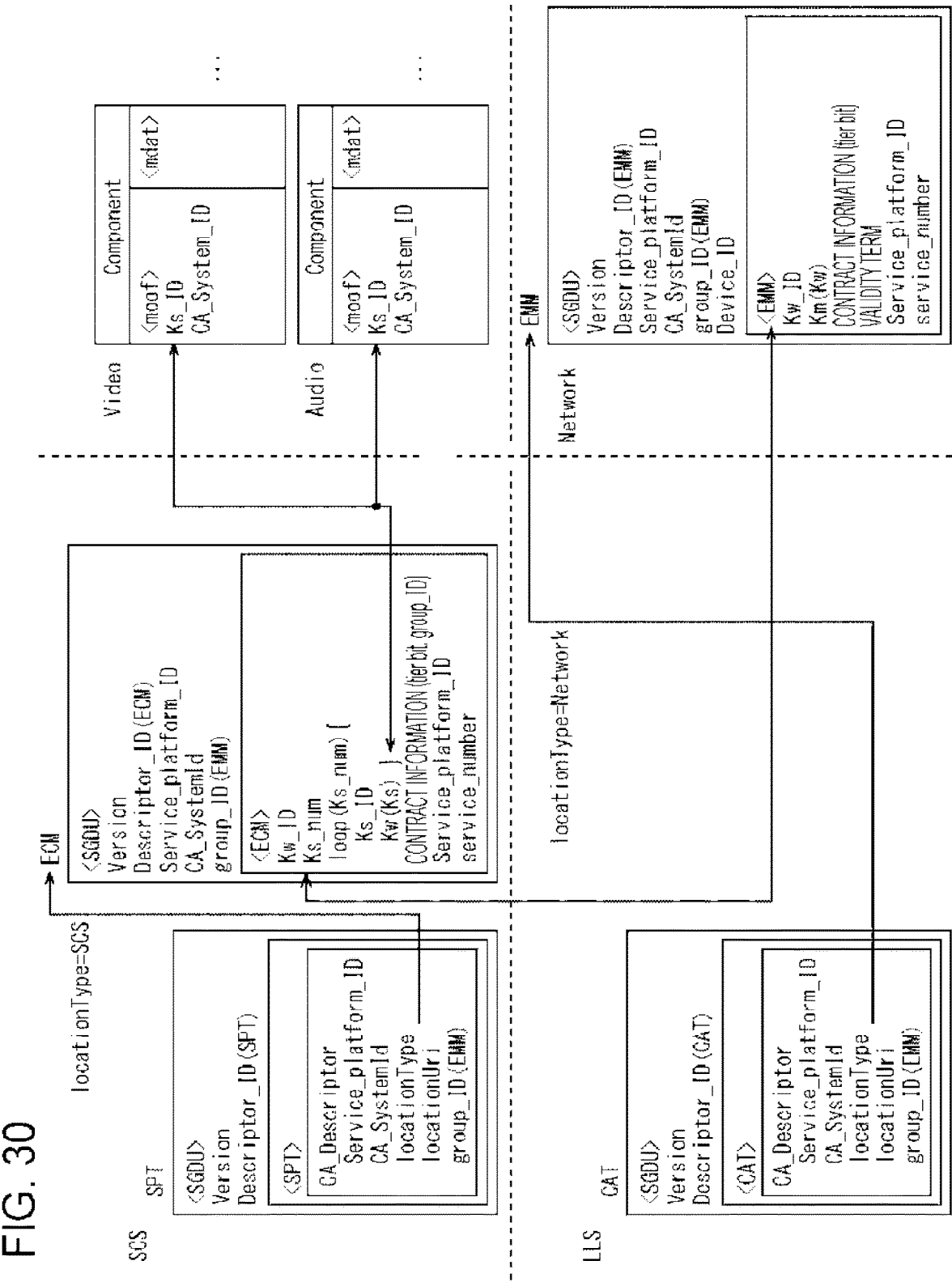
FIG. 30 is another diagram systematically illustrating the overall CAS related information (EMM:Network, ECM:SCS).

FIG. 30 is a diagram systematically illustrating the overall CAS related information (EMM:Network, ECM:SCS).

In the CAS related information of FIG. 30, the CA_Descriptor (the information for acquiring the EMM) is arranged in the CAT, and the EMM is transferred through the communication network. The CA_Descriptor (information for acquiring the ECM) is arranged in the SPT, and the ECM is transferred by the SCS. In respect of the group, all belong to the same group.

In FIG. 30, since LocationType=Network is designated in the CA_Descriptor of the CAT, the EMM is acquired through access to the EMM server on the internet in accordance with the URI indicated by the locationUri, thereby being stored. Thereafter, when selecting of channel is performed and the SCS of particular broadcasting service is acquired, since LocationType=SCS is designated in the CA_Descriptor of the SPT, the ECM transferred by the SCS is acquired in accordance with the URI indicated by the locationUri.

The scramble key (Ks) related to the encoded component of particular broadcasting service by the Ks_ID is acquired from the ECM. However, since the scramble key (Ks) is encoded by using the work key (Kw), the scramble key (Ks) is decoded by using the stored work key (Kw) of the EMM. The encoded components (Video, Audio) of particular broadcasting service are decoded by using the scramble key (Ks) which is acquired in such a manner.

(1-d) CAS Related Information (EMM:LLS, ECM:Component)

Figure 31:
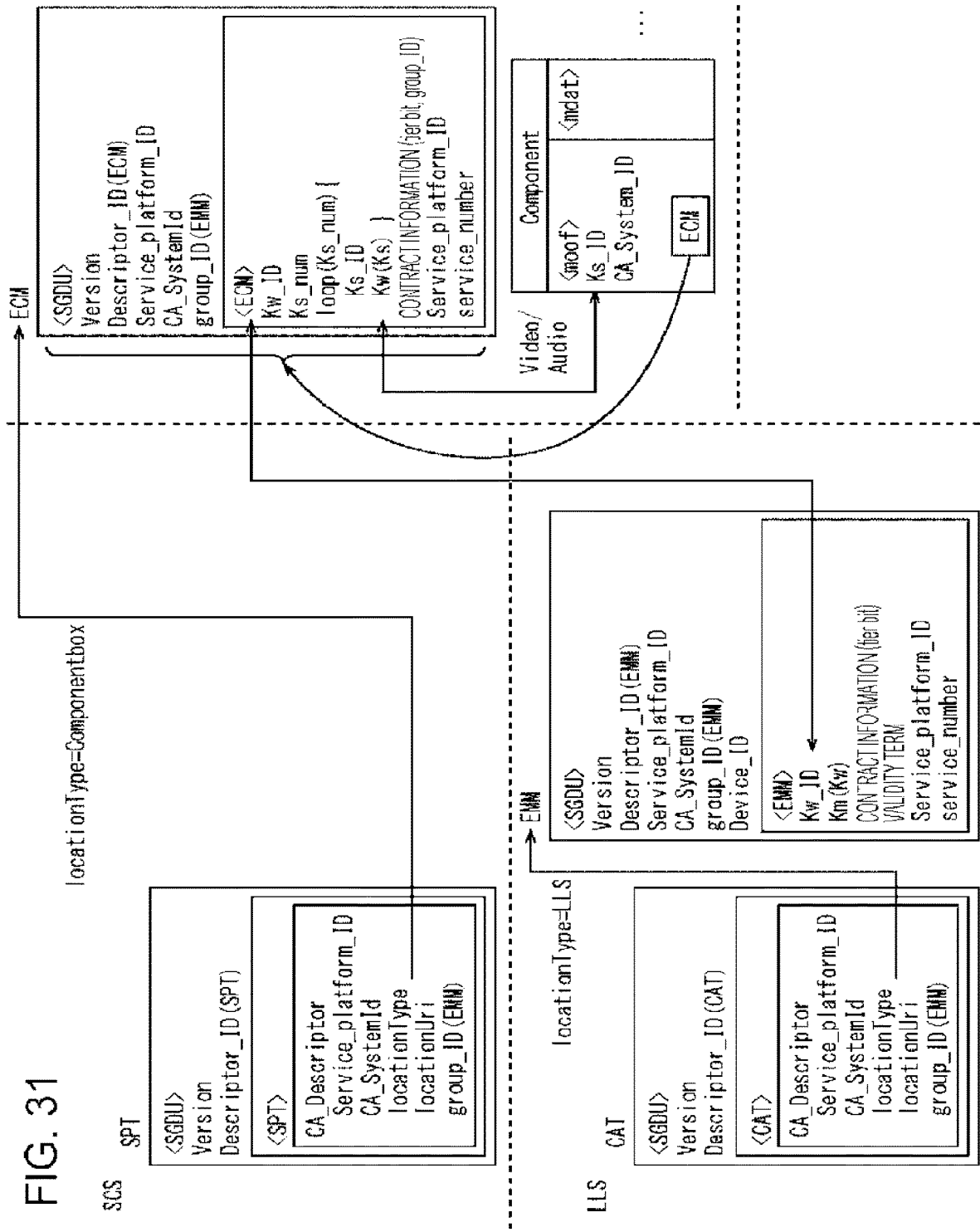
FIG. 31 is another diagram systematically illustrating the overall CAS related information (EMM:LLS, ECM:Component).

FIG. 31 is another diagram systematically illustrating the overall CAS related information (EMM: LLS, ECM:Component).

In the CAS related information of FIG. 31, the CA_Descriptor (the information for acquiring the EMM) is arranged in the CAT, and the EMM is transferred by the LLS. The CA_Descriptor (information for acquiring the ECM) is arranged in the SPT, and the ECM is designated in the component. In respect of the group, all belong to the same group.

In FIG. 31, since LocationType=LLS is designated in the CA_Descriptor of the CAT, the EMM transferred by the LLS is acquired in accordance with the URI indicated by the locationUri, thereby being stored. Thereafter, when selecting of channel is performed and the SCS of particular broadcasting service is acquired, since LocationType=component box is designated in the CA_Descriptor of the SPT, the ECM designated in the component is acquired in accordance with the URI indicated by the locationUri. That is, since the component box is designated in the LocationType of the CA_Descriptor (information for acquiring the ECM), the actual data of the ECM arranged in the pssh box of the moof box is acquired.

The scramble key (Ks) related to the encoded component of particular broadcasting service by the Ks_ID is acquired from the ECM. However, since the scramble key (Ks) is encoded by using the work key (Kw), the scramble key (Ks) is decoded by using the stored work key (Kw) of the EMM. The encoded components (Video, Audio) of particular broadcasting service are decoded by using the scramble key (Ks) which is acquired in such a manner.

(1-e) CAS Related Information (EMM:LLS, ECM:NRT)

Figure 32:
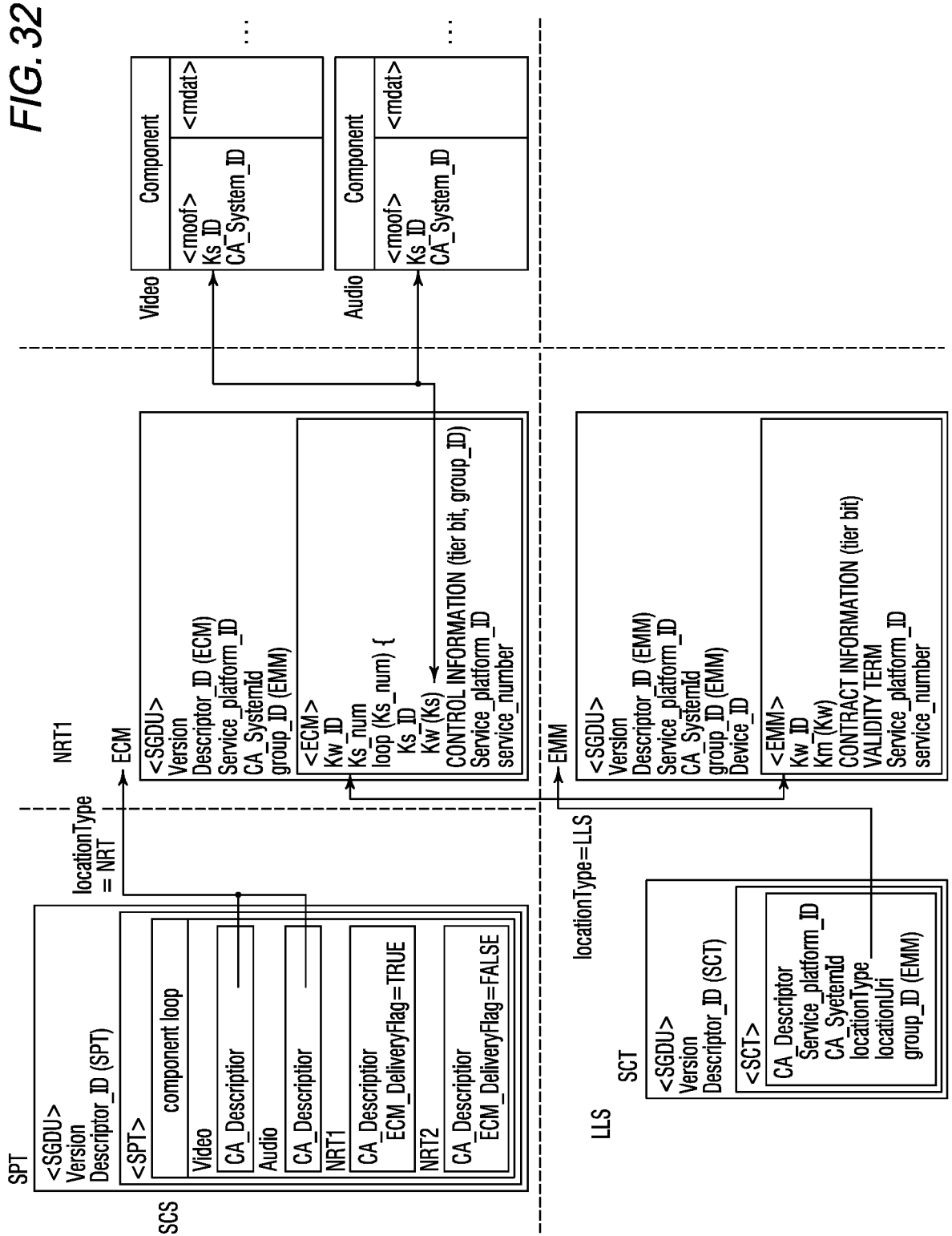
FIG. 32 is another diagram systematically illustrating the overall CAS related information (EMM:LLS, ECM:NRT).

FIG. 32 is a diagram systematically illustrating the overall CAS related information (EMM:LLS, ECM:NRT).

In the CAS related information of FIG. 32, the CA_Descriptor (the information for acquiring the EMM) is arranged in the SCT, and the EMM is transferred by the LLS. The CA_Descriptor (information for acquiring the ECM) is arranged in the SPT, and the ECM is transferred by utilizing the NRT session. In respect of the group, all belong to the same group.

In FIG. 32, since LocationType=LLS is designated in the CA_Descriptor of the SCT, the EMM transferred by the LLS is acquired in accordance with the URI indicated by the locationUri, thereby being stored. Thereafter, selecting of channel is performed and the SCS of particular broadcasting service is acquired. Here, the CA_Descriptor for video is designated in the component loop of the SPT, and LocationType=NRT is designated in the CA_Descriptor for audio. Since ECM_DeliveryFlag=TRUE is designated in an NRT 1 and ECM_DeliveryFlag=FALSE is designated in an NRT 2, the ECM is acquired from the session of the NRT 1 out of the plurality of NRT sessions.

The scramble key (Ks) related to the encoded component of particular broadcasting service by the Ks_ID is acquired from the ECM. However, since the scramble key (Ks) is encoded by using the work key (Kw), the scramble key (Ks) is decoded by using the stored work key (Kw) of the EMM. The encoded components (Video, Audio) of particular broadcasting service are decoded by using the scramble key (Ks) which is acquired in such a manner.

(2) CAS Related Information (Checking Viewing-Listening Propriety with Tier Bits of ECM)

Figure 33:
FIG. 33 is a diagram systematically illustrating the overall CAS related information in a case of checking viewing-listening propriety with tier bits of the ECM.

FIG. 33 is a diagram systematically illustrating the overall CAS related information in a case of checking viewing-listening propriety with tier bits of the ECM.

In the CAS related information of FIG. 33, the CA_Descriptor (the information for acquiring the EMM) is arranged in the CAT, and the EMM is transferred by the LLS. The CA_Descriptor (information for acquiring the ECM) is designated in the component loop of the SPT, thereby making it possible to check viewing-listening propriety for each component with tier bits of the ECM.

In FIG. 33, since LocationType=LLS is designated in the CA_Descriptor of the CAT, the EMM transferred by the LLS is acquired in accordance with the URI indicated by the locationUri, thereby being stored. Thereafter, selecting of channel is performed and the SCS of particular broadcasting service is acquired. Two CA_Descriptors are arranged in the component loop of the SPT, and thus, the ECM can be acquired by using the CA_Descriptor for each of the components thereof.

Here, tier bit="11" as the tier bits of the contract information is designated in the EMM. In respect of the tier bits of the contract information of the ECM, tier bit="01" is designated in the ECM on one side, and tier bit="10" is designated in the ECM on the other side. In the receiver, filtering of the utilizable component is performed using the tier bits thereof. Thus, the encoded component (Video) is decoded by using the scramble key (Ks) obtained from the ECM (tier bit="01") on one side, and the encoded component (Audio 2) is decoded by using the scramble key (Ks) obtained from the ECM (tier bit="10") on the other side.

For example, in the tier bits of the contract information of the EMM, when the first bit from the left indicates premium contract and the second bit from the left indicates the basic contract, in the EMM of FIG. 33, since tier bit="11" is set, the targeted receiver is under the premium contract in addition to the basic contract. For example, when layer bit="01" is set as the tier bits of the contract information of the EMM, the targeted receiver is under only the basic contract.

Accordingly, in the receiver under the basic contract, sound (for example, sound of 5.1 ch) of audio 1 is output being synchronized with images of video. Meanwhile, in the receiver under the premium contract, sound (for example, sound of 22.2 ch) of audio 2 is output being synchronized with images of video, thereby making it possible to provide more realistic sound, for example.

Since the scramble key (Ks) acquired from each ECM is encoded by the work key (Kw), the scramble key (Ks) is decoded by using the work key (Kw) of the stored EMM, thereby being used.

(3) CAS Related Information (Checking Viewing-Listening Propriety with Group ID of ECM)

Figure 34:
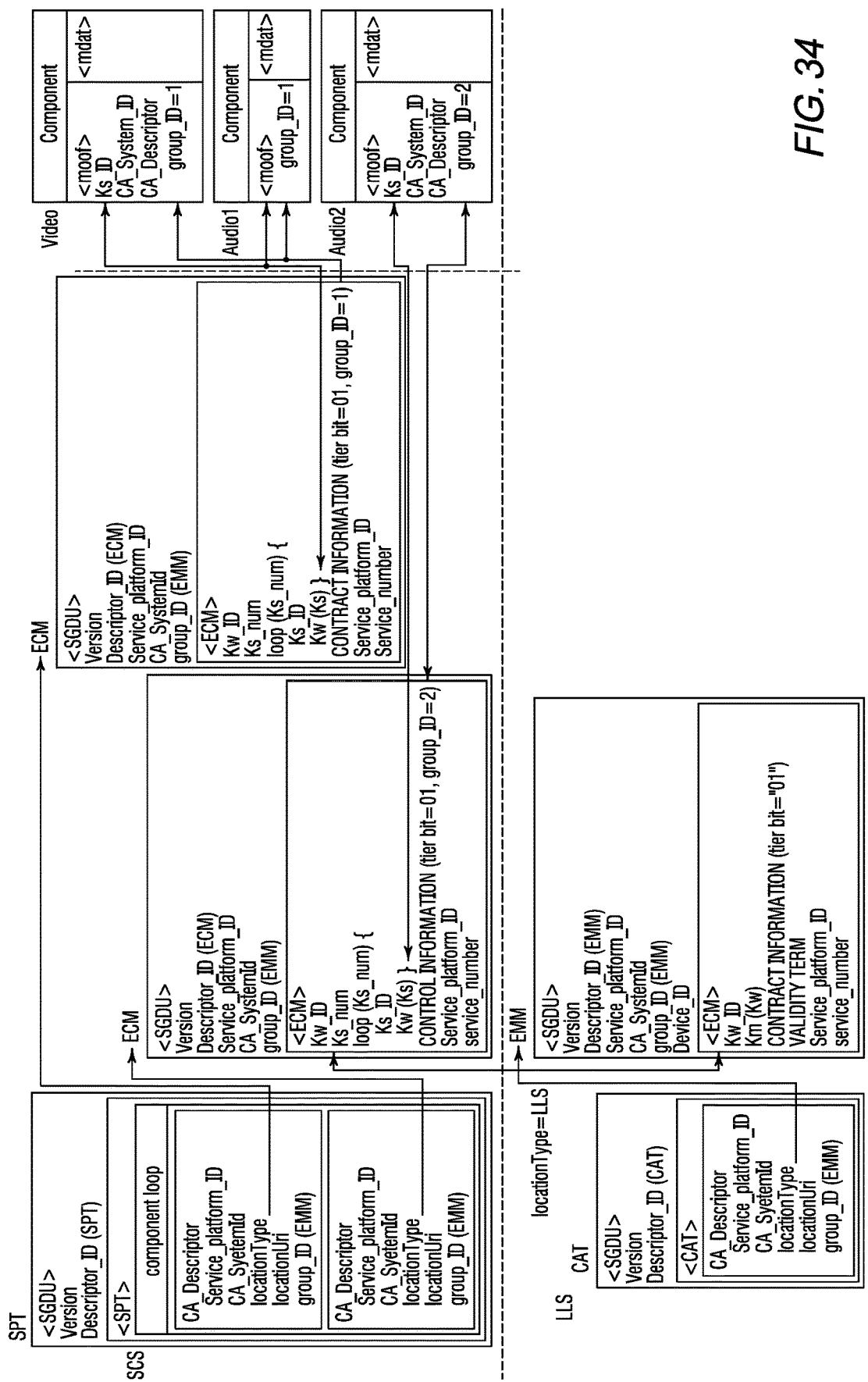
FIG. 34 is a diagram systematically illustrating the overall CAS related information in a case of checking the viewing-listening propriety with a group ID of the ECM.

FIG. 34 is a diagram systematically illustrating the overall CAS related information in a case of checking the viewing-listening propriety with a group ID of the ECM.

In the CAS related information of FIG. 34, the CA_Descriptor (the information for acquiring the EMM) is arranged in the CAT, and the EMM is transferred by the LLS. The CA_Descriptor (information for acquiring the ECM) is designated in the component loop of the SPT, thereby making it possible to check viewing-listening propriety with the group ID of the ECM.

In FIG. 34, since LocationType=LLS is designated in the CA_Descriptor of the CAT, the EMM transferred by the LLS is acquired in accordance with the URI indicated by the locationUri, thereby being stored. Thereafter, selecting of channel is performed and the SCS of particular broadcasting service is acquired. Two CA_Descriptors are arranged in the component loop of the SPT, and thus, the ECM can be acquired by using the CA_Descriptor thereof.

Here, tier bit="01" as the tier bits of the contract information is designated in the EMM. In respect of the tier bits and the group ID of the contract information of the ECM, tier bit="01" and group_ID="1" are designated in the ECM on one side, and tier bit="01" and group_ID="2" are designated in the ECM on the other side. In the receiver, filtering of the utilizable component is performed using the tier bits and the group ID thereof. Thus, the encoded components (Video, Audio 1) are decoded by using the scramble key (Ks) obtained from the ECM (tier bit="01" and group_ID="1") on one side, and the encoded component (Audio 2) is decoded by using the scramble key (Ks) obtained from the ECM (tier bit="01" and group_ID="2") on the other side.

For example, in the tier bits of the contract information of the EMM, when the second bit from the left is allocated to broadcasting service A and the first bit from the left is allocated to broadcasting service B, in the EMM of FIG. 34, since tier bit="01" is set, the targeted receiver subscribes only the broadcasting service A. Accordingly, in the receiver subscribing the broadcasting service A, sound of the audio 1 and audio 2 are output being synchronized with images of video.

Since the scramble key (Ks) acquired from each ECM is encoded by the work key (Kw), the scramble key (Ks) is decoded by using the work key (Kw) of the stored EMM, thereby being used.

(4) CAS Related Information (Providing Plurality of EMM Sequences)

Figure 35:
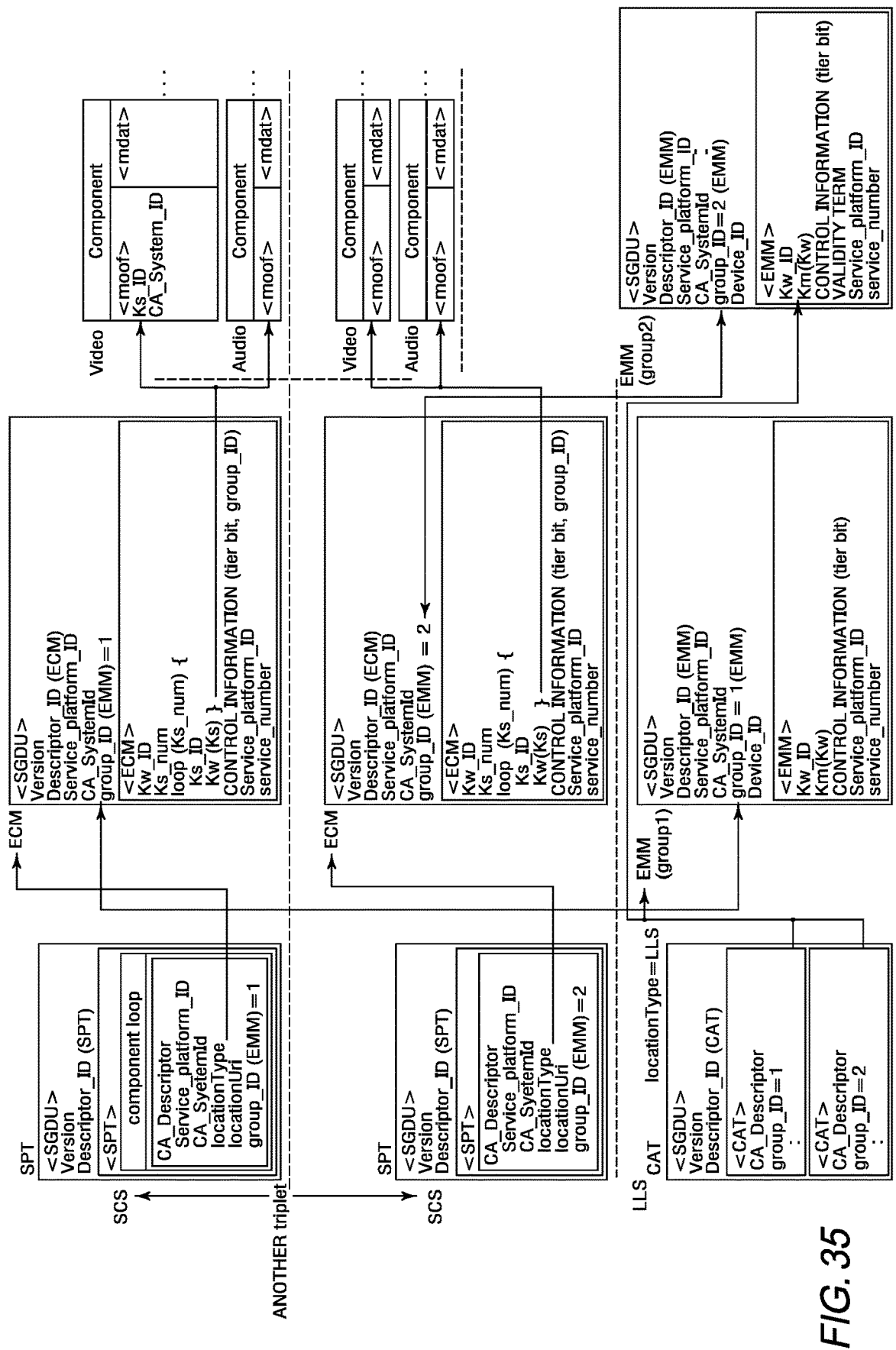
FIG. 35 is a diagram systematically illustrating the overall CAS related information in a case of providing a plurality of EMM sequences.

FIG. 35 is a diagram systematically illustrating the overall CAS related information in a case of providing a plurality of EMM sequences.

In the CAS related information of FIG. 35, the CA_Descriptor (the information for acquiring the EMM) is arranged in the CAT, and the plurality of EMM sequences are transferred by the LLS. The group IDs different from each other is respectively designated in the EMM sequences.

In FIG. 35, since LocationType=LLS is designated in the CA_Descriptor (group_ID="1") of the CAT, the EMM of the group 1 transferred by the LLS is acquired in accordance with the URI indicated by the locationUri. Since LocationType=LLS is designated in the CA_Descriptor (group_ID="2") of the CAT, the EMM of the group 2 transferred by the LLS is acquired in accordance with the URI indicated by the locationUri. Then the receiver stores the EMM of the group 1 and the EMM of the group 2.

In the EMM sequences of the EMM for the group 1, the ECM (group_ID (EMM)="1") can be acquired by using the CA_Descriptor (group_ID (EMM)="1") of the SPT. Then, the scramble key (Ks) of the ECM (group_ID (EMM)="1") is decoded by using the work key (Kw) of the stored EMM (group_ID (EMM)="1") of the group 1, and the encoded components (Video, Audio) of particular broadcasting service are decoded by using the corresponding scramble key (Ks).

Meanwhile, in the EMM sequences of the EMM for the group 2, the ECM (group_ID (EMM)="2") can be acquired by using the CA_Descriptor (group_ID (EMM)="2") of the SPT. Then, the scramble key (Ks) of the ECM (group_ID (EMM)="2") is decoded by using the work key (Kw) of the stored EMM (group_ID (EMM)="2") of the group 2, and the encoded components (Video, Audio) of particular broadcasting service are decoded by using the corresponding scramble key (Ks).

The SPT in which the CA_Descriptor (group_ID (EMM)="1") is described and the SPT in which the CA_Descriptor (group_ID (EMM)="2") is described are acquired from the SCS of different broadcasting service in which a different triplet is designated.

(5-a) CAS Related Information (Using ECM for Main Broadcasting Service when Providing Adjunct Broadcasting Service)

Figure 36:
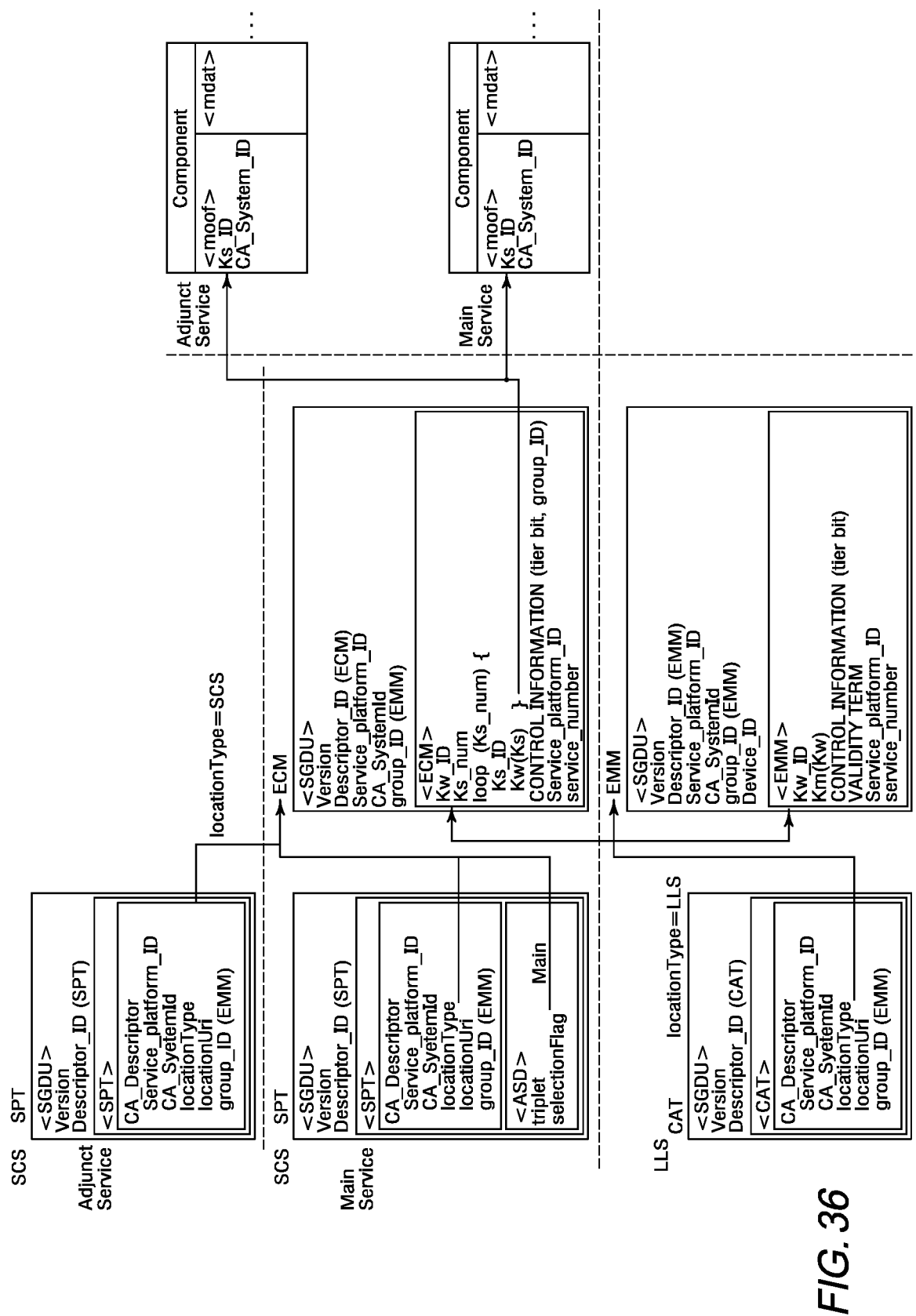
FIG. 36 is a diagram systematically illustrating the overall CAS related information in a case of using the ECM for main broadcasting service when providing the adjunct broadcasting service.

FIG. 36 is a diagram systematically illustrating the overall CAS related information in a case of using the ECM for main broadcasting service when providing the adjunct broadcasting service.

In the CAS related information of FIG. 36, the CA_Descriptor (the information for acquiring the EMM) is arranged in the CAT, and the EMM is transferred by the LLS. The adjunct broadcasting service (Adjunct Service) related to the main broadcasting service (Main Service) is provided. For example, as the adjunct broadcasting service, robust audio broadcasting service is provided. The CA_Descriptor (information for acquiring the ECM) is arranged in the SPT of the main broadcasting service and the adjunct broadcasting service, and the ECM is transferred by the SCS.

In FIG. 36, since LocationType=LLS is designated in the CA_Descriptor of the CAT, the EMM transferred by the LLS is acquired in accordance with the URI indicated by the locationUri, thereby being stored. Thereafter, when selecting of channel is performed and the SCS of the main broadcasting service is acquired, since LocationType=SCS is designated in the CA_Descriptor of the SPT, the ECM transferred by the SCS is acquired in accordance with the URI indicated by the locationUri.

Since the adjunct broadcasting service is provided, the SCS of the adjunct broadcasting service is acquired in accordance with the triplet of ASD (the adjunct service descriptor) of the SPT of the main broadcasting service. Here, LocationType=SCS is designated in the CA_Descriptor of the SPT of the adjunct broadcasting service. However, since "main" is designated in a selectionFlag of the ASD of the SPT of the main broadcasting service, the ECM of the main broadcasting service is adopted in the adjunct broadcasting service as well.

In other words, the encoded component of the main broadcasting service and the encoded component of the adjunct broadcasting service are decoded by using the same scramble key (Ks) acquired from the ECM of the main broadcasting service. Since the scramble key (Ks) acquired from the ECM of the main broadcasting service is encoded by the work key (Kw), the scramble key (Ks) is decoded by using the work key (Kw) of the stored EMM, thereby being used.

(5-b) CAS Related Information (Using ECM for Adjunct Broadcasting Service when Providing Adjunct Broadcasting Service)

Figure 37:
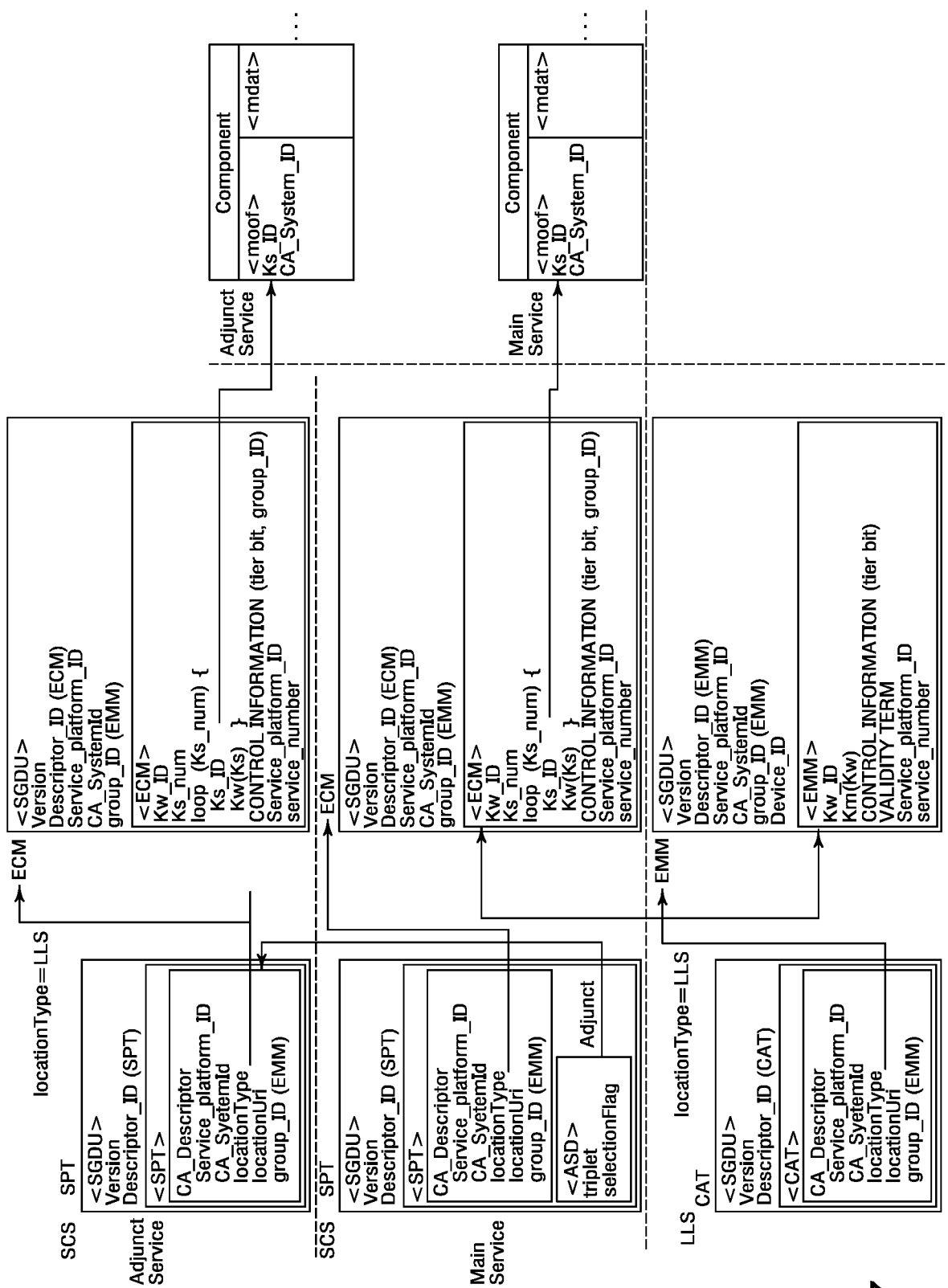
FIG. 37 is a diagram systematically illustrating the overall CAS related information in a case of using the ECM for adjunct broadcasting service when providing the adjunct broadcasting service.

FIG. 37 is another diagram systematically illustrating the overall CAS related information in a case of using the ECM for adjunct broadcasting service when providing the adjunct broadcasting service.

In the CAS related information of FIG. 37, the CA_Descriptor (the information for acquiring the EMM) is arranged in the CAT, and the EMM is transferred by the LLS. The adjunct broadcasting service (Adjunct Service) related to the main broadcasting service (Main Service) is provided. For example, as the adjunct broadcasting service, the robust audio broadcasting service is provided. The CA_Descriptor (information for acquiring the ECM) is arranged in the SPT of the main broadcasting service and the adjunct broadcasting service, and the ECM is transferred by the SCS.

In FIG. 37, since LocationType=LLS is designated in the CA_Descriptor of the CAT, the EMM transferred by the LLS is acquired in accordance with the URI indicated by the locationUri, thereby being stored. Thereafter, when selecting of channel is performed and the main broadcasting service is acquired, since LocationType=SCS is designated in the CA_Descriptor of the SPT of the main broadcasting service, the ECM transferred by the SCS is acquired in accordance with the URI indicated by the locationUri.

Since the adjunct broadcasting service is provided, the SCS of the adjunct broadcasting service is acquired in accordance with the triplet of the ASD (the adjunct service descriptor) of the SPT of the main broadcasting service. Here, since LocationType=SCS is designated in the CA_Descriptor of the SPT of the adjunct broadcasting service, and "adjunct" is designated in the selectionFlag of the ASD of the SPT of the main broadcasting service, the ECM acquired from the SCS of the adjunct broadcasting service is adopted in the adjunct broadcasting service.

Therefore, the encoded component of the main broadcasting service is decoded by using the scramble key (Ks) acquired from the ECM of the main broadcasting service. Meanwhile, the encoded component of the adjunct broadcasting service is decoded by using the scramble key (Ks) acquired from the ECM of the adjunct broadcasting service. That is, the encoded component of the main broadcasting service and the encoded component of the adjunct broadcasting service are decoded by using different scramble keys (Ks). Since the scramble keys (Ks) acquired from the ECM of the main broadcasting service and the adjunct broadcasting service are encoded by the work key (Kw), the scramble keys (Ks) are decoded by using the work key (Kw) of the stored EMM, thereby being used.

6. Application Example of Another Scramble Method

Incidentally, in the above description, a scramble method conforming to a CAS (Conditional Access System) method has been described. However, the present technology can be applied to different scramble methods other than the CAS method.

Figure 38:
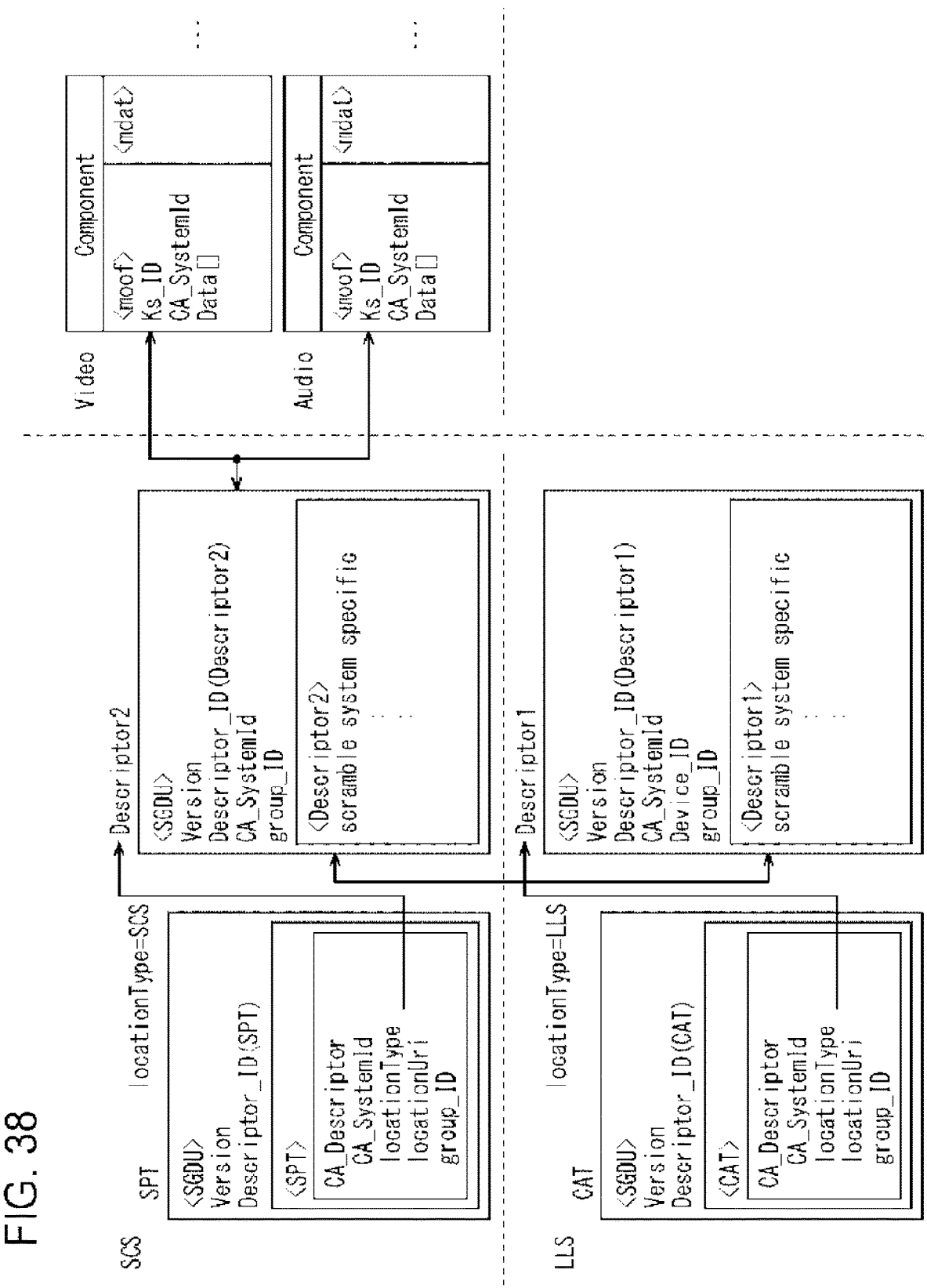
FIG. 38 is a diagram illustrating an application example of a scramble method other than a CAS method.

FIG. 38 is a diagram illustrating an application example of another scramble method.

In the CAS method, the work key (Kw) is transferred by the EMM (Entitlement Management Message), and the scramble key (Ks) encoded by using the work key (Kw) is transferred by the ECM (Entitlement Control Message). However, the EMM and the ECM are caused to be general descriptors (Descriptors), thereby making it possible to be cope with other scramble methods.

In other words, as illustrated in FIG. 38, a Descriptor 1 and a Descriptor 2 for general use are defined instead of the EMM and the ECM so as to be able to be referred based on the location information of the CA_Descriptor. However, information related to content protection in accordance with each scramble method is described in the Descriptor 1 and the Descriptor 2. Whether the method is the CAS method or a different scramble method is determined by using a CA_SystemId of the CA_Descriptor.

Specifically, for example, since LocationType=LLS is designated in the CA_Descriptor of the CAT (or the SCT) of the LLS, the Descriptor 1 is acquired transferred by the LLS in accordance with the URI indicating the locationUri. For example, since LocationType=SCS is designated in the CA_Descriptor of the SPT of the SCS, the Descriptor 2 is acquired transferred by the SCS in accordance with the URI indicating the locationUri. Then, the encoded components (Video, Audio) are decoded based on the information related to the content protection described in the Descriptor 1 and the Descriptor 2.

In this manner, even though a different scramble method is adopted, it is possible to acquire the Descriptor 1 having the CA_Descriptor of the CAT (or the SCT) of the LLS as a reference point, and to acquire the Descriptor 2 having the CA_Descriptor of the SPT of the SCS as a reference point. In the receiver, the Descriptor 1 and the Descriptor 2 can be filtered by using the header information of the SGDU.

7. Configuration of Broadcasting Communication System (Configurational Example of Broadcasting Communication System)

Figure 39:
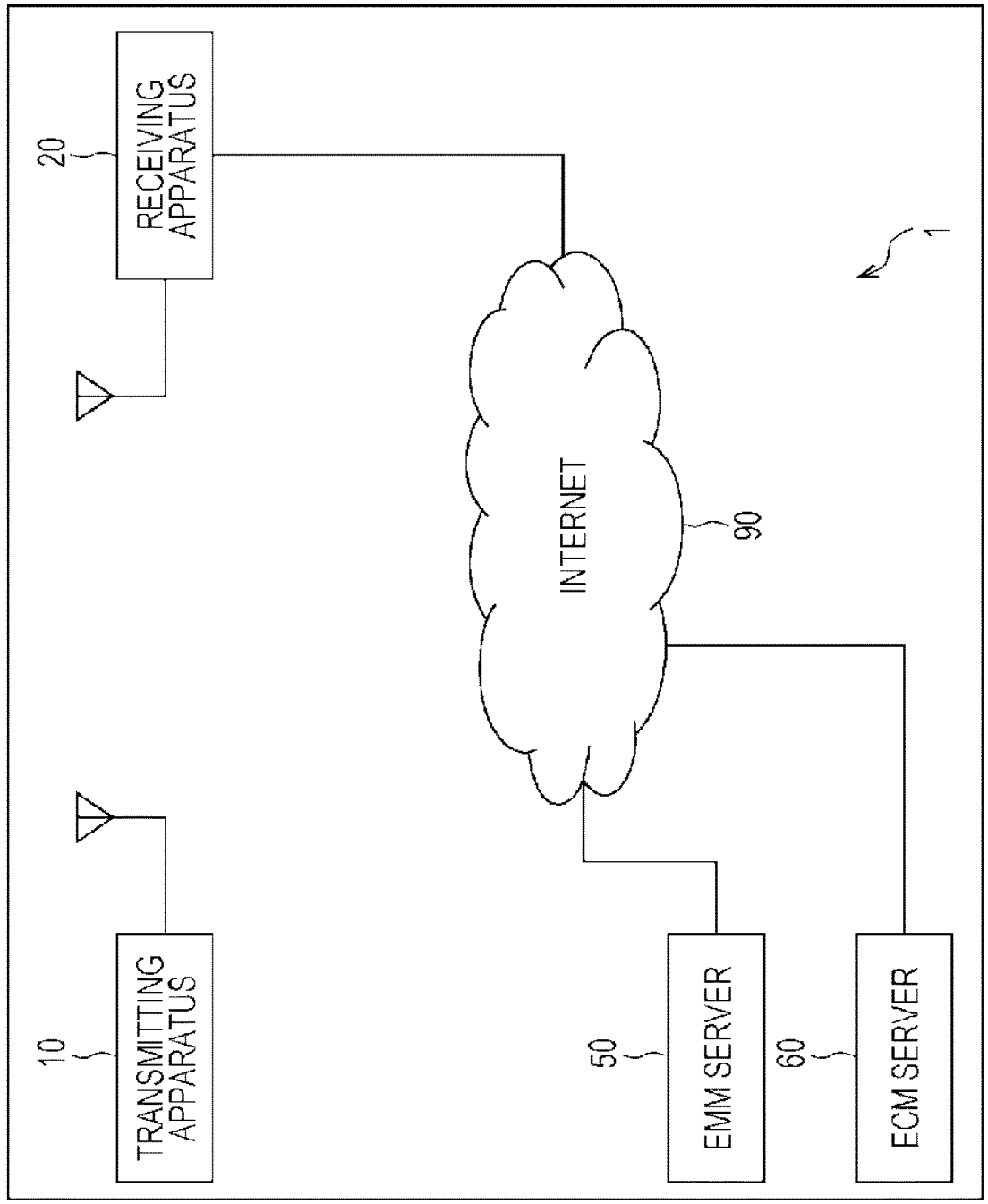
FIG. 39 is a diagram illustrating a configuration of an embodiment of a broadcasting communication system to which the present technology is applied.

FIG. 39 is a diagram illustrating a configuration of an embodiment of a broadcasting communication system to which the present technology is applied.

As illustrated in FIG. 39, a broadcasting communication system 1 is configured to include a transmitting apparatus 10, a receiving apparatus 20, an EMM server 50, and an ECM server 60. The receiving apparatus 20, the EMM server 50, and the ECM server 60 are mutually connected via an internet 90.

The transmitting apparatus 10 transmits a broadcasting content such as a television program through a broadcasting wave of the digital broadcasting, adopting the IP transferring method. A broadcasting content is configured to include a component such as video and audio, and each component is encoded. The transmitting apparatus 10 transmits a control signal (signaling information of FIG. 7) together with the component through the broadcasting wave of the digital broadcasting.

The transmitting apparatus 10 corresponds to the aforementioned transmitter.

The receiving apparatus 20 receives a broadcasting signal transmitted from the transmitting apparatus 10. The receiving apparatus 20 acquires a component such as video and audio in accordance with the control signal obtained from the broadcasting signal. Then, the receiving apparatus 20 decodes the encoded component, thereby outputting an image or sound of a broadcasting content such as a television program.

The receiving apparatus 20 corresponds to the aforementioned receiver. The receiving apparatus 20 may be configured to be a single body including a display and a speaker, or may be built inside a video recorder or a television receiver.

The EMM server 50 manages the EMM which is adopted for decoding a broadcasting content, and provide the EMM via the internet 90. The receiving apparatus 20 accesses the EMM server 50 via the internet 90 so as to acquire the EMM based on a control signal obtained from the broadcasting signal, thereby using for decoding the encoded component.

The ECM server 60 manages the ECM which is adopted for decoding a broadcasting content, and provides the ECM via the internet 90. The receiving apparatus 20 accesses the ECM server 60 via the internet 90 so as to acquire the ECM based on a control signal obtained from the broadcasting signal, thereby using for decoding the encoded component.

According to the description regarding the configuration of the broadcasting communication system 1 in FIG. 39, the transmitting apparatus 10 transmits a broadcasting content. However, a server (not illustrated) capable of streaming delivery with a communication content such as broadcasted programs and running movies may be provided through the internet 90. In this case, the receiving apparatus 20 decodes an encoded component such as video and audio subjected to streaming delivery from a delivery server via the internet 90, based on the control signal, thereby outputting an image and sound of a communication content.

The broadcasting communication system 1 has the above-described configuration. Subsequently, with reference to FIGS. 40 and 41, detailed configurations of each of apparatuses configuring the broadcasting communication system 1 in FIG. 39 will be described.

(Configurational Example of Transmitting Apparatus)

Figure 40:
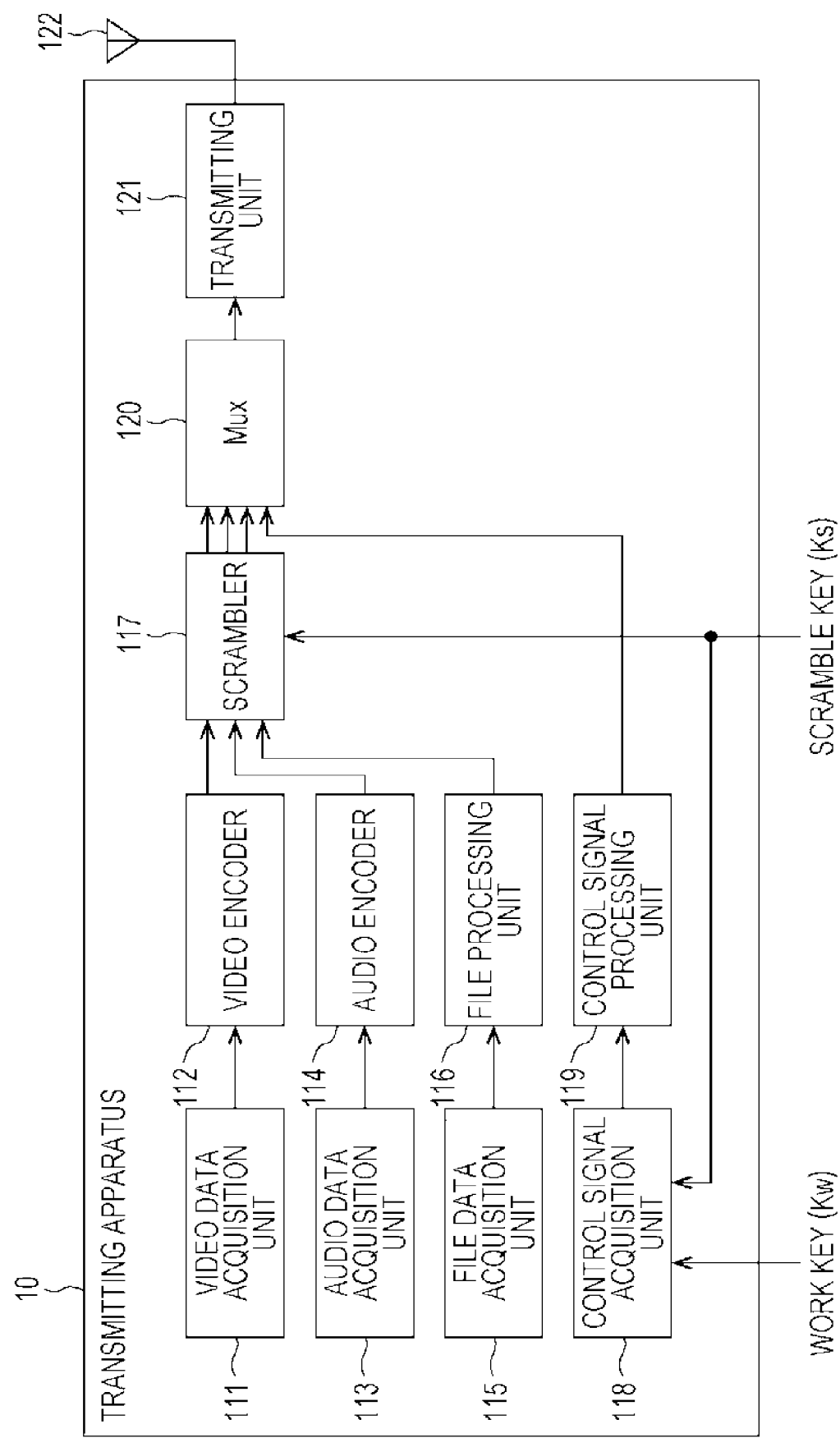
FIG. 40 is a diagram illustrating a configuration of the embodiment of a transmitting apparatus to which the present technology is applied.

FIG. 40 is a diagram illustrating a configuration of the embodiment of a transmitting apparatus to which the present technology is applied.

As illustrated in FIG. 40, the transmitting apparatus 10 is configured to include a video data acquisition unit 111, a video encoder 112, an audio data acquisition unit 113, an audio encoder 114, a file data acquisition unit 115, a file processing unit 116, a scrambler 117, a control signal acquisition unit 118, a control signal processing unit 119, a Mux 120, and a transmitting unit 121.

When transferring data of the stream format, the video data acquisition unit 111 acquires video data as a component from a built-in storage, an external server, and a camera, and supplies the acquired video data to the video encoder 112. The video encoder 112 encodes the video data supplied from the video data acquisition unit 111 conforming to an encoding method such as MPEG, thereby supplying the encoded video data to the scrambler 117.

When transferring data of the stream format, the audio data acquisition unit 113 acquires audio data as a component from a built-in storage, an external server, and a microphone, and supplies the acquired audio data to the audio encoder 114. The audio encoder 114 encodes the audio data supplied from the audio data acquisition unit 113 conforming to the encoding method such as MPEG, thereby supplying the encoded video data to the scrambler 117.

When transferring data of the stream format, the file data acquisition unit 115 acquires file data, for example, a component such as video and audio, an NRT content, and an application from a built-in storage and an external server, thereby supplying the acquired file data to the file processing unit 116.

The file processing unit 116 performs predetermined file processing with respect to the file data supplied from the file data acquisition unit 115, thereby supplying the processed file data to the scrambler 117. For example, the file processing unit 116 performs file processing for transferring through the FLUTE session with respect to the file data acquired by the file data acquisition unit 115.

The components such as the video data from the video encoder 112, the audio data from the audio encoder 114, and the file data from the file processing unit 116 are supplied to the scrambler 117. The scrambler 117 encodes the components by using the scramble key (Ks), thereby supplying the encoded components to the Mux 120.

The control signal acquisition unit 118 acquires the control signal (the signaling information of FIG. 7) from a built-in storage and an external server, thereby supplying the acquired control signal to the control signal processing unit 119. For example, the control signal includes the EMM and the ECM. In the ECM, and the scramble key (Ks) which is used for encoding the component by the scrambler 117 is encoded by the work key (Kw) of the EMM.

The control signal processing unit 119 performs predetermined signal processing with respect to the control signal supplied from the control signal acquisition unit 118, thereby supplying the processed control signal to the Mux 120. For example, the control signal processing unit 119 performs the signal processing for transferring through the FLUTE session with respect to the SCS acquired by the control signal acquisition unit 118.

The Mux 120 generates the BBP stream of the IP transferring format by multiplexing the encoded component from the scrambler 117 and the control signal from the control signal processing unit 119, thereby supplying the multiplexed elements to the transmitting unit 121. The transmitting unit 121 transmits the BBP stream supplied from the Mux 120 as a broadcasting signal (a broadcasting wave) via an antenna 122.

According to the description regarding the configuration of the transmitting apparatus 10 in FIG. 40, the scrambler 117 is provided at the previous stage of the Mux 120. However, the scrambler 117 may be provided at the successive stage of the Mux 120.

(Configurational Example of Receiving Apparatus)

Figure 41:
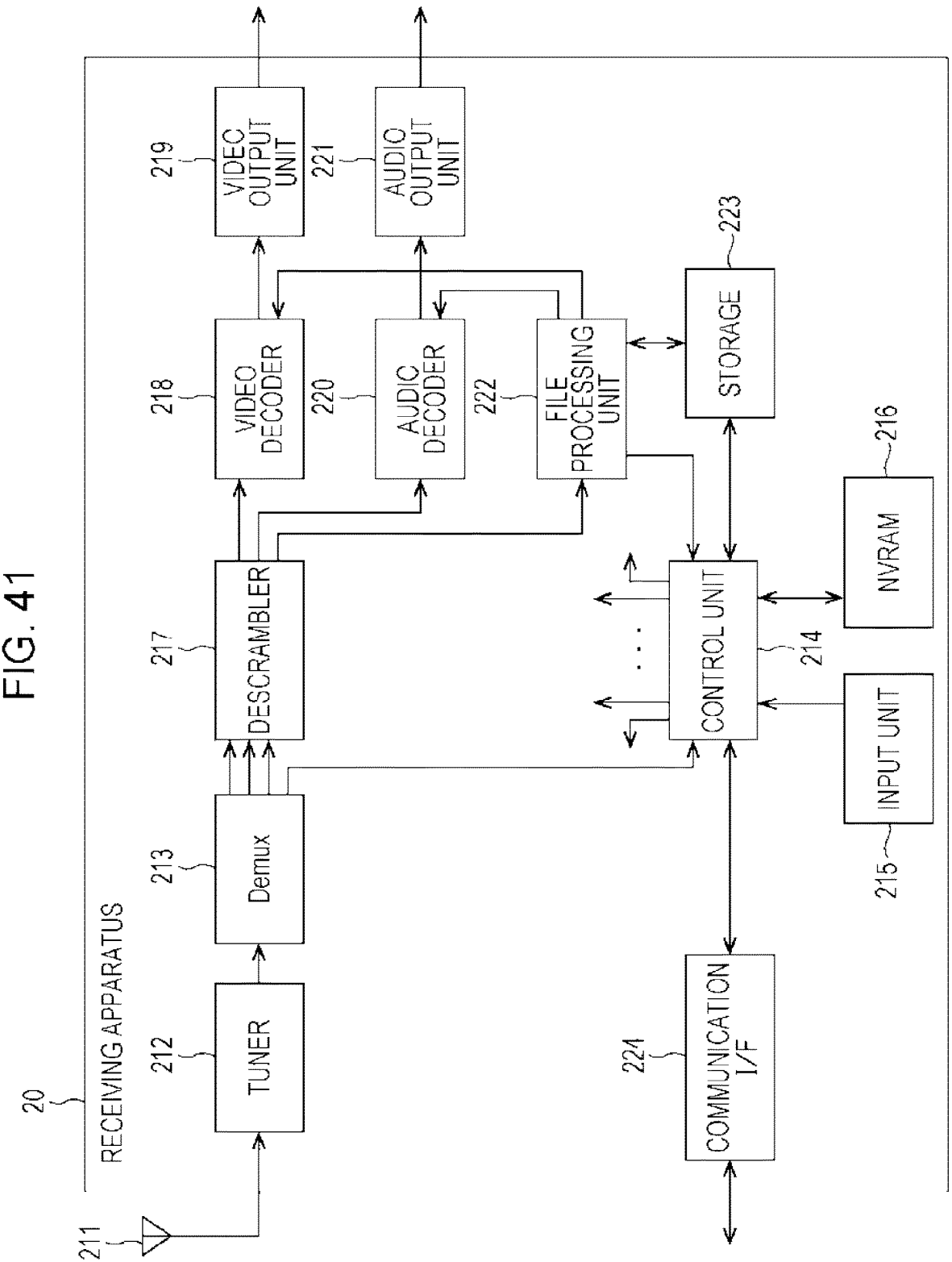
FIG. 41 is a diagram illustrating a configuration of the embodiment of a receiving apparatus to which the present technology is applied.

FIG. 41 is a diagram illustrating a configuration of the embodiment of a receiving apparatus to which the present technology is applied.

As illustrated in FIG. 41, the receiving apparatus 20 is configured to include a tuner 212, a Demux 213, a control unit 214, an input unit 215, an NVRAM 216, a descrambler 217, a video decoder 218, a video output unit 219, an audio decoder 220, an audio output unit 221, a file processing unit 222, a storage 223, and a communication I/F 224.

The tuner 212 extracts and demodulates a broadcasting signal of broadcasting service in which selecting of channel is instructed, from a broadcasting signal received by the antenna 211 in accordance with a control by the control unit 214, and thus, the BBP stream of the IP transferring format obtained from the result thereof is supplied to the Demux 213.

The Demux 213 separates the BBP stream of the IP transferring format supplied from the tuner 212 in accordance with a control by the control unit 214 into the video data, the audio data, the file data, and the control signal (the signaling information of FIG. 7). The Demux 213 supplies the encoded component such as the video data, the audio data, and the file data to the descrambler 217. The Demux 213 supplies the control signal to the control unit 214.

The control unit 214 controls operations of each unit configuring the receiving apparatus 20 based on the control signal (the signaling information of FIG. 7) supplied from the Demux 213 or the file processing unit 222. For example, the control unit 214 acquires and analyzes the EMM and the ECM based on the control signal (the SCT, the CAT, and the SPT), thereby controlling the decoding of the encoded component which is executed at the descrambler 217 according to the analyzed result.

The control unit 214 controls operations of each unit based on a manipulation signal from the input unit 215 in accordance with the manipulation signal by a user. The NVRAM 216 is a nonvolatile memory, and records various types of data in accordance with a control by the control unit 214. For example, the control unit 214 records initial scanning information (channel selection information) obtained from the control signal (the SCT and the like) in the NVRAM 216 when performing the initial scanning. Then, the control unit 214 controls selecting of channel executed by the tuner 212 based on the initial scanning information recorded in the NVRAM 216.

The descrambler 217 decodes the encoded component such as the video data, the audio data, and the file data supplied from the Demux 213 in accordance with a control by the control unit 214. The descrambler 217 respectively supplies the video data to the video decoder 218, the audio data to the audio decoder 220, and the file data to the file processing unit 222, among the decoded component.

The video decoder 218 decodes the video data supplied from the descrambler 217, based on a control by the control unit 214 in a decoding method to be associated with the video encoder 112 (FIG. 40), for example, thereby supplying the decoded video data to the video output unit 219. The video output unit 219 outputs the video data supplied from the video decoder 218 in accordance with a control by the control unit 214 to the display at the successive stage (not illustrated). Accordingly, for example, images of a television program and the like are displayed on the display.

The audio decoder 220 decodes the audio data supplied from the descrambler 217, based on a control by the control unit 214 in a decoding method to be associated with the audio encoder 114 (FIG. 40), for example, thereby supplying the decoded audio data to the audio output unit 221. The audio output unit 221 supplies the audio data supplied from the audio decoder 220 in accordance with a control by the control unit 214 to speaker at the successive stage (not illustrated). Accordingly, for example, sound synchronized with images of a television program is output from the speaker.

The decoded component (the media segment) is supplied from the descrambler 217 to the file processing unit 222. The file processing unit 222 restores the component (the file data) from the media segment transferred through the FLUTE session in accordance with a control by the control unit 214, thereby accumulating the restored component in the storage 223. The file processing unit 222 respectively supplies the video data to the video decoder 218, and the audio data to the audio decoder 220 which are restored as the component (the file data) in accordance with a control by the control unit 214 so that the data thereof is decoded, thereby outputting images and sound of a television program, for example.

The file processing unit 222 restores the control signal transferred through the FLUTE session in accordance with a control by the control unit 214, thereby supplying the restored control signal to the control unit 214.

The communication I/F 224 accesses the EMM server 50 via the internet 90 in accordance with a control by the control unit 214, thereby acquiring the EMM. The communication I/F 224 supplies the acquired EMM to the control unit 214. The communication I/F 224 accesses the ECM server 60 via the internet 90 in accordance with a control by the control unit 214, thereby acquiring the ECM. The communication I/F 224 supplies the acquired ECM to the control unit 214.

According to the description regarding the configuration of the receiving apparatus 20 in FIG. 41, the display and the speaker are configured to be externally provided. However, a configuration in which the receiving apparatus 20 has the display and the speaker may be employed. According to the description regarding the configuration of the receiving apparatus 20 in FIG. 41, the storage 223 is built inside thereof. However, an externally attached storage may be used. According to the description regarding the configuration of the receiving apparatus 20 in FIG. 41, the descrambler 217 is provided at the successive stage of the Demux 213. However, the descrambler 217 may be provided at the previous stage of the Demux 213.

8. Flow of Specific Processing Executed in Each Apparatus

Subsequently, with reference to flowcharts of FIGS. 42 to 50, a flow of specific processing executed in each apparatus configuring the broadcasting communication system 1 of FIG. 39 will be described.

(Transmitting)

Figure 42:
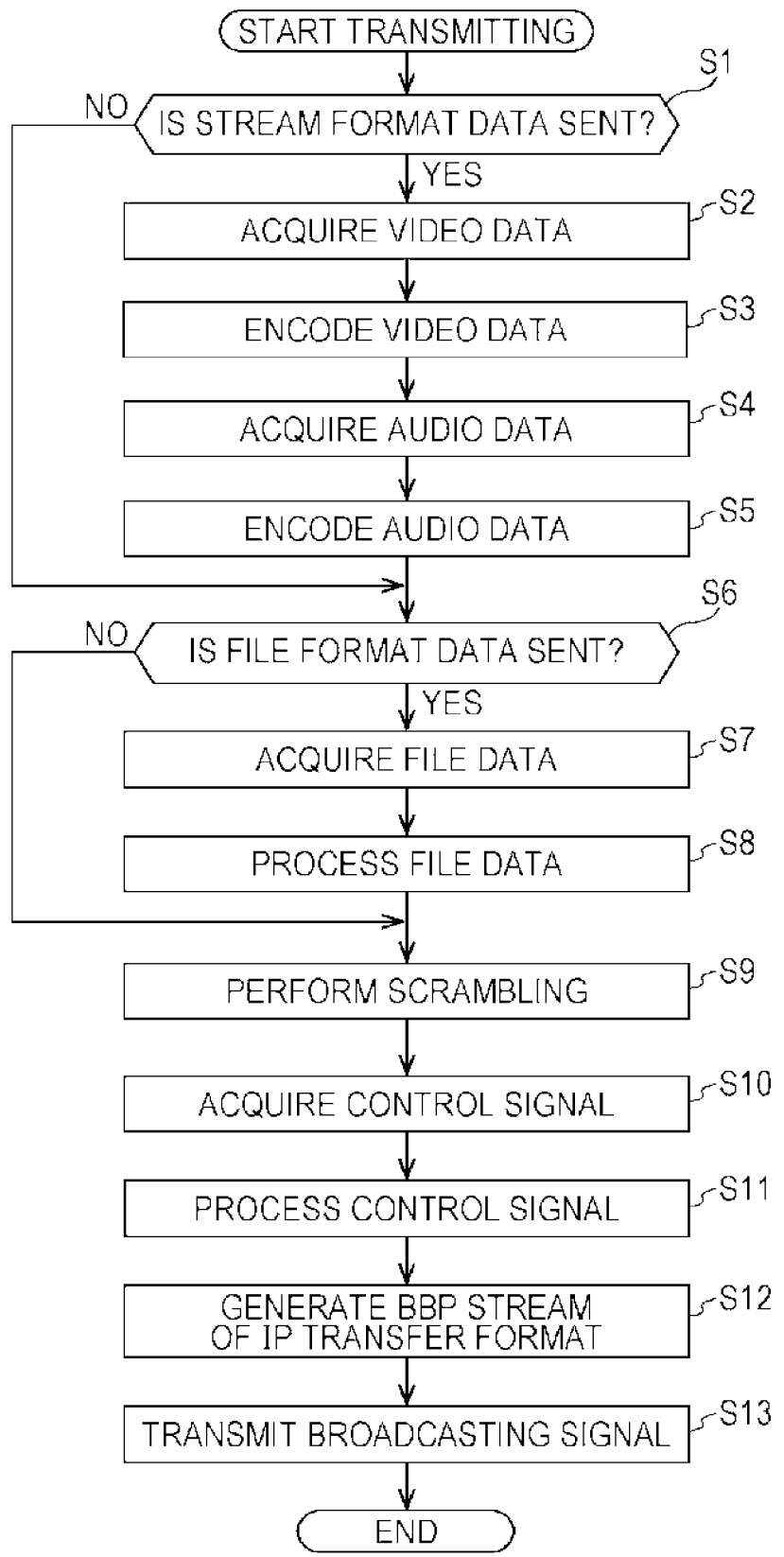
FIG. 42 is a flowchart illustrating transmitting.

Initially, with reference to a flowchart of FIG. 42, transmitting performed by the transmitting apparatus 10 of FIG. 40 will be described.

In step S1, whether or not data of the stream format is transmitted is determined. In step S1, when the data of the stream format is determined to be transmitted, the processing proceeds to step S2.

In step S2, the video data acquisition unit 111 acquires the video data as the component, thereby supplying the acquired video data to the video encoder 112. In step S3, the video encoder 112 encodes the video data supplied from the video data acquisition unit 111, thereby supplying the encoded video data to the scrambler 117.

In step S4, the audio data acquisition unit 113 acquires the audio data as the component, thereby supplying the acquired audio data to the audio encoder 114. In step S5, the audio encoder 114 encodes the audio data supplied from the audio data acquisition unit 113, thereby supplying the encoded audio data to the scrambler 117.

In step S1, when the data of the stream format is determined not to be transmitted, the processing of steps S2 to S5 is skipped and the processing proceeds to step S6. In step S6, whether or not the data of the file format is transmitted is determined. In step S6, when the data of the file format is determined to be transmitted, the processing proceeds to step S7.

In step S7, for example, the file data acquisition unit 115 acquires the file data as the components of video and audio, thereby supplying acquired file data to the file processing unit 116. In step S8, the file processing unit 116 performs predetermined file processing with respect to the file data supplied from the file data acquisition unit 115, thereby supplying the processed file data to the scrambler 117.

In step S6, when the data of the file format is determined not to be transmitted, the processing of steps S7 to S8 is skipped and the processing proceeds to step S9. That is, according to processing of steps S1 to S8, the data (the component) of the stream format or the data (the component) of the file format is supplied to the scrambler 117.

In step S9, the scrambler 117 performs scrambling for encoding the component by using the scramble key (Ks). In the scrambling, when transmitting the data of the stream format, the video data from the video encoder 112 and the audio data from the audio encoder 114 are encoded. In the scrambling, when transmitting the data of the file format, the file data from the file processing unit 116 is encoded. The component which is encoded by being scrambled is supplied to the Mux 120.

In step S10, the control signal acquisition unit 118 acquires the control signal (the signaling information of FIG. 7), thereby supplying the acquired control signal to the control signal processing unit 119. In step S11, the control signal processing unit 119 performs predetermined signal processing with respect to the control signal supplied from the control signal acquisition unit 118, thereby supplying the processed control signal to the Mux 120.

In step S12, the Mux 120 multiplexes the encoded component from the scrambler 117 and the control signal from the control signal processing unit 119 so as to generate the BBP stream of the IP transferring format, thereby supplying the multiplexed elements to the transmitting unit 121.

In step S13, the transmitting unit 121 transmits the BBP stream supplied from the Mux 120 as a broadcasting signal via the antenna 122. Then, when the processing of step S13 ends, the transmitting ends. Hereinbefore, transmitting has been described.

(Acquiring of EMM at Time of Initial Scanning)

Subsequently, with reference to a flowchart of FIG. 43, acquiring of the EMM at the time of the initial scanning executed by the receiving apparatus 20 of FIG. 41 will be described.

In step S101, when a manipulation of the initial scanning is executed by a user, in step S102, the tuner 212 executes frequency scanning in accordance with a control by the control unit 214. Initial scanning information (channel selection information) acquired by the frequency scanning is stored in the NVRAM 216.

In step S103, the control unit 214 acquires the CA_Descriptor (the information for acquiring the EMM) of the SCT or the CAT supplied from the Demux 213, thereby storing the acquired the CA_Descriptor in the NVRAM 216. In step S104, the control unit 214 checks the CA_SystemId described in the CA_Descriptor.

In step S105, the control unit 214 determines whether or not the ID of the CAS method is designated in the CA_SystemId which is described in the CA_Descriptor.

In step S105, when ID of the CAS method is determined to be designated in the CA_SystemId, the processing proceeds to step S106. In step S106, the control unit 214 executes acquiring of the EMM by controlling operations of each unit. The EMM is acquired from the LSS or the NRT by acquiring of the EMM at the time of the initial scanning. The details of acquiring of the EMM will be described later with reference to a flowchart of FIG. 45.

Meanwhile, in step S105, when the ID of the CAS method is determined not to be designated in CA_SystemId, the processing proceeds to step S107. In step S107, the control unit 214 executes acquiring of a license of other scramble methods by controlling operations of each unit. That is, as described in aforementioned FIG. 38, since the present technology can be applied to the different scramble method other than the CAS method, when other scramble methods are adopted, acquiring of the license in accordance with the corresponding scramble method is executed.

When the processing of step S106 or S107 ends, acquiring of the EMM at the time of the initial scanning ends. Hereinbefore, acquiring of the EMM at the time of the initial scanning has been described.

(Acquiring of EMM at Time of Event Ignition)

Subsequently, with reference to a flowchart of FIG. 44, acquiring of the EMM at the time of the event ignition executed by the receiving apparatus 20 of FIG. 41 will be described.

In step S151, the control unit 214 stands by for ignition of an EMM acquiring event. In step S152, the control unit 214 determines whether or not the EMM acquiring event is ignited. In step S152, when it is determined that there is no occurrence of the EMM acquiring event, the processing returns to step S151 and repeats the aforementioned processing.

In other words, the control unit 214 stands by until the EMM acquiring event is ignited. As the EMM acquiring event, for example, an event which regularly occurs by a time piece of a timer (for example, an event occurring monthly), or an event manipulated by a user (for example, an event of power-on manipulation) corresponds thereto.

In step S152, when the EMM acquiring event is determined to be occurred, the processing proceeds to step S153. In step S153, the control unit 214 executes acquiring of the EMM by controlling operations of each unit. The EMM is acquired from the LSS or the NRT by acquiring of the EMM at the time of the event ignition. The details of acquiring of the EMM will be described later with reference to the flowchart of FIG. 45.

When the processing of step S153 ends, acquiring of the EMM at the time of the event ignition ends. Hereinbefore, acquiring of the EMM at the time of the event ignition has been described.

(Acquiring of EMM)

Subsequently, with reference to the flowchart of FIG. 45, details of acquiring of the EMM corresponding to the processing of step S106 in FIG. 43 or step S153 in FIG. 44, executed by the receiving apparatus 20 of FIG. 41 will be described.

In step S201, the control unit 214 checks the LocationType described in the CA_Descriptor (the information for acquiring the EMM).

During the determination in step S201, when the designation is determined to be LocationType=LLS, the processing proceeds to step S202. In step S202, the control unit 214 acquires the EMM from the LLS by controlling the Demux 213 in accordance with the URI indicated by the LocationUri.

During the determination in step S201, when the designation is determined to be LocationType=Network, the processing proceeds to step S203. In step S203, the control unit 214 accesses the EMM server 50 via the internet 90 by controlling the communication I/F 224 in accordance with the URI indicated by the locationUri, thereby acquiring the EMM.

During the determination in step S201, when the designation is determined to be LocationType=NRT, the processing proceeds to step S204. In step S204, the control unit 214 acquires the EMM transferred through the NRT session by controlling the file processing unit 222 in accordance with the URI indicated by the locationUri.

When the EMM is acquired through any processing of steps S202, S203, and S204, the processing proceeds to step S205. In step S205, the control unit 214 stores the acquired EMM in the NVRAM 216.

Figure 43:
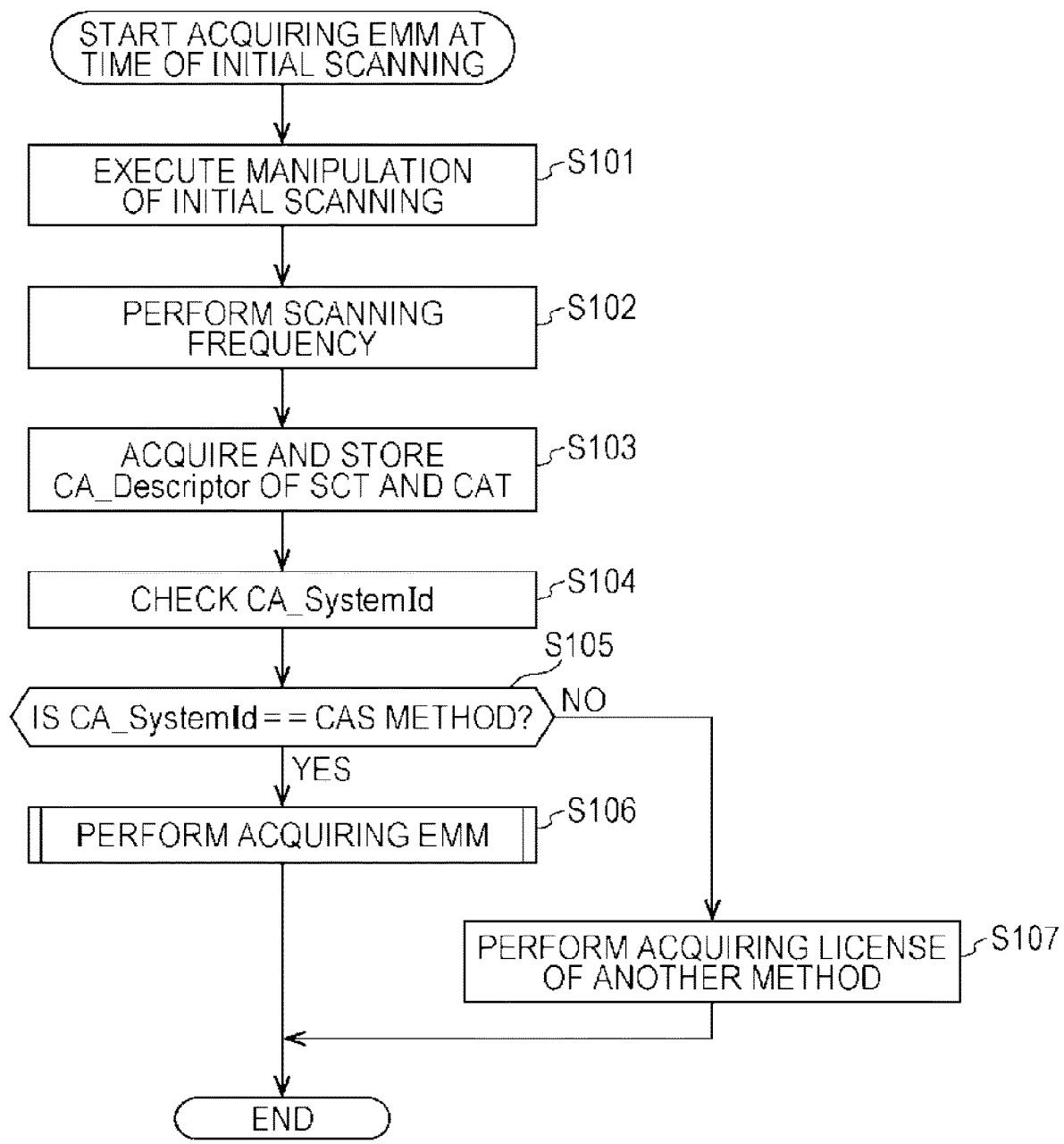
FIG. 43 is a flowchart illustrating acquiring of the EMM at the time of initial scanning.
Figure 44:
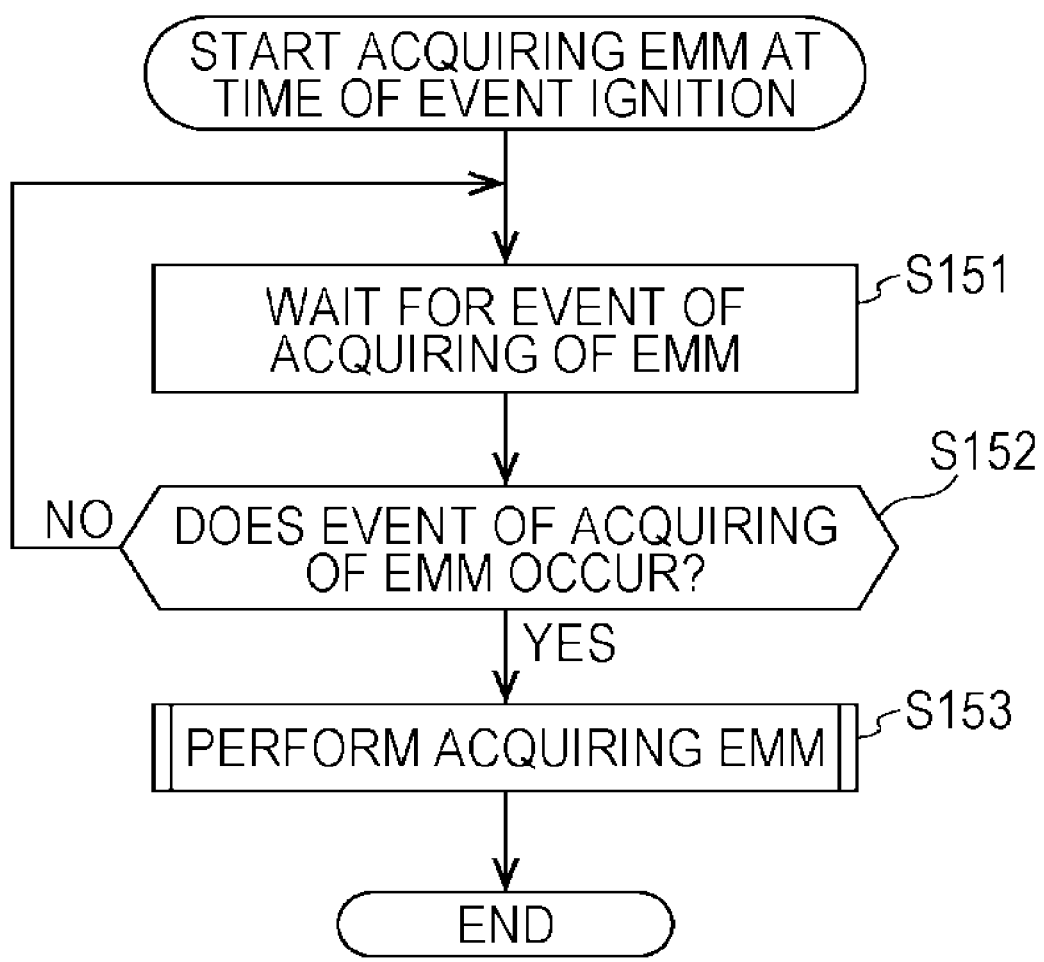
FIG. 44 is a flowchart illustrating acquiring of the EMM at the time of event ignition.
Figure 45:
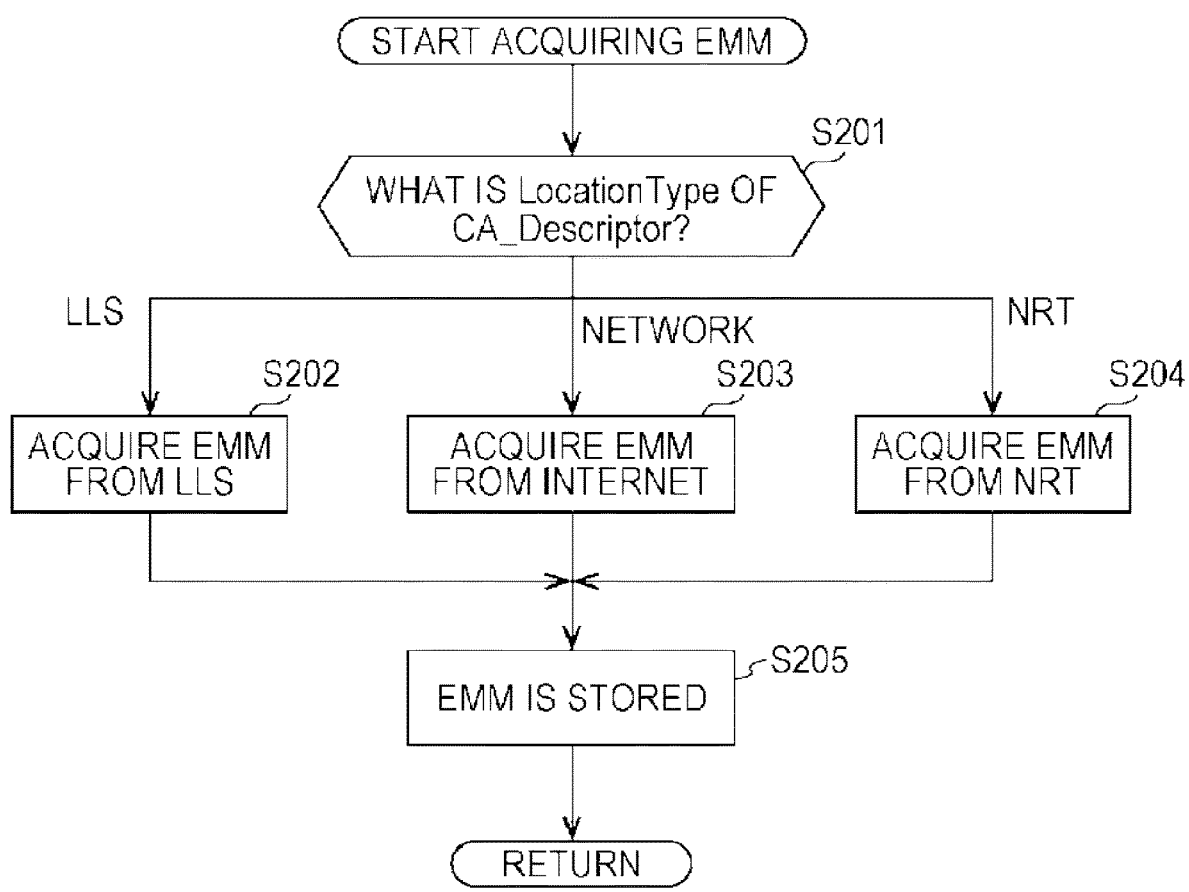
FIG. 45 is a flowchart illustrating details of acquiring of the EMM.

Then, when the processing of step S205 ends, the processing returns to the processing of step S106 in FIG. 43 or step S153 in FIG. 44, thereby executing the processing thereafter. Hereinbefore, details of acquiring of the EMM have been described.

(Selecting of Channel)

Subsequently, with reference to a flowchart of FIG. 46, selecting of channel executed by the receiving apparatus 20 of FIG. 41 will be described.

In step S301, when a manipulation of selecting of channel is executed by a user, in step S302, the control unit 214 acquires the initial scanning information (channel selection information) stored in the NVRAM 216. Then, the control unit 214 starts selecting of channel of particular broadcasting service by controlling the tuner 212 based on the initial scanning information.

In step S303, the control unit 214 acquires the signaling information from the SCS supplied from the file processing unit 222. In step S304, the control unit 214 determines whether or not the ASD (the adjunct service descriptor) is present in the SPT acquired as the signaling information.

In step S304, when the ASD is determined not to be present in the SPT, the processing proceeds to step S305. In step S305, the control unit 214 executes acquiring of the main broadcasting service component by controlling operations of each unit. The component of the main broadcasting service is acquired by acquiring of the main broadcasting service component, thereby being decoded. The details of acquiring of the main broadcasting service component will be described later with reference to a flowchart of FIG. 47. When the acquiring of step S305 ends, the processing proceeds to the processing of step S307.

Meanwhile, in step S304, when the ASD is determined to be present in the SPT, the processing proceeds to step S306. In step S306, the control unit 214 executes acquiring of the adjunct broadcasting service component by controlling operations of each unit. The component of the adjunct broadcasting service is acquired by acquiring of the adjunct broadcasting service component, thereby being decoded. The details of acquiring of the adjunct broadcasting service component will be described later with reference to a flowchart of FIG. 50. When acquiring of step S306 ends, the processing proceeds to step S305. In acquiring of step S305, as described above, the component of the main broadcasting service is acquired.

In this manner, when there is no ASD in the SPT, only the component of the main broadcasting service is acquired, and when there is the ASD in the SPT, the main broadcasting service and the component of the adjunct broadcasting service are acquired. When the processing of step S305 ends, the processing proceeds to the processing of step S307.

In step S307, the control unit 214 performs rendering with respect to the acquired component by controlling operations of each unit, thereby outputting images and sound corresponding to the component. Then, when the processing of step S307 ends, selecting of channel ends. Hereinbefore, selecting of channel has been described.

(Acquiring of Main Broadcasting Service Component)

Subsequently, with reference to the flowchart of FIG. 47, details of acquiring of the main broadcasting service component corresponding to the processing of step S305 in FIG. 46 executed by the receiving apparatus 20 of FIG. 41 will be described.

In step S351, the control unit 214 acquires the information for acquiring the ECM from the CA_Descriptor of the SPT of the main broadcasting service. In step S352, the control unit 214 determines whether or not the information for acquiring the ECM of a different group is described in CA_Descriptor of the SPT of the main broadcasting service.

In step S352, when the information for acquiring the ECM of a different group is determined to be described, the processing proceeds to step S353. In step S353, the control unit 214 executes acquiring of the ECM for each group by controlling operations of each unit. The ECM is acquired for each group from the LSS and the NRT by acquiring of the ECM for each group. The details of acquiring of the ECM for each group will be described later with reference to a flowchart of FIG. 48.

Meanwhile, in step S352, when the ECM information of a different group is determined not to be described, the processing proceeds to step S354. In step S354, the control unit 214 executes acquiring of the ECM by controlling operations of each unit. The ECM is acquired from the LSS and the NRT by acquiring of the ECM. The details of acquiring of the ECM will be described later with reference to the flowchart of FIG. 48.

When the ECM is acquired by the processing of step S353 or S354, the processing proceeds to step S355. In step S355, the control unit 214 reads out the EMM stored in the NVRAM 216, thereby decoding the scramble key (Ks) of the ECM by using the work key (Kw) of the EMM of which the CA_System_ID, the KW_ID, and the contract information (tier bit, the group ID) coincide with each other.

In step S356, the control unit 214 controls the descrambler 217, thereby decoding the encoded component configuring the main broadcasting service by using the scramble key (Ks) obtained through the processing of step S355. Accordingly, the component of the main broadcasting service is acquired.

Figure 46:
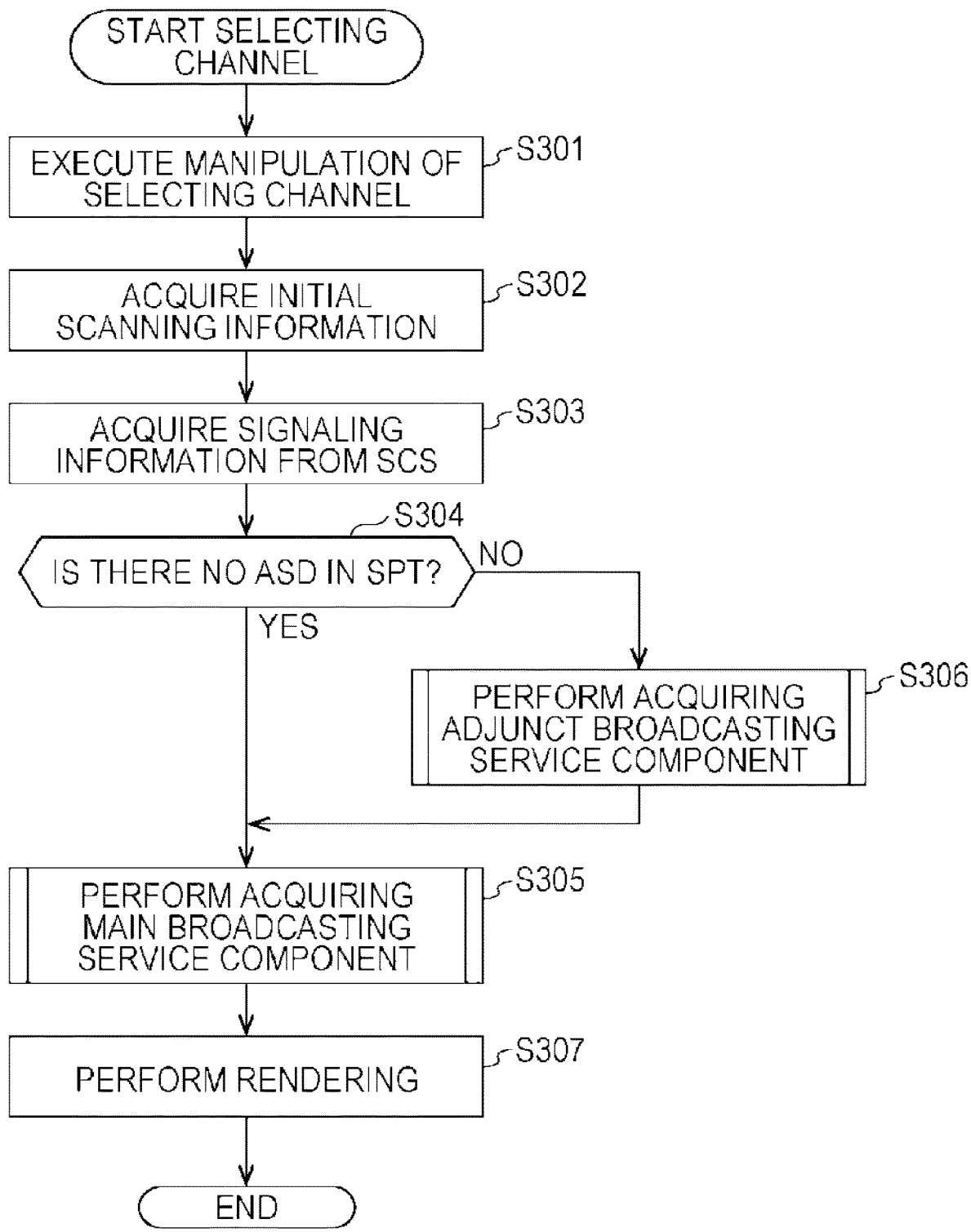
FIG. 46 is a flowchart illustrating selecting of a channel.

When the processing of step S356 ends, the processing returns to step S305 of FIG. 46, thereby executing the processing thereafter. Hereinbefore, acquiring of the main broadcasting service component has been described.

(Acquiring of ECM)

Subsequently, with reference to the flowchart of FIG. 48, details of acquiring of the ECM corresponding to the processing of step S353 or S354 of FIG. 47 executed by the receiving apparatus 20 of FIG. 41.

In step S371, the control unit 214 checks the LocationType described in the CA_Descriptor (information for acquiring the ECM).

During the determination of step S371, when the designation is determined to be the LocationType=LLS, the processing proceeds to step S372. In step S372, the control unit 214 acquires the ECM from the LLS by controlling the Demux 213 in accordance with the URI indicated by the locationUri.

During the determination of step S371, when the designation is determined to be LocationType=Network, the processing proceeds to step S373. In step S373, the control unit 214 accesses the ECM server 60 via the internet 90 by controlling the communication I/F 224 in accordance with the URI indicated by the locationUri, thereby acquiring the ECM.

During the determination in step S371, when the designation is determined to be the LocationType=NRT, the processing proceeds to step S374. In step S374, the control unit 214 acquires the ECM transferred through the NRT session by controlling the file processing unit 222 in accordance with the URI indicated by the locationUri.

During the determination in step S371, when the designation is determined to be the LocationType=component box, the processing proceeds to step S375. In step S375, the control unit 214 acquires the ECM transferred by utilizing the component and controlling the Demux 213 in accordance with the URI indicated by the locationUri.

Figure 47:
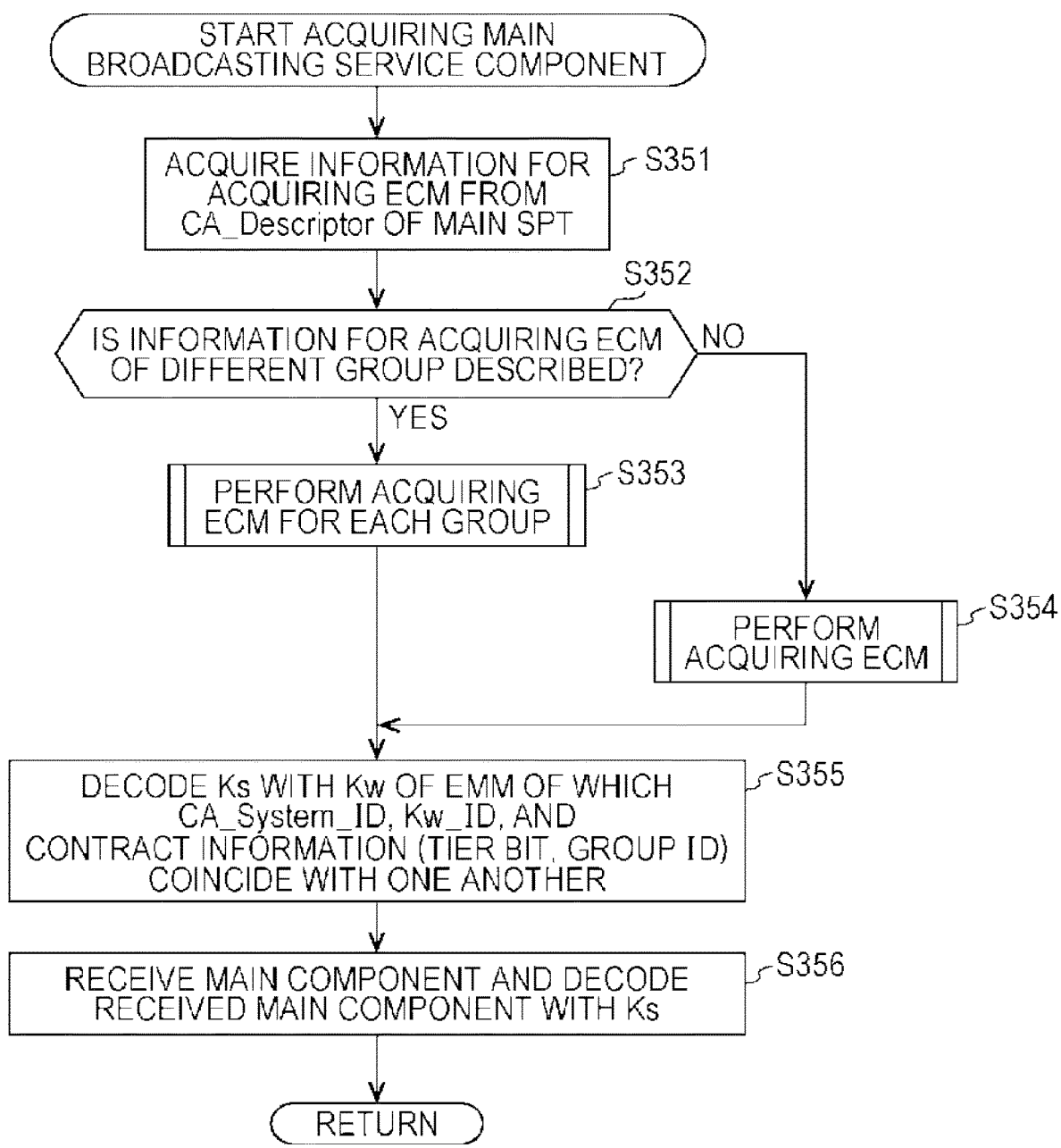
FIG. 47 is a flowchart illustrating details of acquiring of a main broadcasting service component.
Figure 48:
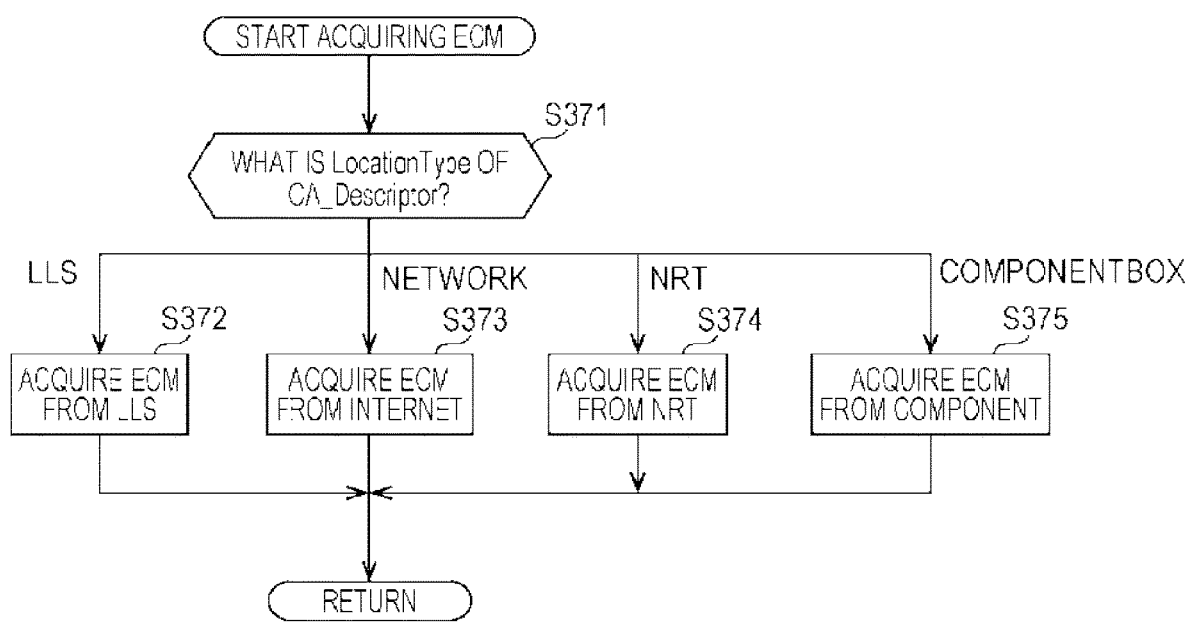
FIG. 48 is a flowchart illustrating details of acquiring of the ECM.

When the ECM is acquired through any processing of steps S372, S373, S374, and S375, the processing returns to step S353 or S354 of FIG. 47, thereby executing the processing thereafter. When acquiring the ECM for each group in Step S353 of FIG. 47, acquiring of the ECM of FIG. 48 is repeatedly executed for each group, thereby acquiring the ECM for each group from the LLS and the NRT.

Hereinbefore, details of acquiring of the ECM have been described.

(Realizing of Adjunct Broadcasting Service)

Subsequently, with reference to a flowchart of FIG. 49, realizing of the adjunct broadcasting service executed by the receiving apparatus 20 of FIG. 41 will be described.

In step S401, when a manipulation of selecting of channel is executed by a user, in step S402, the control unit 214 executes selecting of channel of particular broadcasting service by controlling the tuner 212 based on the initial scanning information (channel selection information) stored in the NVRAM 216. The component configuring particular broadcasting service is acquired by selecting of channel so as to output images and sound, thereby making it possible to watch and listen to a television program (S403). However, since the component is encoded, the images and sound are output after being decoded by using the scramble key (Ks).

In step S404, the control unit 214 receives (acquires) the SPT as the signaling information of the SCS which is regularly transferred. In step S405, the control unit 214 determines whether or not there is the ASD (the adjunct service descriptor) in the SPT acquired through step S405.

In step S405, when the ASD is determined to be present in the SPT, the processing proceeds to step S406. In step S406, the control unit 214 executes acquiring of the adjunct broadcasting service component by controlling operations of each unit. The component of the adjunct broadcasting service is acquired by acquiring of the adjunct broadcasting service component, thereby being decoded. Accordingly, images and sound of the adjunct broadcasting service is output. The details of acquiring of the adjunct broadcasting service component will be described later with reference to the flowchart of FIG. 50.

Meanwhile, in step S405, when there is no ASD in the SPT, the processing proceeds to step S407. In step S407, the control unit 214 determines whether or not watching and listening of the television program in progress is ended, based on the manipulation signal from the input unit 215.

In step S407, when watching and listening of the television program in progress is determined to be continued, the processing returns to the processing of step S403, thereby repeating the aforementioned processing. That is, when the ASD is described in the SPT received during watching and listening a television program, the component of the adjunct broadcasting service is acquired and decoded, thereby outputting images and sound.

Then, in step S407, when watching and listening of the television program in progress is determined to be ended, realizing of the adjunct broadcasting service ends. Hereinbefore, realizing of the adjunct broadcasting service has been described.

(Acquiring of Adjunct Broadcasting Service Component)

Lastly, with reference to the flowchart of FIG. 50, acquiring of the adjunct broadcasting service component corresponding to the processing of step S306 of FIG. 46 or step S406 of FIG. 49 executed by the receiving apparatus 20 of FIG. 41 will be described.

In step S451, the control unit 214 determines whether or not the selectionFlag of the ASD (the adjunct service descriptor) of the SPT of the main broadcasting service is "adjunct".

In step S451, when the selectionFlag of the ASD is determined to be "adjunct", the processing proceeds to step S452. In step S452, the control unit 214 acquires the signaling information (the SPT) from the SCS of the adjunct broadcasting service in accordance with the triplet of the ASD. In step S453, the control unit 214 acquires information for acquiring the ECM from the CA_Descriptor of the SPT of the adjunct broadcasting service.

Meanwhile, in step S451, when the selectionFlag of the ASD is not "adjunct", that is, the selectionFlag is determined to be "main", the processing proceeds to step S454. In step S454, the control unit 214 acquires information for acquiring the ECM from the CA_Descriptor of the SPT of the adjunct broadcasting service.

When information for acquiring the ECM is acquired through step S453 or S454, the processing proceeds to step S455. In step S455, the control unit 214 determines whether or not information for acquiring the ECM of a different group is described in each CA_Descriptor.

In step S455, when information for acquiring the ECM of a different group is determined to be described, the processing proceeds to step S456. In step S456, the control unit 214 executes acquiring of the ECM of FIG. 48 by controlling operations of each unit. The acquiring of the ECM (FIG. 48) is repeatedly executed for each group, thereby acquiring the ECM for each group from the LSS and the NRT in accordance with the LocationType or the LocationUri of the CA_Descriptor (information for acquiring the ECM).

Meanwhile, in step S455, when information for acquiring the ECM of a different group is determined not to be described, the processing proceeds to step S457. In step S457, the control unit 214 executes acquiring of the ECM of FIG. 48 by controlling operations of each unit. The ECM is acquired from the LSS and the NRT in accordance with the LocationType or the LocationUri of the CA_Descriptor (information for acquiring the ECM).

When the ECM is acquired by the processing of step S456 or S457, the processing proceeds to step S458. In step S458, the control unit 214 reads out the EMM stored in the NVRAM 216, thereby decoding the scramble key (Ks) of the ECM by using the work key (Kw) of the EMM of which the CA_System_ID, the KW_ID, and the contract information (tier bit, the group ID) coincide with each other.

In step S459, the control unit 214 controls the descrambler 217, thereby decoding the encoded component configuring the adjunct broadcasting service by using the scramble key (Ks) obtained through the processing of step S458. Accordingly, the component of the adjunct broadcasting service is acquired.

When the processing of step S459 ends, the processing returns to step S306 of FIG. 46 or step S406 of FIG. 49, thereby executing the processing thereafter. Hereinbefore, acquiring of the adjunct broadcasting service component has been described.

9. Configuration of Computer

The series of the processing described above can be executed through hardware or can be executed through software. When the series of the processing is executed through software, a program configuring the software is installed in a computer. Here, the computer includes a computer which is embedded into hardware for special use, or a general personal computer which can execute various functions by installing various programs.

FIG. 51 is a diagram illustrating a configurational example of hardware of a computer which executes a series of processing mentioned above by a program.

In a computer 900, a CPU (Central Processing Unit) 901, a ROM (Read Only Memory) 902, a RAM (Random Access Memory) 903 are mutually connected one another by a bus 904. The bus 904 is also connected with an input/output interface 905. The input/output interface 905 is connected with an input unit 906, an output unit 907, a recording unit 908, a communication unit 909, and a drive 910.

The input unit 906 includes a key board, a mouse, and a microphone. The output unit 907 includes a display and a speaker. The recording unit 908 includes a hard disk and nonvolatile memory. The communication unit 909 includes a network interface. The drive 910 drives a removable media 911 such as a magnetic disk, an optical disk, a magneto-optical disk, or a semiconductor memory.

In the computer 900 having the aforementioned configuration, for example, a CPU 901 causes a program stored in the recording unit 908 to be loaded and executed in the RAM 903 via the input/output interface 905 and the bus 904, thereby performing the series of processing described above.

A program executed by the computer 900 (the CPU 901) can be recorded in the removable media 911 as a package media, for example, so as to be provided. The program can be provided via wired or wireless transfer media such as a local area network, the internet, and digital satellite service.

In the computer 900, the program can be installed in the recording unit 908 via the input/output interface 905 by mounting the removable media 911 in the drive 910. The program can be received at the communication unit 909 via the wired or wireless transfer medium, and can be installed in the recording unit 908. Otherwise, the program can be installed in the ROM 902 or the recording unit 908 in advance.

The program executed by the computer 900 may be a program in which the processing is performed in time series along the order described in this specification, and processing is performed at necessary timing such as in parallel or when a call sign is given.

Here, in this specification, the steps of processing in which the program for causing the computer 900 to perform various types of processing is described does not necessarily perform the processing in time series along the order disclosed as flowcharts. The steps of processing also include the processing which is executed in parallel or individually executed (for example, the processing in parallel or the processing by an object).

The program may be processed by one computer, or may be distributed for processing by a plurality of computers. Moreover, the program may be executed by being transferred to a distant computer.

In this specification, the term "system" denotes an assembly of a plurality of configurational elements (apparatus, module (component)), and whether or not all the configurational elements are in the same casing is not questioned. Therefore, both of a plurality of apparatuses which are accommodated in separate casings and are connected via a network, and an apparatus in which a plurality of modules are accommodated in a casing are systems.

The embodiment of the present technology is not limited to the aforementioned embodiment, and can be variously changed without departing from the scope and spirit of the present technology. For example, the present technology can adopt a configuration in which one function is distributed to the plurality of apparatuses via a network so as to perform cloud computing for processing in cooperation.

Each step described in the aforementioned flowcharts can be executed by one apparatus, or can be executed by distributing to the plurality of apparatuses. When a plurality of types of processing are included in one step, the plurality of types of processing included in one step thereof can be executed by one apparatus, or can be executed by distributing to the plurality of apparatuses.

The present technology can be configured as follows.

(1) A receiving apparatus including circuitry that is configured to receive a broadcasting wave that transfers digital data according to an IP (Internet Protocol) having a protocol stack of layers, wherein the circuitry is further configured to implement a first decoder that uses a first key transferred in a first control signal at a first layer to decode a second key acquired in a second control signal transferred at a second layer, the second layer being a higher layer than the first layer in the protocol stack, and a second decoder that uses the decoded second key to decode an encoded component that configures a particular broadcasting service which is included in a stream obtained through the broadcasting wave.

(2) In the receiving apparatus according to (1), the first control signal transfers first signaling information in which location information for acquiring a first descriptor including at least the first key is described, wherein the second control signal transfers second signaling information in which location information for acquiring a second descriptor including at least the second key is described, wherein the receiver acquires the first descriptor based on the location information described in the first signaling information, and the receiver acquires the second descriptor based on the location information described in the second signaling information.

(3) In the receiving apparatus according to (2), the first descriptor is transferred via the first control signal, a communication network, or NRT (Non-RealTime) broadcasting, and the second descriptor is transferred via the second control signal, the communication network, the NRT broadcasting, or the encoded component (4) In the receiving apparatus according to (2) or (3), at least one of the first key, the second key and encoded component are encoded according to a CAS (Conditional Access System), wherein the first descriptor is an EMM (Entitlement Management Message), the second descriptor is an ECM (Entitlement Control Message), and the first key is encoded with a third key.

(5) In the receiving apparatus according to (4), contract information through which viewing-listening propriety for each component can be checked is further included in the EMM and the ECM.

(6) The receiving apparatus according to (4) or (5), a group ID that identifies a particular group is further included in the EMM and the ECM.

(7) In the receiving apparatus according to (6), the EMM or the ECM of the particular group identified by the group ID is respectively used out of a plurality of EMMs or a plurality of ECMs.

(8) In the receiving apparatus according to any one of (4) to (7), a first broadcasting service and a second broadcasting service that is related to the first broadcasting service are provided, the encoded component that configures the first broadcasting service is decoded by using the second key acquired from the ECM of the first broadcasting service, and another encoded component that configures the second broadcasting service is decoded by using the second key acquired from the ECM of the first broadcasting service or the ECM of the second broadcasting service.

(9) In the receiving apparatus according to any one of (4) to (8), the EMM as the first descriptor of the first layer is obtained in accordance with location uniform resource identifier (URI) information in the first control signal transmitted at the first layer, the ECM as the second descriptor is obtained in accordance with location uniform resource identifier (URI) information in the first control signal.

(10) In the receiving apparatus according to any one of (2) to (9), the first descriptor being an entitlement management message and including at least one of a work key ID, a work key, and a contract information element that identifies a broadcast service contracted to the receiver.

(11) In the receiving apparatus according to any one of (2) to (10), the second descriptor being an entitlement control message and including at least one of a work key ID, a number of scramble keys, a scramble key ID, and a scramble key.

(12) In the receiving apparatus according to any one of (5) to (11), the ECM includes tier bits that enable a check of viewing-listening propriety for each component.

(13) In the receiving apparatus according to any one of (1) to (12), the second layer out of the layers of the protocol of the IP transferring method is a layer upper than an IP layer. A common IP address is allocated to the encoded component configuring each item of the broadcasting service and the second control signal.

(14) A receiving method of a receiving apparatus, including causing the receiving apparatus to receive a broadcasting wave of digital broadcasting adopting an IP transferring method, decode a second key acquired in accordance with a second control signal transferred at a second layer which is a layer upper than a first layer, by using a first key acquired in accordance with a first control signal transferred at the first layer out of layers of a protocol of the IP transferring method through the broadcasting wave, and decode an encoded component configuring particular broadcasting service which is included in a stream obtained through the broadcasting wave, by using the decoded second key.

(15) A transmitting apparatus includes a first acquisition unit that acquires one or a plurality of components configuring various items of broadcasting service, a second acquisition unit that acquires a first control signal for acquiring a first key and a second control signal for acquiring a second key, an encoding unit that encodes the component by using the second key which is encoded by using the first key, and a transmitting unit that transmits a broadcasting wave in which an IP transferring method including a stream which has an encoded component configuring particular broadcasting service, and the first control signal and the second control signal is adopted, and through which the first control signal is transferred at the first layer out of layers of a protocol of the IP transferring method and the second control signal is transferred at the second layer which is a layer upper than the first layer.

(16) In the transmitting apparatus according to (15), the first control signal transfers first signaling information in which location information for acquiring a first descriptor including at least the first key is described. The second control signal transfers second signaling information in which location information for acquiring a second descriptor including at least the second key is described.

(17) In the transmitting apparatus according to (16), the first descriptor is transferred by utilizing the first control signal, a communication network, or NRT broadcasting. The second descriptor is transferred by utilizing the second control signal, the communication network, the NRT broadcasting, or the component.

(18) In the transmitting apparatus according to (16) or (17), an encoding method conforms to a CAS method. The first descriptor is an EMM. The second descriptor is an ECM. The first key is encoded by using a third key.

(19) In the transmitting apparatus according to (18), contract information through which viewing-listening propriety for each component can be checked is further included in the EMM and the ECM.

(20) In the transmitting apparatus according to (18) or (19), a group ID for identifying a particular group is further included in the EMM and the ECM.

(21) In the transmitting apparatus according to (20), the EMM or the ECM of the particular group identified by the group ID is respectively used out of a plurality of the EMMs or a plurality of the ECMs.

(22) In the transmitting apparatus according to any one of (18) to (21), first broadcasting service and second broadcasting service which is related to the first broadcasting service are provided. An encoded component configuring the first broadcasting service is decoded by using the second key acquired from the ECM of the first broadcasting service. An encoded component configuring the second broadcasting service is decoded by using the second key acquired from the ECM of the first broadcasting service or the ECM of the second broadcasting service.

(23) In the transmitting apparatus according to any one of (15) to (22), the second layer out of the layers of the protocol of the IP transferring method is a layer upper than an IP layer. A common IP address is allocated to the encoded component configuring each item of the broadcasting service and the second control signal.

(24) A transmitting method of a transmitting apparatus, including causing the transmitting apparatus to acquire one or the plurality of components configuring various items of broadcasting service, acquire a first control signal for acquiring a first key and a second control signal for acquiring a second key, encode the component by using the second key which is encoded by using the first key, and transmit a broadcasting wave in which an IP transferring method including a stream which has an encoded component configuring particular broadcasting service, and the first control signal and the second control signal is adopted, and through which the first control signal is transferred at the first layer out of layers of a protocol of the IP transferring method and the second control signal is transferred at the second layer which is a layer upper than the first layer.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Broadcasting communication system
10 Transmitting apparatus
20 Receiving apparatus
50 EMM server
60 ECM server
90 Internet
111 Video data acquisition unit
113 Audio data acquisition unit
115 File data acquisition unit
117 Scrambler
118 Control signal acquisition unit
120 Mux
121 Transmitting unit
212 Tuner
213 Demux
214 Control unit
216 NVRAM
218 Video decoder
219 Video output unit
220 Audio decoder
221 Audio output unit
222 File processing unit
224 Communication I/F
900 Computer
901 CPU

The invention claimed is:

1. A receiver comprising:
circuitry configured to:
receive a broadcasting stream including digital data according to an IP (Internet Protocol) having a protocol stack of layers;
receive a first control signal in the broadcasting stream at a first layer of the protocol stack of layers, the first control signal including first location information for acquiring a first descriptor that includes a first key;
acquire the first key based on the first location information;
receive a second control signal in the broadcasting stream at a second layer of the protocol stack of layers, the protocol stack of layers having at least one more intervening layer between the second layer and a lowest layer of the protocol stack of layers than that between the first layer and the lowest layer, and the second control signal including a second descriptor that includes a second key;
decode the second key using the first key; and
decrypt, using the decoded second key, an encoded component that corresponds to a first broadcasting service that is included in a stream obtained through the broadcasting stream.

2. The receiver according to claim 1, wherein
the first descriptor is transferred via the first control signal, a communication network, or NRT (Non-Real-Time) broadcasting.

3. The receiver according to claim 2, wherein
at least one of the first key, the second key, and the encoded component is encoded according to a CAS (Conditional Access System),
the first descriptor is an EMM (Entitlement Management Message),
the second descriptor is an ECM (Entitlement Control Message), and
the first key is encoded using a third key.

4. The receiver according to claim 3,
wherein contract information through which viewing-listening propriety for each component is further included in the EMM and the ECM.

5. The receiver according to claim 3,
wherein a group ID that identifies a particular group is further included in the EMM and the ECM.

6. The receiver according to claim 5, wherein the EMM or the ECM of the particular group identified by the group ID is respectively used out of a plurality of EMMs or a plurality of ECMs.

7. The receiver according to claim 3, wherein
a second broadcasting service that is related to the first broadcasting service is included in another stream obtained through the broadcasting stream, and
another encoded component that corresponds to the second broadcasting service is decrypted by using the second key acquired from the ECM of the first broadcasting service or using another key acquired from another ECM of the second broadcasting service.

8. The receiver according to claim 3, wherein
the EMM as the first descriptor of the first layer is obtained in accordance with location uniform resource identifier (URI) information as the first location information in the first control signal transmitted at the first layer.

9. The receiver according to claim 1, wherein
the first descriptor is an entitlement management message and includes at least one of a work key ID, a work key, and a contract information element that identifies a broadcast service contracted to the receiver.

10. The receiver according to claim 1, wherein
the second descriptor is an entitlement control message and includes at least one of a work key ID, a number of scramble keys, a scramble key ID, and a scramble key.

11. The receiver according to claim 4, wherein
the ECM includes tier bits that enable a check of viewing-listening propriety for each component.

12. The receiver according to claim 1, wherein
the protocol stack of layers includes an IP layer,
the second layer of the protocol stack of layers is a higher layer than the IP layer, and
a common IP address is allocated to the encoded component that corresponds to the first broadcasting service and the second control signal.

13. A receiving method of a receiver, comprising:
receiving with circuitry a broadcasting stream including digital data according to an IP (Internet Protocol) having a protocol stack of layers;
receiving a first control signal in the broadcasting stream at a first layer of the protocol stack of layers, the first control signal including first location information for acquiring a first descriptor that includes a first key;
acquiring the first key based on the first location information;
receiving a second control signal in the broadcasting stream at a second layer of the protocol stack of layers, the protocol stack of layers having at least one more intervening layer between the second layer and a lowest layer of the protocol stack of layers than that between the first layer and the lowest layer, and the second control signal including a second descriptor that includes a second key;
decoding the second key using the first key; and
decrypting, using the decoded second key, an encoded component that corresponds to a particular broadcasting service that is included in a stream obtained through the broadcasting stream.

14. The receiving method according to claim 13, wherein the first descriptor is transferred via the first control signal, a communication network, or NRT (Non-RealTime) broadcasting.

15. The receiving method according to claim 14, wherein
at least one of the first key, the second key, and the encoded component is encoded according to a CAS (Conditional Access System), and
the first key is encoded using a third key.

16. A transmitter comprising:
circuitry configured to
acquire a component that corresponds to a first broadcasting service;
acquire a first control signal that includes first location information for acquiring a first descriptor that includes a first key;
acquire a second control signal including a second descriptor that includes a second key that has been encoded using the first key;
generate an encoded component by encrypting the component using the second key; and
transmit a broadcasting stream that includes digital data according to an IP (Internet Protocol) having a protocol stack of layers,
wherein
the broadcasting stream includes a stream that corresponds to the encoded component, the first control signal, and the second control signal,
the first control signal is transferred at a first layer of the protocol stack of layers,
the second control signal is transferred at a second layer of the protocol stack of layers, and
the protocol stack of layers includes at least one more intervening layer between the second layer and a lowest layer of the protocol stack of layers than that between the first layer and the lowest layer.

17. The transmitter according to claim 16, wherein
the first descriptor is transferred via the first control signal, a communication network, or NRT broadcasting.

18. The transmitter according to claim 17, wherein
at least one of the first key, the second key, and the encoded component is encoded according to a CAS (Conditional Access System),
the first descriptor is an EMM (Entitlement Management Message),
the second descriptor is an ECM (Entitlement Control Message), and
the first key is encoded using a third key.

19. The transmitter according to claim 18,
wherein contract information through which viewing-listening propriety for each component is further included in the EMM and the ECM.

20. The transmitter according to claim 18,
wherein a group ID that identifies a particular group is further included in the EMM and the ECM.

21. The transmitter according to claim 20,
wherein the EMM or the ECM of the particular group identified by the group ID is respectively used out of a plurality of EMMs or a plurality of ECMs.

22. The transmitter according to claim 18, wherein
the broadcasting stream further includes another stream that includes another encoded component that corresponds to a second broadcasting service related to the first broadcasting service, and
the another encoded component that corresponds to the second broadcasting service is encrypted by using the second key included in the ECM of the first broadcasting service or using another key included in another ECM of the second broadcasting service.

23. The transmitter according to claim 16, wherein
the protocol stack of layers includes an IP layer,
the second layer of the protocol stack of layers is a higher layer than the IP layer, and
a common IP address is allocated to the encoded component that corresponds to the first broadcasting service and the second control signal.

24. A transmitting method of a transmitter, comprising:
acquiring a component that corresponds to a broadcasting service;
acquiring a first control signal that includes first location information for acquiring a first descriptor that includes a first key;
acquiring a second control signal including a second descriptor that includes a second key that has been encoded using the first key;
generating an encoded component by encrypting the component using the second key; and
transmitting a broadcasting stream that includes digital data according to an IP (Internet Protocol) having a protocol stack of layers,
wherein
the broadcasting stream includes a stream that corresponds to the encoded component, the first control signal, and the second control signal,
the first control signal is transferred at a first layer of the protocol stack of layers,
the second control signal is transferred at a second layer of the protocol stack of layers, and
the protocol stack of layers includes at least one more intervening layer between the second layer and a lowest layer of the protocol stack of layers than that between the first layer and the lowest layer.

25. The transmitting method according to claim 24, wherein
at least one of the first key, the second key, and the encoded component is encoded according to a CAS (Conditional Access System),
the first descriptor is an EMM (Entitlement Management Message), and
the second descriptor is an ECM (Entitlement Control Message).

\* \* \* \* \*